(12) United States Patent
Sugimoto

(10) Patent No.: US 11,492,076 B2
(45) Date of Patent: Nov. 8, 2022

(54) BICYCLE SPROCKET AND BICYCLE SPROCKET ASSEMBLY

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 438 days.

(21) Appl. No.: 16/711,353

(22) Filed: Dec. 11, 2019

(65) Prior Publication Data

US 2020/0115005 A1   Apr. 16, 2020

Related U.S. Application Data

(60) Division of application No. 15/387,528, filed on Dec. 21, 2016, now Pat. No. 10,549,816, which is a continuation-in-part of application No. 15/170,880, filed on Jun. 1, 2016, now abandoned, which is a continuation-in-part of application No. 15/054,256, filed on Feb. 26, 2016, now abandoned.

(51) Int. Cl.
*B62M 9/10* (2006.01)
*F16H 55/30* (2006.01)

(52) U.S. Cl.
CPC ............... *B62M 9/10* (2013.01); *F16H 55/30* (2013.01)

(58) Field of Classification Search
CPC .................................. B62M 9/10; F16H 55/30
See application file for complete search history.

(56) References Cited

U.S. PATENT DOCUMENTS

| 5,078,653 A | * | 1/1992 | Nagano | ..................... B62M 9/10 474/160 |
| 5,192,248 A | * | 3/1993 | Nagano | .................. B62M 9/105 474/140 |
| 5,458,543 A | * | 10/1995 | Kobayashi | ............... B62M 9/10 474/160 |
| 5,609,536 A | * | 3/1997 | Hsu | .......................... B62M 9/10 474/160 |

(Continued)

FOREIGN PATENT DOCUMENTS

| CN | 104802918 | 7/2015 |
| CN | 105083461 | 11/2015 |

(Continued)

OTHER PUBLICATIONS

Restriction Requirment issued by the U.S. Patent and Trademark Office for the U.S. Appl. No. 15/387,528, dated Oct. 19, 2018.

(Continued)

*Primary Examiner* — Michael R Mansen
*Assistant Examiner* — Juan J Campos, Jr.
(74) *Attorney, Agent, or Firm* — Mori & Ward, LLP

(57) ABSTRACT

A bicycle sprocket having a rotational center axis, the bicycle sprocket comprises a sprocket body, a chain engagement structure, and a shifting facilitation projection. The chain engagement structure is arranged on a radially outer periphery of the sprocket body. The chain engagement structure includes a plurality of chain-driving teeth to engage with a bicycle chain to transmit a rotational driving force to the bicycle chain. The shifting facilitation projection is to facilitate an upshifting operation of the bicycle chain and to facilitate a downshifting operation of the bicycle chain.

28 Claims, 40 Drawing Sheets

(56) References Cited

U.S. PATENT DOCUMENTS

| | | | |
|---|---|---|---|
| 5,738,603 A * | 4/1998 | Schmidt | B62M 9/10 474/158 |
| 6,007,442 A * | 12/1999 | Schmidt | B62M 9/10 474/122 |
| 6,860,171 B1 | 3/2005 | Nanko et al. | |
| 9,182,027 B2 | 11/2015 | Reiter et al. | |
| 9,701,364 B2 * | 7/2017 | Sugimoto | F16H 55/30 |
| 9,862,456 B2 | 1/2018 | Reiter et al. | |
| 9,915,336 B1 * | 3/2018 | Fukunaga | F16H 55/30 |
| 10,155,566 B2 * | 12/2018 | Sugimoto | B62M 9/105 |
| 2010/0081531 A1 * | 4/2010 | Esquibel | B62M 9/12 474/160 |
| 2013/0139642 A1 | 6/2013 | Reiter et al. | |
| 2015/0198231 A1 * | 7/2015 | Emura | B62M 9/105 474/156 |
| 2015/0210352 A1 | 7/2015 | Sugimoto | |
| 2015/0337943 A1 | 11/2015 | Sugimoto | |
| 2016/0167737 A1 | 6/2016 | Tokuyama et al. | |
| 2016/0207590 A1 | 7/2016 | Fukumori | |
| 2017/0029066 A1 * | 2/2017 | Fukunaga | B62M 9/10 |
| 2017/0283005 A1 | 10/2017 | Inoue et al. | |

FOREIGN PATENT DOCUMENTS

| | | |
|---|---|---|
| DE | 4445035 C1 | 6/1996 |
| DE | 102015000911 A1 | 7/2015 |
| EP | 1112923 A2 | 7/2001 |

OTHER PUBLICATIONS

Office Action with Form PTO-892 Notice of References Cited issued by the U.S. Patent and Trademark Office for the U.S. Appl. No. 15/387,528, dated Mar. 15, 2019.

Office Action with Form PTO-892 Notice of References Cited issued by the U.S. Patent and Trademark Office for the U.S. Appl. No. 15/387,528, dated Jul. 3, 2019.

* cited by examiner

BICYCLE SPROCKET AND BICYCLE SPROCKET ASSEMBLY

CROSS-REFERENCE TO RELATED APPLICATIONS

The present application is a divisional application of the U.S. patent application Ser. No. 15/387,528 filed Dec. 21, 2016, which is a continuation-in-part application of the U.S. patent application Ser. No. 15/170,880 filed Jun. 1, 2016, which is a continuation-in-part application of the U.S. patent application Ser. No. 15/054,256 filed Feb. 26, 2016. The contents of these applications are incorporated herein by reference in their entirety.

BACKGROUND OF THE INVENTION

Field of the Invention

The present invention relates to a bicycle sprocket and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket having a rotational center axis, the bicycle sprocket comprises a sprocket body, a chain engagement structure, and a shifting facilitation projection. The chain engagement structure is arranged on a radially outer periphery of the sprocket body. The chain engagement structure includes a plurality of chain-driving teeth to engage with a bicycle chain to transmit a rotational driving force to the bicycle chain. The shifting facilitation projection is to facilitate an upshifting operation of the bicycle chain and to facilitate a downshifting operation of the bicycle chain.

With the bicycle sprocket according to the first aspect, it is possible to smooth the upshifting operation and the downshifting operation using the shifting facilitation projection provided as a common projection. This can simplify the structure of the bicycle sprocket with facilitating the upshifting operation and the downshifting operation compared with a bicycle sprocket including separate projections to respectively facilitate the upshifting operation and the downshifting operation.

In accordance with a second aspect of the present invention, the bicycle sprocket according to the first aspect is configured so that the plurality of chain-driving teeth includes at least one upshifting facilitation tooth, and at least one downshifting facilitation tooth which is disposed on a downstream side of the at least one upshifting facilitation tooth.

With the bicycle sprocket according to the second aspect, it is possible to effectively facilitate the upshifting operation and the downshifting operation using the shifting facilitation projection, the at least one upshifting facilitation tooth, and the at least one downshifting facilitation tooth.

In accordance with a third aspect of the present invention, the bicycle sprocket according to the second aspect is configured so that the at least one downshifting facilitation tooth is adjacent to the at least one upshifting facilitation tooth on a downstream side of the at least one upshifting facilitation tooth without another tooth between the at least one upshifting facilitation tooth and the at least one downshifting facilitation tooth.

With the bicycle sprocket according to the third aspect, it is possible to reduce a size of an area in which the at least one upshifting facilitation tooth and the at least one downshifting facilitation tooth are disposed. Furthermore, it is possible to more certainly bring the bicycle chain into engagement with the shifting facilitation projection during each of the upshifting operation and the downshifting operation in a case where the shifting facilitation projection serves as upshifting and downshifting facilitation projections.

In accordance with a fourth aspect of the present invention, the bicycle sprocket according to the second or third aspect is configured so that the at least one downshifting facilitation tooth includes a downshifting derailing tooth to first derail the bicycle chain from the bicycle sprocket during the downshifting operation.

With the bicycle sprocket according to the fourth aspect, it is possible to smoothly derail the bicycle chain from the bicycle sprocket during the downshifting operation. This effectively facilitates the downshifting operation.

In accordance with a fifth aspect of the present invention, the bicycle sprocket according to the fourth aspect is configured so that the at least one downshifting facilitation tooth includes at least one chamfered tooth disposed on a downstream side of the downshifting derailing tooth in a rotational driving direction of the bicycle sprocket. The at least one chamfered tooth includes a downshifting facilitation chamfer disposed on an opposite side of the shifting facilitation projection in an axial direction parallel to the rotational center axis.

With the bicycle sprocket according to the fifth aspect, it is possible to more smoothly derail the bicycle chain from the bicycle sprocket during the downshifting operation. This more effectively facilitates the downshifting operation.

In accordance with a sixth aspect of the present invention, the bicycle sprocket according to the fifth aspect is configured so that the at least one chamfered tooth is adjacent to the downshifting derailing tooth on the downstream side of the downshifting derailing tooth in the rotational driving direction without another tooth between the at least one chamfered tooth and the downshifting derailing tooth.

With the bicycle sprocket according to the sixth aspect, it is possible to more smoothly derail the bicycle chain from the bicycle sprocket during the downshifting operation in a smaller area. This shortens a time period of the downshifting operation.

In accordance with a seventh aspect of the present invention, the bicycle sprocket according to any one of the second to sixth aspects is configured so that the at least one upshifting facilitation tooth includes an upshifting receiving tooth to first receive the bicycle chain during the upshifting operation.

With the bicycle sprocket according to the seventh aspect, it is possible to more smoothly receive the bicycle chain during the upshifting operation.

In accordance with an eighth aspect of the present invention, the bicycle sprocket according to the seventh aspect is configured so that the upshifting receiving tooth is spaced apart from the shifting facilitation projection by an even number of chain pitch of the bicycle chain.

With the bicycle sprocket according to the eighth aspect, it is possible to more smoothly receive the bicycle chain lifted by the shifting facilitation projection during the upshifting operation. Furthermore, it is possible to certainly bring the opposed pair of outer link plates of the bicycle chain into engagement with a specific tooth (the at least one first tooth).

In accordance with a ninth aspect of the present invention, the bicycle sprocket according to any one of the second to eighth aspects is configured so that the at least one downshifting facilitation tooth includes a downshifting derailing tooth to first derail the bicycle chain from the bicycle sprocket during the downshifting operation. The at least one upshifting facilitation tooth includes an upshifting receiving tooth to first receive the bicycle chain during the upshifting operation. The shifting facilitation projection is disposed between the downshifting derailing tooth and the upshifting receiving tooth in a circumferential direction with respect to the rotational center axis.

With the bicycle sprocket according to the ninth aspect, it is possible to effectively facilitate the upshifting operation and the downshifting operation using the shifting facilitation projection, the downshifting derailing tooth, and the upshifting receiving tooth.

In accordance with a tenth aspect of the present invention, the bicycle sprocket according to any one of the second to ninth aspects is configured so that the chain engagement structure includes a shifting facilitation area in which the at least one downshifting facilitation tooth and the at least one upshifting facilitation tooth are disposed. The shifting facilitation projection is disposed in the shifting facilitation area to engage with an outer link plate of the bicycle chain during each of the upshifting operation and the downshifting operation.

With the bicycle sprocket according to the tenth aspect, it is possible to effectively facilitate the upshifting operation and the downshifting operation using the shifting facilitation projection.

In accordance with an eleventh aspect of the present invention, the bicycle sprocket according to any one of the second to tenth aspects is configured so that the at least one downshifting facilitation tooth has a radial length shorter than a radial length of at least one of the plurality of chain-driving teeth other than the at least one downshifting facilitation tooth.

With the bicycle sprocket according to the eleventh aspect, it is possible to more effectively facilitate the downshifting operation.

In accordance with a twelfth aspect of the present invention, the bicycle sprocket according to any one of the second to eleventh aspects is configured so that the plurality of chain-driving teeth includes at least one first tooth having a first chain engaging width, and at least one second tooth having a second chain engaging width. The first chain engaging width is larger than an inner link space defined between an opposed pair of inner link plates of the bicycle chain and is smaller than an outer link space defined between an opposed pair of outer link plates of the bicycle chain. The second chain engaging width is smaller than the inner link space.

With the bicycle sprocket according to the twelfth aspect, it is possible to improve chain-holding performance to hold the bicycle chain.

In accordance with a thirteenth aspect of the present invention, the bicycle sprocket according to the twelfth aspect is configured so that the shifting facilitation projection has an axial length defined from an axial side surface of the at least one second tooth in an axial direction parallel to the rotational center axis. The axial length of the shifting facilitation projection is equal to or greater than 1.0 mm.

With the bicycle sprocket according to the thirteenth aspect, it is possible to certainly bring the shifting facilitation projection into engagement with the bicycle chain during the upshifting operation and the downshifting operation.

In accordance with a fourteenth aspect of the present invention, the bicycle sprocket according to the twelfth or thirteenth aspect is configured so that the at least one downshifting facilitation tooth includes a downshifting derailing tooth to first derail the bicycle chain from the bicycle sprocket during the downshifting operation. The at least one second tooth includes the downshifting derailing tooth.

With the bicycle sprocket according to the fourteenth aspect, it is possible to smoothly derail the bicycle chain from the bicycle sprocket. This effectively facilitates the downshifting operation.

In accordance with a fifteenth aspect of the present invention, a bicycle sprocket assembly comprises the bicycle sprocket according to any one of the first to fourteenth aspects, and a smaller sprocket adjacent to the bicycle sprocket without another sprocket between the smaller sprocket and the bicycle sprocket.

With the bicycle sprocket assembly according to the fifteenth aspect, it is possible to set a chain-downshifting distance defined between the bicycle sprocket and the smaller sprocket as appropriate so that the bicycle chain smoothly shifts from the bicycle sprocket to the smaller sprocket during the downshifting operation and/or smoothly shifts from the smaller sprocket to the bicycle sprocket during the upshifting operation.

In accordance with a sixteenth aspect of the present invention, the bicycle sprocket assembly according to the fifteenth aspect is configured so that the smaller sprocket includes a downshifting receiving tooth to first receive the bicycle chain during the downshifting operation. The plurality of chain-driving teeth includes at least one upshifting facilitation tooth, and at least one downshifting facilitation tooth which is disposed on a downstream side of the at least one upshifting facilitation tooth. The at least one downshifting facilitation tooth includes a downshifting derailing tooth to first derail the bicycle chain from the bicycle sprocket during the downshifting operation. The shifting facilitation projection is disposed at a position such that the downshifting receiving tooth is spaced apart from the downshifting derailing tooth by an uneven number of chain pitch of the bicycle chain on a chain line of the bicycle chain during the downshifting operation.

With the bicycle sprocket assembly according to the sixteenth aspect, it is possible to smoothly shift the bicycle chain from the bicycle sprocket to the smaller sprocket.

In accordance with a seventeenth aspect of the present invention, the bicycle sprocket assembly according to the sixteenth aspect is configured so that the uneven number of chain pitch is equal to or smaller than nine.

With the bicycle sprocket assembly according to the seventeenth aspect, it is possible to quickly complete the downshifting operation.

In accordance with an eighteenth aspect of the present invention, the bicycle sprocket assembly according to the sixteenth or seventeenth aspect is configured so that the uneven number of chain pitch is equal to or smaller than seven.

With the bicycle sprocket assembly according to the eighteenth aspect, it is possible to more quickly complete the downshifting operation.

In accordance with a nineteenth aspect of the present invention, the bicycle sprocket assembly according to any one of the sixteenth to eighteenth aspects is configured so that the uneven number of chain pitch is equal to or smaller than five.

With the bicycle sprocket assembly according to the nineteenth aspect, it is possible to more quickly complete the downshifting operation.

In accordance with a twentieth aspect of the present invention, the bicycle sprocket assembly according to any one of the sixteenth to nineteenth aspects is configured so that the plurality of chain-driving teeth includes at least one first tooth having a first chain engaging width, and at least one second tooth having a second chain engaging width. The first chain engaging width is larger than an inner link space defined between an opposed pair of inner link plates of the bicycle chain and is smaller than an outer link space defined between an opposed pair of outer link plates of the bicycle chain. The second chain engaging width is smaller than the inner link space. The smaller sprocket includes an additional sprocket body, and an additional chain engagement structure arranged on a radially outer periphery of the additional sprocket body. The additional chain engagement structure includes a plurality of additional chain-driving teeth to engage with the bicycle chain to transmit the rotational driving force to the bicycle chain. The plurality of additional chain-driving teeth includes at least one first additional tooth having a third chain engaging width, and at least one second additional tooth having a fourth chain engaging width. The third chain engaging width is larger than the inner link space defined between the opposed pair of inner link plates of the bicycle chain and is smaller than the outer link space defined between the opposed pair of outer link plates of the bicycle chain. The fourth chain engaging width is smaller than the inner link space.

With the bicycle sprocket assembly according to the twentieth aspect, it is possible to improve chain-holding performance of each of the bicycle sprocket and the smaller sprocket. This improves chain-holding performance of the bicycle sprocket assembly.

In accordance with a twenty-first aspect of the present invention, the bicycle sprocket assembly according to the twentieth aspect is configured so that the at least one second tooth includes the downshifting derailing tooth.

With the bicycle sprocket assembly according to the twenty-first aspect, it is possible to more smoothly derail the bicycle chain from the bicycle sprocket. This effectively facilitates the downshifting operation.

In accordance with a twenty-second aspect of the present invention, the bicycle sprocket assembly according to the twentieth or twenty-first aspect is configured so that the at least one first tooth includes an upshifting receiving tooth to first receive the bicycle chain during the upshifting operation. The at least one first additional tooth includes the downshifting receiving tooth.

With the bicycle sprocket assembly according to the twenty-second aspect, it is possible to smoothly receive the bicycle chain during the upshifting operation and the downshifting operation. This effectively facilitates the upshifting operation and the downshifting operation.

In accordance with a twenty-third aspect of the present invention, the bicycle sprocket assembly according to any one of the fifteenth to twenty-second aspects is configured so that the smaller sprocket includes an additional sprocket body, and an additional chain engagement structure arranged on a radially outer periphery of the additional sprocket body. The additional chain engagement structure includes a plurality of additional chain-driving teeth to engage with the bicycle chain to transmit the rotational driving force to the bicycle chain. The total number of the plurality of chain-driving teeth is 36. The total number of the plurality of additional chain-driving teeth is 26.

With the bicycle sprocket assembly according to the twenty-third aspect, it is possible to provide one of combinations which are suitable for the certain and quick downshifting operation facilitated by the downshifting facilitation projection.

In accordance with a twenty-fourth aspect of the present invention, the bicycle sprocket assembly according to any one of the fifteenth to twenty-third aspects is configured so that the smaller sprocket includes an additional sprocket body, and an additional chain engagement structure arranged on a radially outer periphery of the additional sprocket body. The additional chain engagement structure includes a plurality of additional chain-driving teeth to engage with the bicycle chain to transmit the rotational driving force to the bicycle chain. The total number of the plurality of chain-driving teeth is 38. The total number of the plurality of additional chain-driving teeth is 28.

With the bicycle sprocket assembly according to the twenty-fourth aspect, it is possible to provide one of combinations which are suitable for the certain and quick downshifting operation facilitated by the downshifting facilitation projection.

In accordance with a twenty-fifth aspect of the present invention, the bicycle sprocket assembly according to any one of the fifteenth to twenty-fourth aspects is configured so that the smaller sprocket includes an additional sprocket body, and an additional chain engagement structure arranged on a radially outer periphery of the additional sprocket body. The additional chain engagement structure includes a plurality of additional chain-driving teeth to engage with the bicycle chain to transmit the rotational driving force to the bicycle chain. The total number of the plurality of chain-driving teeth is 40. The total number of the plurality of additional chain-driving teeth is 30.

With the bicycle sprocket assembly according to the twenty-fifth aspect, it is possible to provide one of combinations which are suitable for the certain and quick downshifting operation facilitated by the downshifting facilitation projection.

In accordance with a twenty-sixth aspect of the present invention, the bicycle sprocket assembly according to any one of the sixteenth to twenty-fifth aspects is configured so that the smaller sprocket includes an additional sprocket body, and an additional chain engagement structure arranged on a radially outer periphery of the additional sprocket body. The additional chain engagement structure includes a plurality of additional chain-driving teeth to engage with the bicycle chain to transmit the rotational driving force to the bicycle chain. The total number of the plurality of chain-driving teeth is 48. The total number of the plurality of additional chain-driving teeth is 36.

With the bicycle sprocket assembly according to the twenty-sixth aspect, it is possible to provide one of combinations which are suitable for the certain and quick downshifting operation facilitated by the downshifting facilitation projection.

In accordance with a twenty-seventh aspect of the present invention, a bicycle sprocket having a rotational center axis. The bicycle sprocket comprises a sprocket body, a chain engagement structure, and a shifting facilitation projection. The chain engagement structure is arranged on a radially outer periphery of the sprocket body. The chain engagement structure includes a plurality of chain-driving teeth and a shifting facilitation area. The plurality of chain-driving teeth is to engage with a bicycle chain to transmit a rotational driving force to the bicycle chain. The plurality of chain-driving teeth includes at least one upshifting facilitation tooth and at least one downshifting facilitation tooth which is adjacent to the at least one upshifting facilitation tooth without another tooth between the at least one upshifting facilitation tooth and the at least one downshifting facilitation tooth. The at least one upshifting facilitation tooth and the at least one downshifting facilitation tooth are disposed in the shifting facilitation area. The shifting facilitation projection is disposed in the shifting facilitation area.

With the bicycle sprocket according to the twenty-seventh aspect, it is possible to smooth at least one of the upshifting operation and the downshifting operation using the shifting facilitation projection. This facilitates at least one of the upshifting operation and the downshifting operation.

In accordance with a twenty-eighth aspect of the present invention, the bicycle sprocket according to the twenty-seventh aspect is configured so that the at least one downshifting facilitation tooth is adjacent to the at least one upshifting facilitation tooth on a downstream side of the at least one upshifting facilitation tooth.

With the bicycle sprocket according to the twenty-eighth aspect, it is possible to effectively facilitate at least one of the upshifting operation and the downshifting operation using the shifting facilitation projection, the at least one upshifting facilitation tooth, and the at least one downshifting facilitation tooth.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
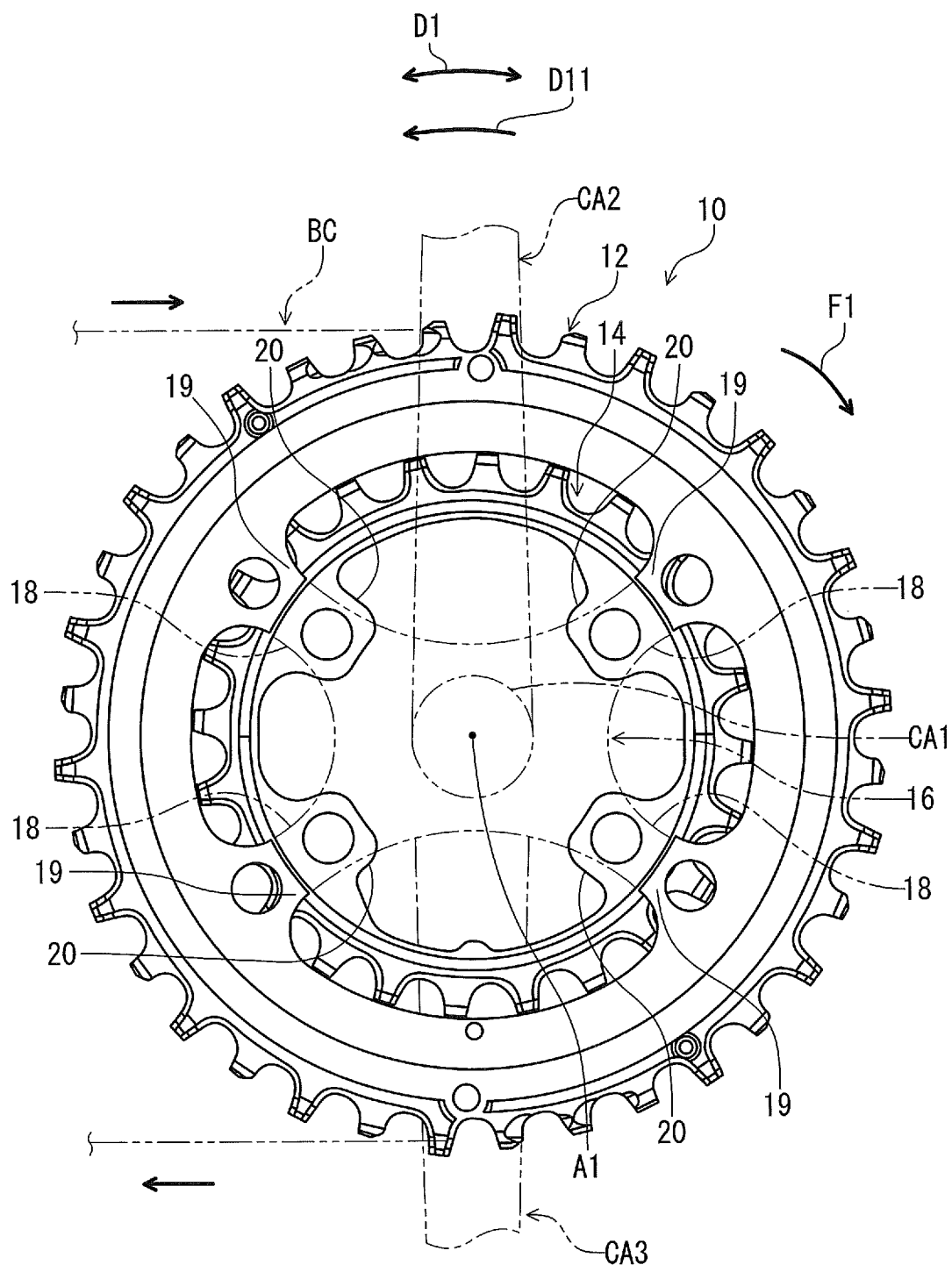
FIG. 1 is a side elevational view of a bicycle sprocket assembly in accordance with a first embodiment.

The embodiment(s) will now be described with reference to the accompanying drawings, wherein like reference numerals designate corresponding or identical elements throughout the various drawings.

First Embodiment

Figure 2:
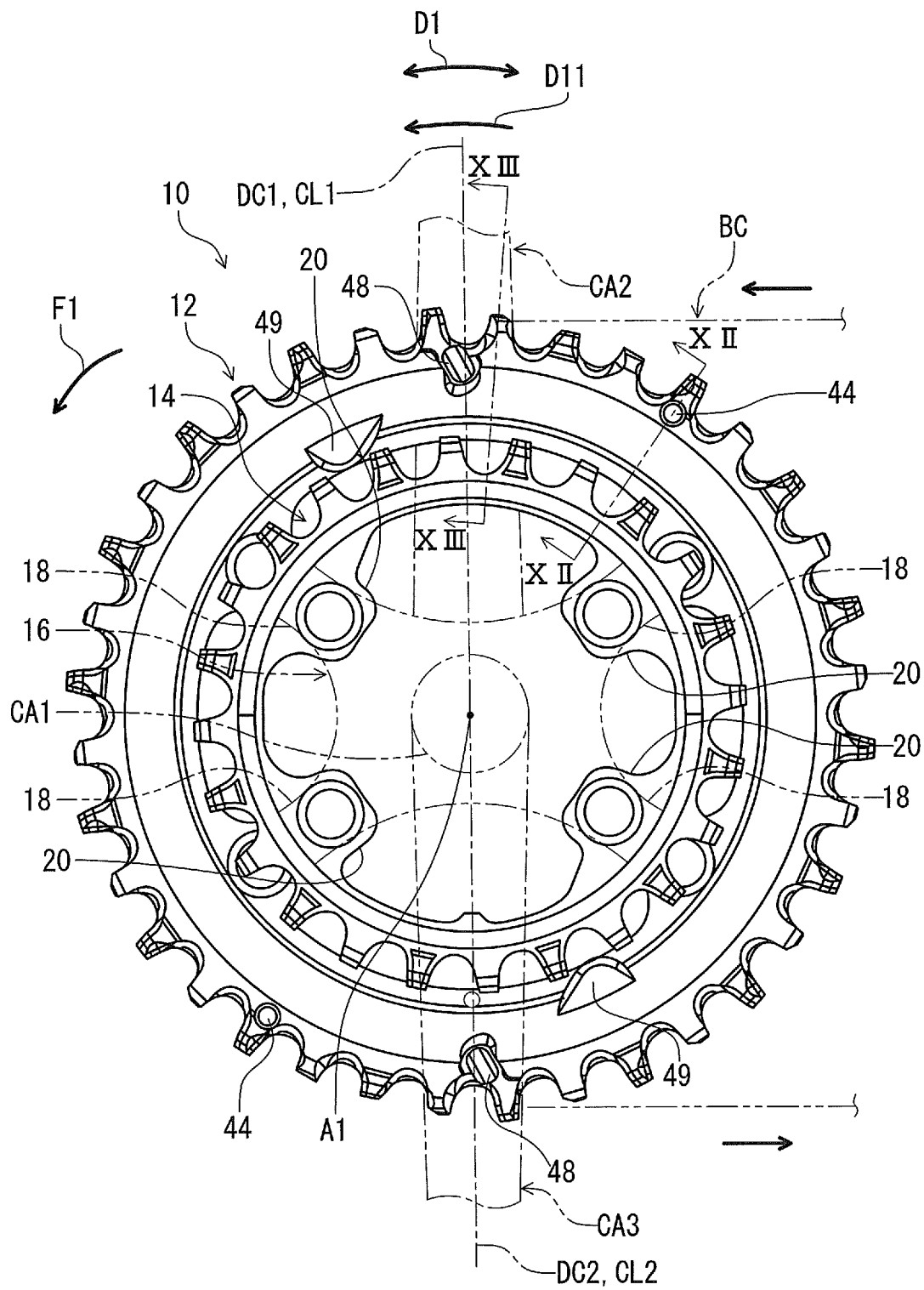
FIG. 2 is another side elevational view of a bicycle sprocket assembly illustrated in FIG. 1.

Referring initially to FIGS. 1 and 2, a bicycle sprocket assembly 10 comprises a bicycle sprocket 12 in accordance with a first embodiment. The bicycle sprocket 12 has a rotational center axis A1. The bicycle sprocket 12 is rotatable about the rotational center axis A1 relative to a bicycle frame (not shown). The bicycle sprocket 12 is engaged with a bicycle chain BC to transmit a rotational driving force F1 to the bicycle chain BC. The bicycle sprocket assembly 10 comprises a smaller sprocket 14. The smaller sprocket 14 is engaged with the bicycle chain BC to transmit the rotational driving force F1 to the bicycle chain BC. The smaller sprocket 14 has an outer diameter smaller than an outer diameter of the bicycle sprocket 12. While the bicycle sprocket assembly 10 comprises the bicycle sprocket 12 and the smaller sprocket 14 in this embodiment, the bicycle sprocket assembly 10 can comprise additional sprocket in addition to the bicycle sprocket 12 and the smaller sprocket 14. In this embodiment, the bicycle sprocket assembly 10 is a front sprocket assembly. The bicycle chain BC is shifted between the bicycle sprocket 12 and the smaller sprocket 14 by a front derailleur (not shown).

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12 of the bicycle sprocket assembly 10, should be interpreted relative to the bicycle equipped with the bicycle sprocket 12 as used in an upright riding position on a horizontal surface.

As seen in FIGS. 1 and 2, the bicycle sprocket assembly 10 includes a sprocket mounting member 16, a crank axle CA1, a right crank arm CA2, and a left crank arm CA3. The sprocket mounting member 16 includes crank connecting arms 18. The bicycle sprocket 12 comprises crank attachment portions 19. The smaller sprocket 14 comprises additional crank attachment portions 20. The crank connecting aims 18 are respectively fastened to the crank attachment portions 19 by fasteners such as bolts (not shown). The additional crank attachment portions 20 are fastened to the sprocket mounting member 16 by fasteners such as bolts (not shown).

The right crank arm CA2 and the left crank arm CA3 are secured to the crank axle CAL The right crank arm CA2 and the left crank arm CA3 are rotatably mounted to the bicycle frame about the rotational center axis A1 via the crank axle CAL The sprocket mounting member 16 is mounted on the right crank arm CA2 to be rotatable integrally with the right crank arm CA2 about the rotational center axis A1. The sprocket mounting member 16 can also be integrally provided with the right crank arm CA2 as a one-piece unitary member. Namely, the bicycle sprocket 12 is rotatable integrally with the sprocket mounting member 16 and the right crank arm CA2 about the rotational center axis A1. The bicycle sprocket 12 is rotatable about the rotational center axis A1 in a rotational driving direction D11 during pedaling. The rotational driving direction D11 is defined along a circumferential direction D1 defined about the rotational center axis A1.

Figure 3:
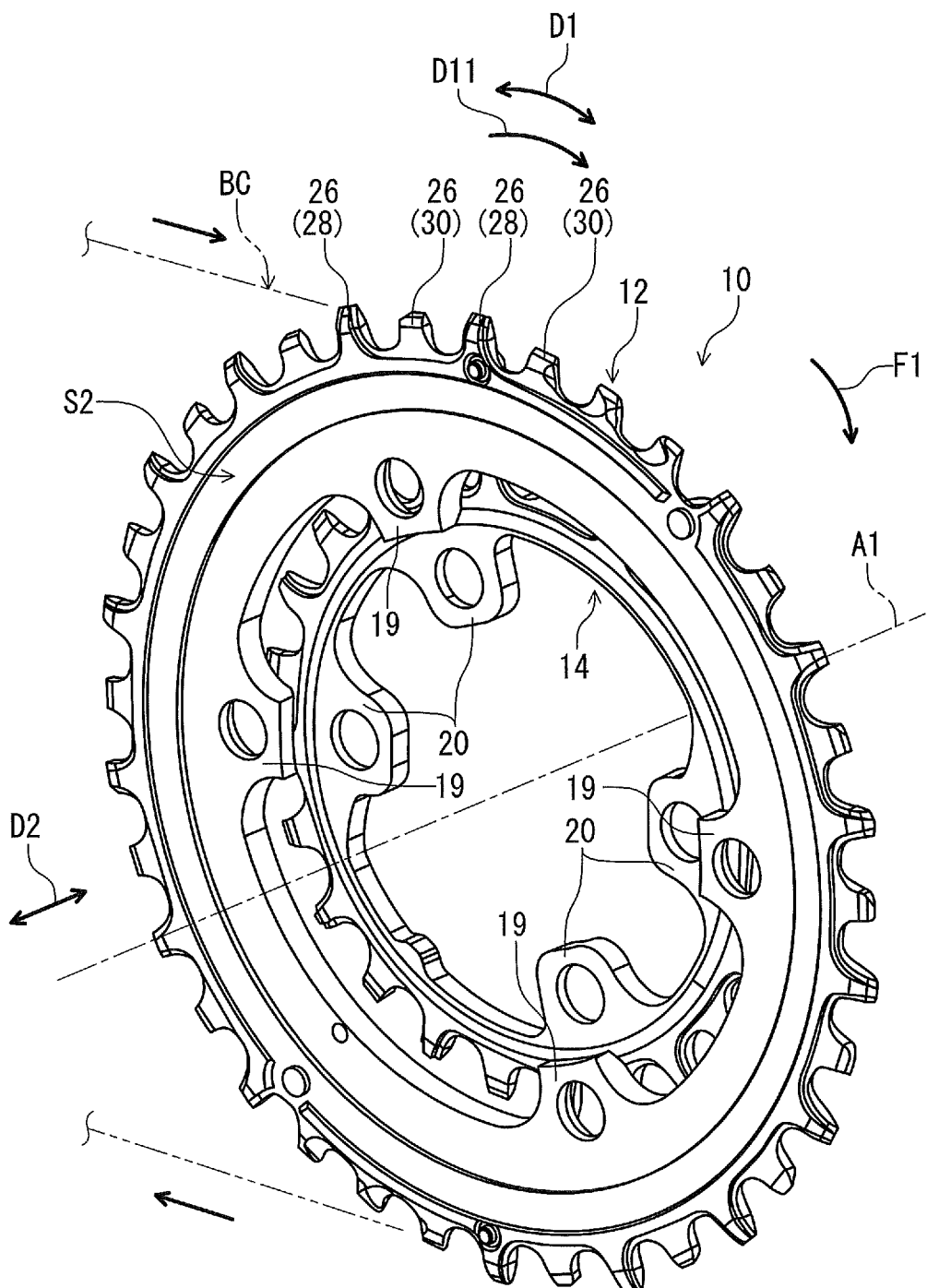
FIG. 3 is a perspective view of the bicycle sprocket assembly illustrated in FIG. 1 with a sprocket mounting member omitted.
Figure 4:
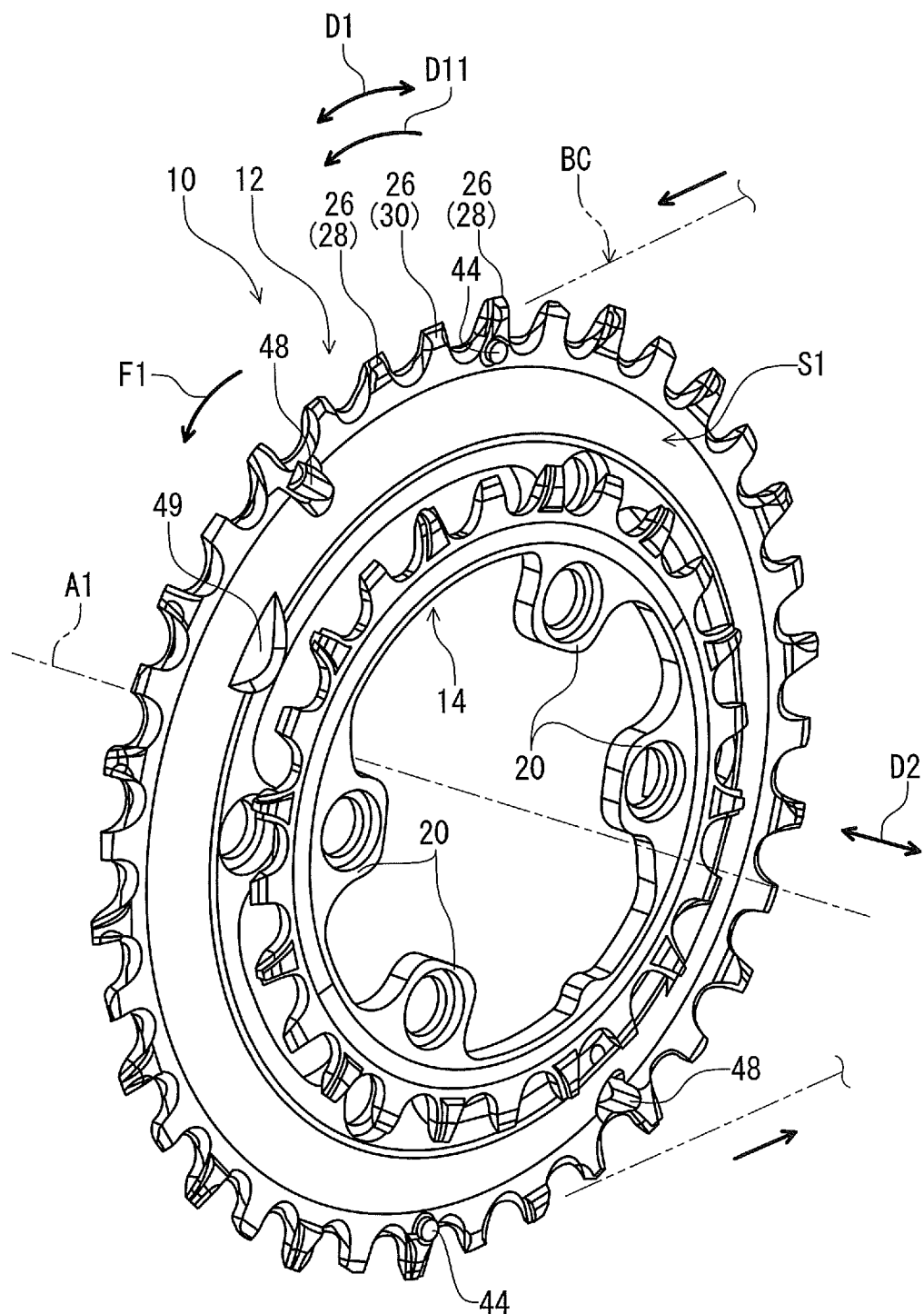
FIG. 4 is another perspective view of the bicycle sprocket assembly illustrated in FIG. 1 with the sprocket mounting member omitted.

As seen in FIGS. 3 and 4, the smaller sprocket 14 is adjacent to the bicycle sprocket 12 without another sprocket between the smaller sprocket 14 and the bicycle sprocket 12. The smaller sprocket 14 is adjacent to the bicycle sprocket 12 in an axial direction D2 parallel to the rotational center axis A1 without another sprocket between the smaller sprocket 14 and the bicycle sprocket 12.

Figure 5:
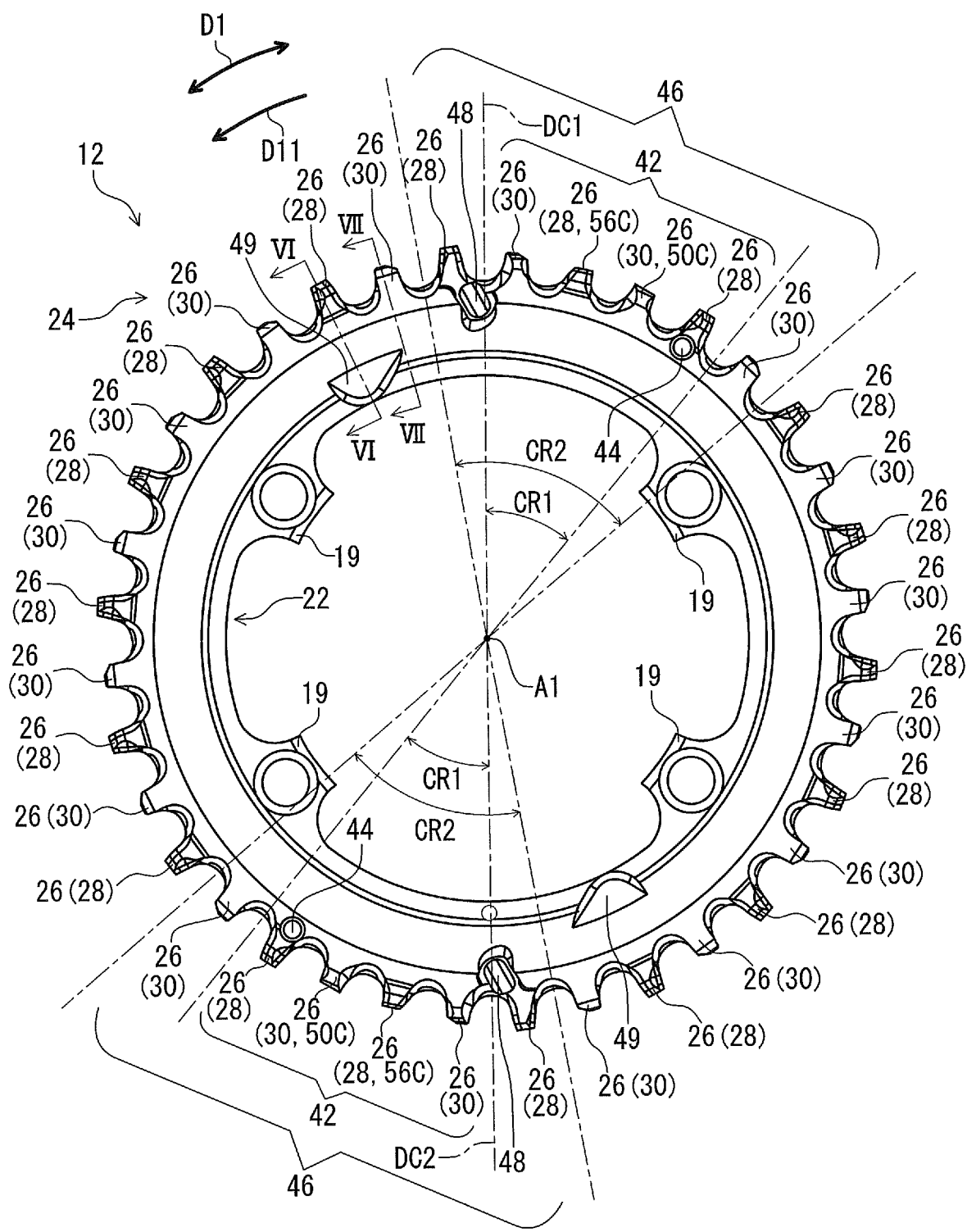
FIG. 5 is a side elevational view of a bicycle sprocket of the bicycle sprocket assembly illustrated in FIG. 1.

As seen in FIG. 5, the bicycle sprocket 12 comprises a sprocket body 22 and a chain engagement structure 24. The sprocket body 22 has an annular shape. The crank attachment portions 19 extend radially inward from an inner periphery of the sprocket body 22. The chain engagement structure 24 is arranged on a radially outer periphery of the sprocket body 22. The chain engagement structure 24 includes a plurality of chain-driving teeth 26 to engage with the bicycle chain BC to transmit the rotational driving force F1 to the bicycle chain BC. The chain-driving teeth 26 are arranged at a constant pitch in the circumferential direction D1.

The plurality of chain-driving teeth 26 includes at least one first tooth 28 and at least one second tooth 30. In this embodiment, the plurality of chain-driving teeth 26 includes a plurality of first teeth 28 and a plurality of second teeth 30. Preferably, the first teeth 28 and the second teeth 30 are alternately arranged in the circumferential direction D1 of the bicycle sprocket 12.

Figure 6:
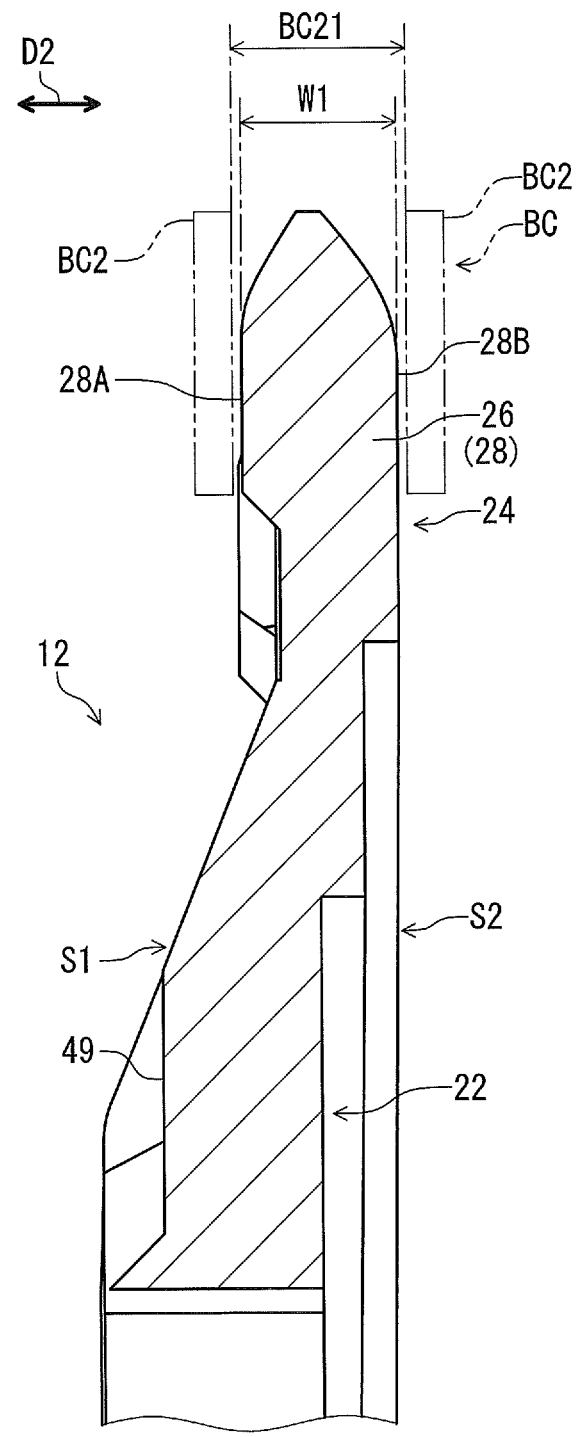
FIG. 6 is a cross-sectional view of the bicycle sprocket taken along line VI-VI of FIG. 5.
Figure 7:
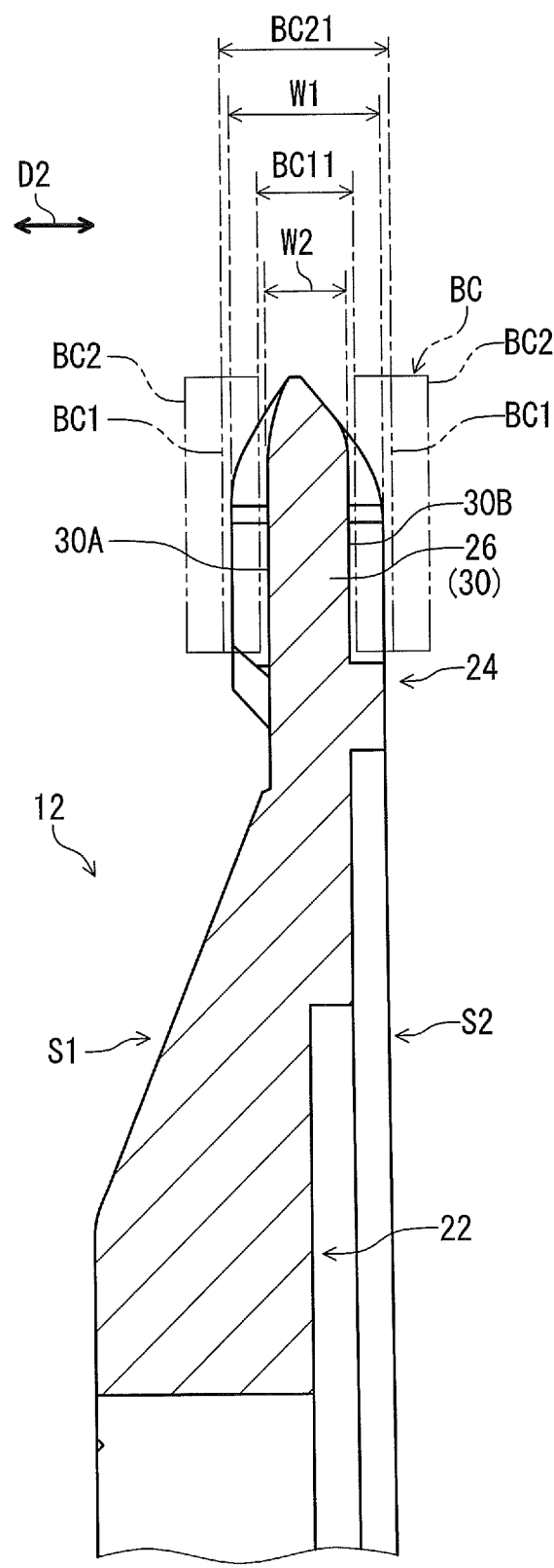
FIG. 7 is a cross-sectional view of the bicycle sprocket taken along line VII-VII of FIG. 5.

As seen in FIG. 6, the at least one first tooth 28 has a first chain engaging width W1. The first chain engaging width W1 is defined in the axial direction D2. Each of the first teeth 28 has the first chain engaging width W1. As seen in FIG. 7, the at least one second tooth 30 has a second chain engaging width W2. The second chain engaging width W2 is defined in the axial direction D2. Each of the second teeth 30 has the second chain engaging width W2. As seen in FIGS. 6 and 7, the first chain engaging width W1 is larger than an inner link space BC11 defined between an opposed pair of inner link plates BC1 of the bicycle chain BC. The first chain engaging width W1 is smaller than an outer link space BC21 defined between an opposed pair of outer link plates BC2 of the bicycle chain BC. The second chain engaging width W2 is smaller than the inner link space BC11.

As seen in FIG. 6, the at least one first tooth 28 includes a first axial end 28A and a first opposite axial end 28B opposite to the first axial end 28A in the axial direction D2. The first axial end 28A and the first opposite axial end 28B are contactable with the outer link plate BC2 of the bicycle chain BC. The first chain engaging width W1 is defined between the first axial end 28A and the first opposite axial end 28B in the axial direction D2. In this embodiment, each of the first teeth 28 includes the first axial end 28A and the first opposite axial end 28B opposite to the first axial end 28A in the axial direction D2. In each of the first teeth 28, the first chain engaging width W1 is defined between the first axial end 28A and the first opposite axial end 28B in the axial direction D2.

As seen in FIG. 7, the at least one second tooth 30 includes a second axial end 30A and a second opposite axial end 30B opposite to the second axial end 30A in the axial direction D2. The second axial end 30A and the second opposite axial end 30B are contactable with the inner link plate BC1 of the bicycle chain BC. The second chain engaging width W2 is defined between the second axial end 30A and the second opposite axial end 30B in the axial direction D2. In this embodiment, each of the second teeth 30 includes the second axial end 30A and the second opposite axial end 30B opposite to the second axial end 30A in the axial direction D2. In each of the second teeth 30, the second chain engaging width W2 is defined between the second axial end 30A and the second opposite axial end 30B in the axial direction D2.

Figure 8:
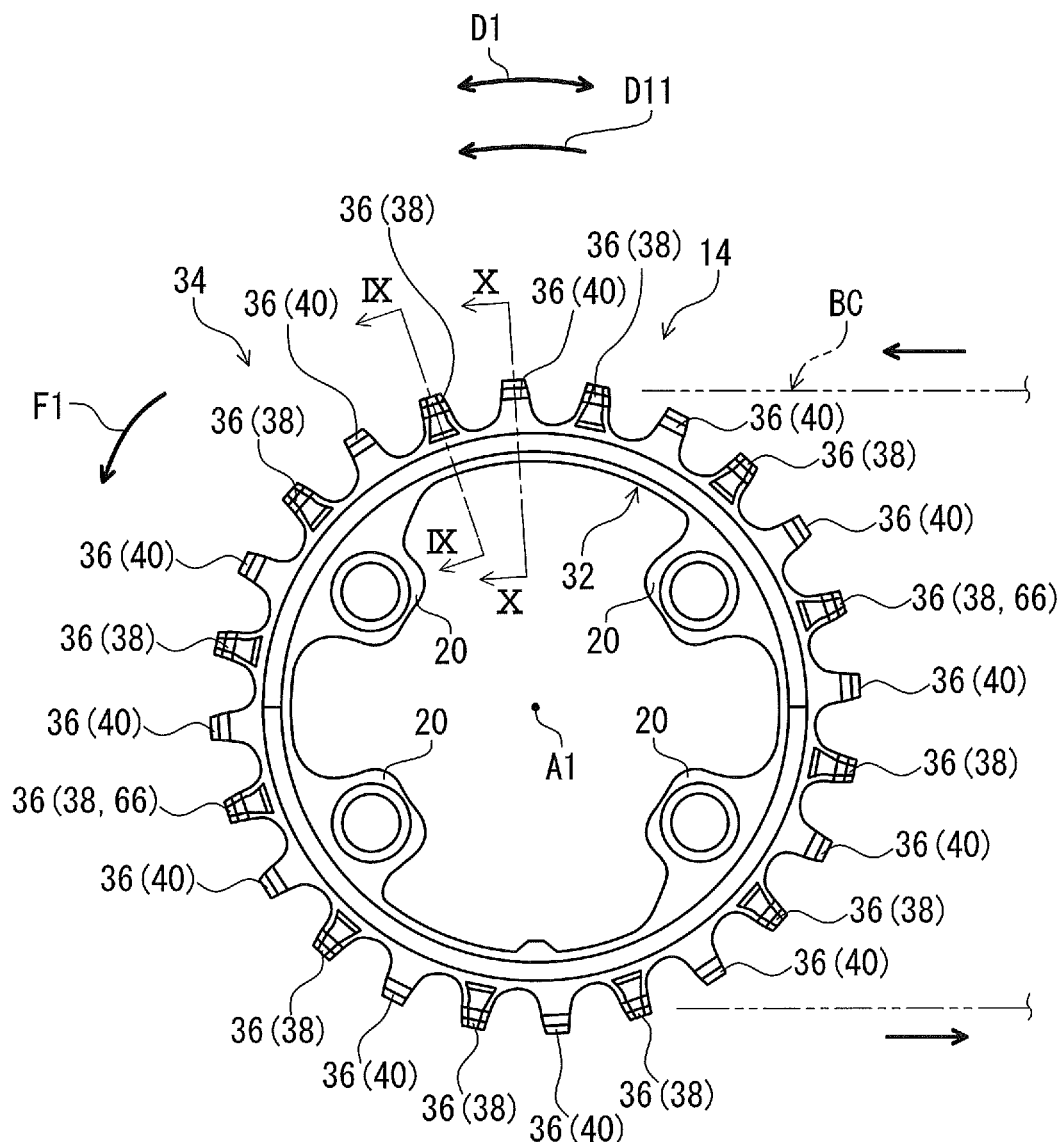
FIG. 8 is a side elevational view of a smaller sprocket of the bicycle sprocket assembly illustrated in FIG. 1.

As seen in FIG. 8, the smaller sprocket 14 comprises an additional sprocket body 32 and an additional chain engagement structure 34. The additional sprocket body 32 has an annular shape. The additional crank attachment portions 20 extend radially inward from an inner periphery of the additional sprocket body 32. The additional chain engagement structure 34 is arranged on a radially outer periphery of the additional sprocket body 32. The additional chain engagement structure 34 includes a plurality of additional chain-driving teeth 36 to engage with the bicycle chain BC to transmit the rotational driving force F1 to the bicycle chain BC. The additional chain-driving teeth 36 are arranged at a constant pitch in the circumferential direction D1.

The plurality of additional chain-driving teeth 36 includes at least one first additional tooth 38 and at least one second additional tooth 40. In this embodiment, the plurality of additional chain-driving teeth 36 includes a plurality of first additional teeth 38 and a plurality of second additional teeth 40. Preferably, the first additional teeth 38 and the second additional teeth 40 are alternately arranged in the circumferential direction D1 defined about the rotational center axis A1. A total number of the additional chain-driving teeth 36 of the smaller sprocket 14 is less than a total number of the chain-driving teeth 26 of the bicycle sprocket 12. In this embodiment, a total number of the plurality of chain-driving teeth is 36, and a total number of the plurality of additional chain-driving teeth 36 is 24. However, the combination of the total number of the chain-driving teeth and the total number of the additional chain-driving teeth is not limited to this embodiment. For example, the total number of the plurality of chain-driving teeth 26 can be 40, and the total number of the plurality of additional chain-driving teeth 36 can be 28. Furthermore, the total number of the plurality of chain-driving teeth 26 can be 52, and the total number of the plurality of additional chain-driving teeth 36 can be 32.

Figure 9:
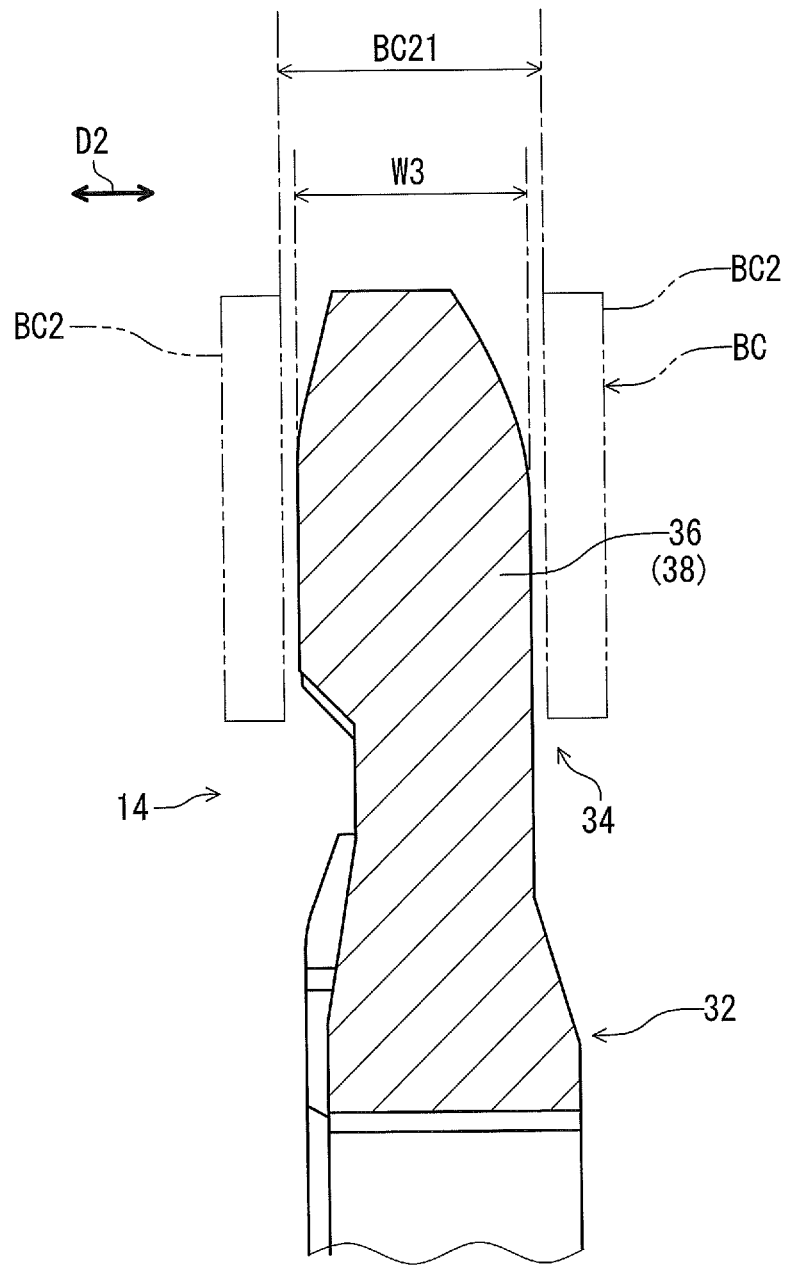
FIG. 9 is a cross-sectional view of the bicycle sprocket taken along line IX-IX of FIG. 8.
Figure 10:
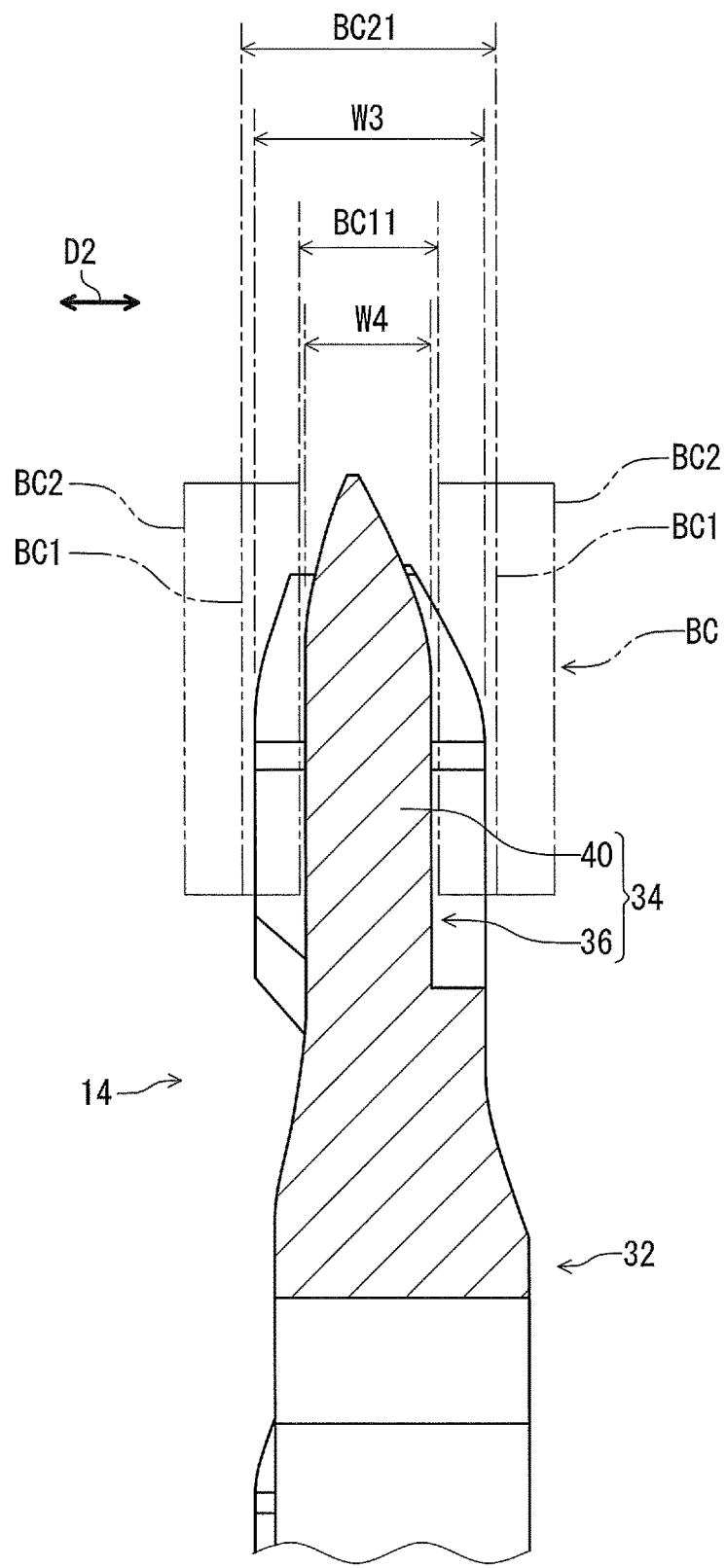
FIG. 10 is a cross-sectional view of the bicycle sprocket taken along line X-X of FIG. 8.

As seen in FIG. 9, the at least one first additional tooth 38 has a third chain engaging width W3. The third chain engaging width W3 is defined in the axial direction D2. Each of the first additional teeth 38 has the third chain engaging width W3. As seen in FIG. 10, the at least one second additional tooth 40 has a fourth chain engaging width W4. The fourth chain engaging width W4 is defined in the axial direction D2. Each of the second additional teeth 40 has the fourth chain engaging width W4. As seen in FIGS. 9 and 10, the third chain engaging width W3 is larger than an inner link space BC11 defined between an opposed pair of inner link plates BC1 of the bicycle chain BC and is smaller than an outer link space BC21 defined between an opposed pair of outer link plates BC2 of the bicycle chain BC. The fourth chain engaging width W4 is smaller than the inner link space BC11.

As seen in FIG. 5, the chain engagement structure 24 includes at least one downshifting facilitation area 42 to facilitate a downshifting operation from the bicycle sprocket 12 to the smaller sprocket 14. In this embodiment, the chain engagement structure 24 includes a plurality of downshifting facilitation areas 42 to facilitate the downshifting operation from the bicycle sprocket 12 to the smaller sprocket 14.

The chain engagement structure 24 includes at least one downshifting facilitation projection 44 disposed in the at least one downshifting facilitation area 42 to engage with the bicycle chain BC when the bicycle chain BC shifts from the bicycle sprocket 12 toward the smaller sprocket 14. In this embodiment, the chain engagement structure 24 includes a plurality of downshifting facilitation projections 44 respectively disposed in the downshifting facilitation areas 42 to engage with the bicycle chain BC when the bicycle chain BC shifts from the bicycle sprocket 12 toward the smaller sprocket 14. The downshifting facilitation projections 44 are secured to the sprocket body 22 via a fastening structure such as a rivet.

The downshifting facilitation projection 44 is disposed closer to one of the first teeth 28 than to the second teeth 30. However, the downshifting facilitation projection 44 can be disposed closer to one of the second teeth 30 than to the first teeth 28. While the downshifting facilitation projections 44 are separate members from the chain-driving teeth 26 in this embodiment, at least one of the downshifting facilitation projections 44 can be integrally provided with chain-driving teeth 26 as a one-piece unitary member.

The chain engagement structure 24 includes at least one upshifting facilitation area 46 to facilitate an upshifting operation from the smaller sprocket 14 to the bicycle sprocket 12. In this embodiment, the chain engagement structure 24 includes a plurality of upshifting facilitation areas 46 to facilitate the upshifting operation from the smaller sprocket 14 to the bicycle sprocket 12.

The chain engagement structure 24 includes at least one upshifting facilitation projection 48 disposed in the at least one upshifting facilitation area 46 to engage with the bicycle chain BC when the bicycle chain BC shifts from the smaller sprocket 14 toward the bicycle sprocket 12. In this embodiment, the chain engagement structure 24 includes a plurality of upshifting facilitation projections 48 disposed in the upshifting facilitation areas 46 to engage with the bicycle chain BC when the bicycle chain BC shifts from the smaller sprocket 14 toward the bicycle sprocket 12. The upshifting facilitation projections 48 are secured to the sprocket body 22 via a fastening structure such as a rivet.

The upshifting facilitation projection 48 is disposed closer to one of the first teeth 28 than to the second teeth 30. However, the upshifting facilitation projection 48 can be disposed closer to one of the second teeth 30 than to the first teeth 28. While the upshifting facilitation projections 48 are separate members from the chain-driving teeth 26 in this embodiment, at least one of the upshifting facilitation projections 48 can be integrally provided with chain-driving teeth 26 as a one-piece unitary member.

The sprocket body 22 includes side recesses 49 to reduce interference between the sprocket body 22 and the bicycle chain BC and to guide the bicycle chain BC toward sprocket teeth of the bicycle sprocket 12 during the upshifting operation. The upshifting facilitation projection 48 is provided between the side recess 49 and the downshifting facilitation projection 44 in the circumferential direction D1 defined about the rotational center axis A1.

The at least one downshifting facilitation area 42 at least partly overlaps with the at least one upshifting facilitation area 46 in the circumferential direction D1 defined about the rotational center axis A1. In this embodiment, the downshifting facilitation areas 42 at least partly overlap with the upshifting facilitation areas 46 in the circumferential direction D1, respectively.

As seen in FIG. 5, the at least one downshifting facilitation area 42 defines a first circumferential region CR1 about the rotational center axis A1. The at least one upshifting facilitation area 46 defines a second circumferential region CR2 about the rotational center axis A1. The first circumferential region CR1 and the second circumferential region CR2 are provided to at least partly overlap with each other in the circumferential direction D1 defined about the rotational center axis A1.

In this embodiment, one of the first circumferential region CR1 and the second circumferential region CR2 is entirely provided within the other of the first circumferential region CR1 and the second circumferential region CR2. The first circumferential region CR1 is entirely provided within the second circumferential region CR2. However, the first circumferential region CR1 can be partly provided within the second circumferential region CR2. The second circumferential region CR2 can be partly provided within the first circumferential region CR1. The second circumferential region CR2 can be entirely provided within the first circumferential region CR1. Each of the first circumferential region CR1 and the second circumferential region CR2 is defined based on tooth bottoms provided between the chain-driving teeth 26.

As seen in FIG. 2, the bicycle sprocket 12 has dead centers DC1 and DC2. The dead center DC2 is disposed opposite the dead center DC1 relative to the rotational center axis A1. The right crank arm CA2 has a center line CL1 extending from the rotational center axis A1. The left crank arm CA3 has a center line CL2 extending from the rotational center axis A1. The dead center DC1 is disposed on the center line CL1 of the right crank arm CA2 when viewed from the axial direction D2. The dead center DC2 is disposed on the center line CL2 of the left crank arm CA3 when viewed from the axial direction D2.

As seen in FIG. 5, the at least one downshifting facilitation area 42 is provided at or close to the dead center DC1 or DC2 of the bicycle sprocket 12. The at least one downshifting facilitation area 42 is preferably provided on an upstream side relative to the dead center DC1 or DC2 in the rotational driving direction D11 of the bicycle sprocket 12.

The downshifting facilitation areas 42 are respectively provided at or close to the dead centers DC1 and DC2 of the bicycle sprocket 12. The downshifting facilitation areas 42 are preferably respectively provided on the upstream side relative to the dead centers DC1 and DC2 in the rotational driving direction D11 of the bicycle sprocket 12.

The first circumferential region CR1 is provided at or close to the dead center DC1 or DC2 of the bicycle sprocket 12. In this embodiment, the first circumferential region CR1 is provided at the dead center DC1 or DC2 of the bicycle sprocket 12 when viewed from the axial direction D2. One end of the first circumferential region CR1 coincides with the dead center DC1 or DC2 when viewed from the axial direction D2.

As seen in FIG. 5, the at least one upshifting facilitation area 46 is provided at or close to the dead center DC1 or DC2 of the bicycle sprocket 12. The at least one upshifting facilitation area 46 is preferably provided on an upstream side relative to the dead center DC1 or DC2 in the rotational driving direction D11 of the bicycle sprocket 12.

The upshifting facilitation areas 46 are respectively provided at or close to the dead centers DC1 and DC2 of the bicycle sprocket 12. The upshifting facilitation areas 46 are respectively provided at the dead centers DC1 and DC2 in the rotational driving direction D11 of the bicycle sprocket 12.

The second circumferential region CR2 is provided at or close to the dead center DC1 or DC2 of the bicycle sprocket 12. In this embodiment, the second circumferential region CR2 is provided at the dead center DC1 or DC2 of the bicycle sprocket 12 when viewed from the axial direction D2. The dead centers DC1 and DC2 are provided in the second circumferential region CR2 when viewed from the axial direction D2.

Figure 11:
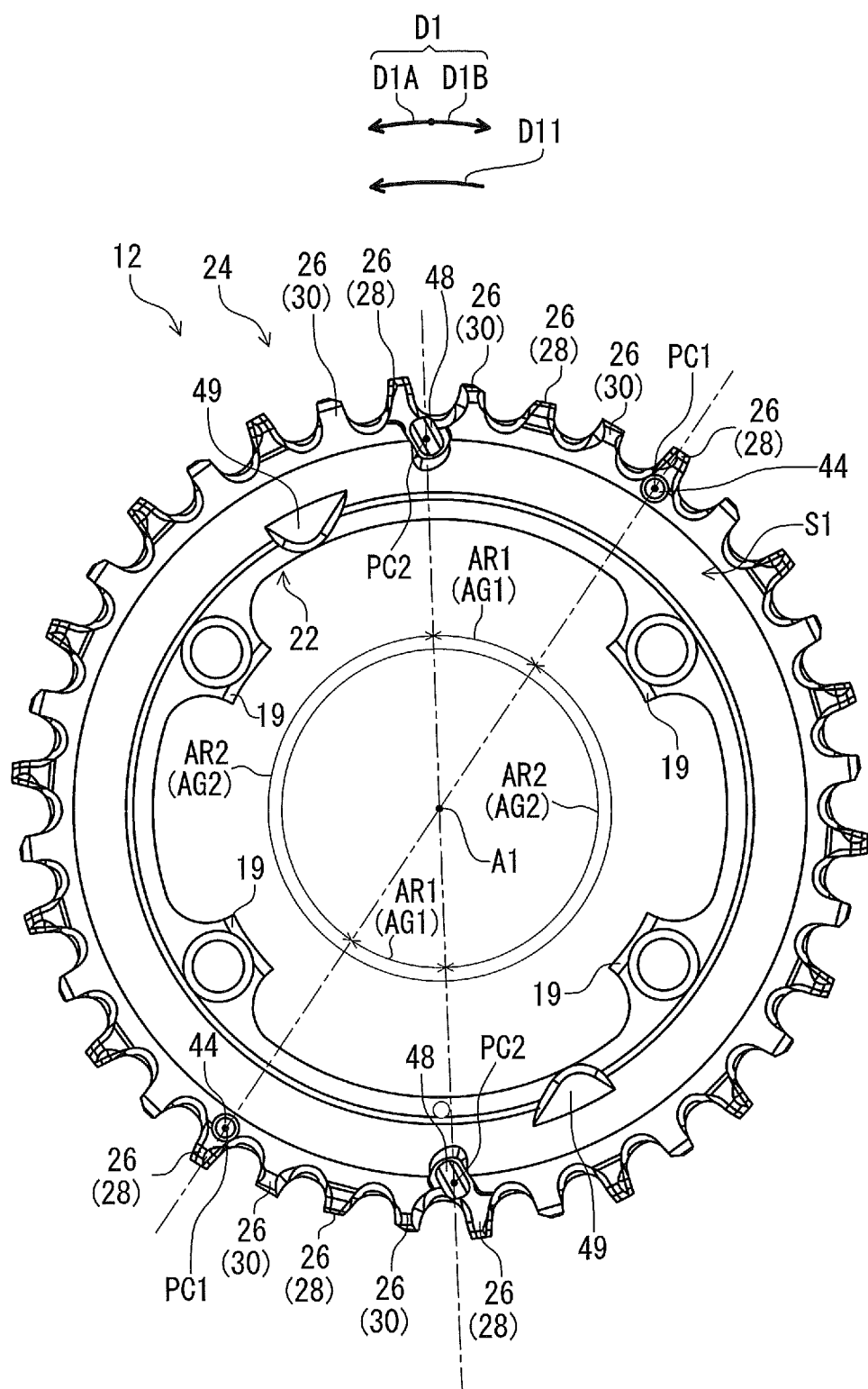
FIG. 11 is a side elevational view of the bicycle sprocket illustrated in FIG. 1.

As seen in FIG. 11, a first area AR1 is defined from one of the at least one downshifting facilitation projection 44 to one of the at least one upshifting facilitation projection 48 in a first circumferential direction D1A defined about the rotational center axis A1. The first area AR1 has a first maximum circumferential angle AG1 defined about the rotational center axis A1. In this embodiment, the first area AR1 is defined from one of the downshifting facilitation projections 44 to one of the upshifting facilitation projections 48 in the first circumferential direction D1A. Specifically, the downshifting facilitation projection 44 includes a downshifting projection center PC1. The upshifting facilitation projection 48 includes an upshifting projection center PC2. The first area AR1 is defined from one of the downshifting projection centers PC1 to one of the upshifting projection centers PC2 in the first circumferential direction D1A.

A second area AR2 is defined from the one of the at least one downshifting facilitation projection 44 to the one of the at least one upshifting facilitation projection 48 in a second circumferential direction D1B. In this embodiment, the second area AR2 is defined from the one of the downshifting facilitation projections 44 to the one of the upshifting facilitation projections 48 in the second circumferential direction D1B. The second circumferential direction D1B is opposite to the first circumferential direction D1A in the circumferential direction D1. Specifically, the second area AR2 is defined from the one of the downshifting projection centers PC1 to the one of the upshifting projection centers PC2 in the second circumferential direction D1B. The second area AR2 has a second maximum circumferential angle AG2 defined about the rotational center axis A1.

The first maximum circumferential angle AG1 is smaller than the second maximum circumferential angle AG2. In this embodiment, the plurality of chain-driving teeth 26 includes three teeth 26 disposed in the first area AR1. The three teeth 26 are entirely disposed in the first area AR1. The three teeth 26 includes one of the first teeth 28 and two of the second teeth 30. However, the three teeth 26 can include two of the first teeth 28 and one of the second teeth 30.

Figure 12:
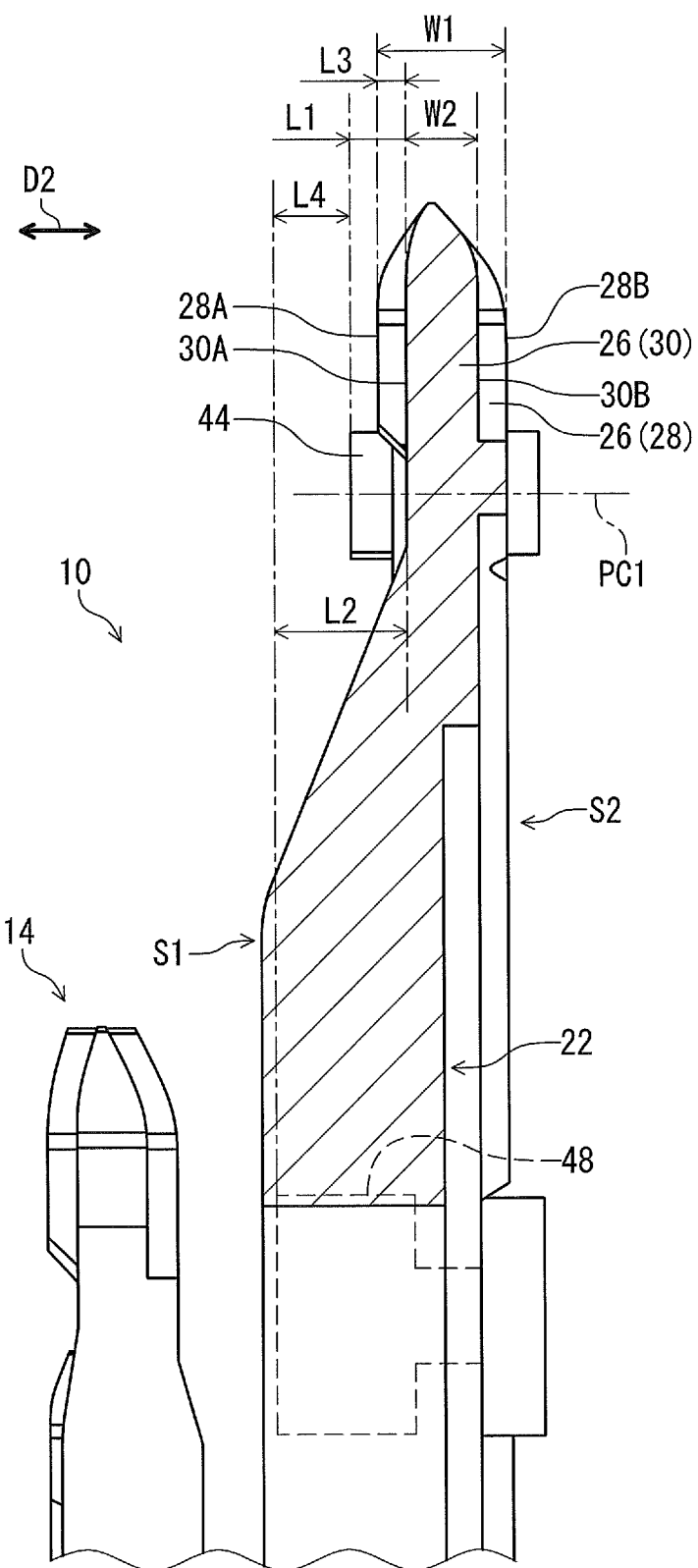
FIG. 12 is a cross-sectional view of the bicycle sprocket assembly taken along line XII-XII of FIG. 2.

As seen in FIG. 12, the sprocket body 22 defines a first axial side S1 (FIG. 4) and a second axial side S2 (FIG. 3) opposite to the first axial side S1 in the axial direction D2 parallel to the rotational center axis A1. The smaller sprocket 14 is adjacent to the first axial side S1 of the sprocket body 22 in the axial direction D2.

The at least one downshifting facilitation projection 44 is provided on the first axial side S1. The at least one downshifting facilitation projection 44 has a first axial length L1 defined in the axial direction D2 parallel to the rotational center axis A1. In this embodiment, each of the downshifting facilitation projections 44 has the first axial length L1. The first axial length L1 is defined from the second axial end 30A of the second tooth 30 in the axial direction D2.

Figure 13:
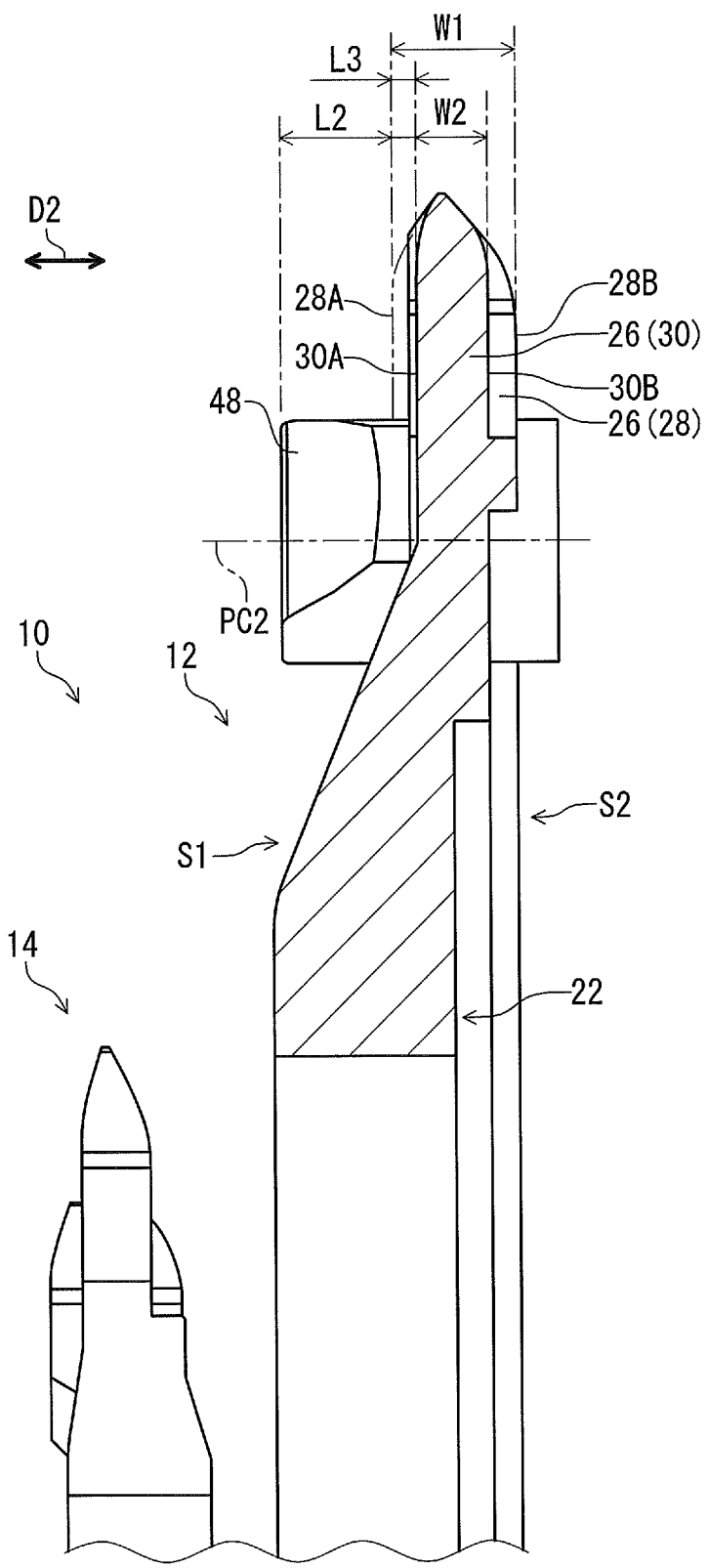
FIG. 13 is a cross-sectional view of the bicycle sprocket assembly taken along line XIII-XIII of FIG. 2.

As seen in FIG. 13, the at least one upshifting facilitation projection 48 is provided on the first axial side S1. The at least one upshifting facilitation projection 48 has a second axial length L2 (an axial length) defined in the axial direction D2. In this embodiment, each of the upshifting facilitation projections 48 has the second axial length L2. The second axial length L2 is defined from the second axial end 30A of the second tooth 30 in the axial direction D2. The second axial length L2 can also be referred to as an axial length L2.

As seen in FIG. 12, the first axial length L1 is different from the second axial length L2. The first axial length L1 is smaller than the second axial length L2. However, the first axial length L1 can be equal to or larger than the second axial length L2.

In this embodiment, the first axial length L1 is equal to or smaller than 1.9 mm. The second axial length (the axial length) L2 is equal to or larger than 2.0 mm. The second axial length (the axial length) L2 is equal to or larger than 2.5 mm. The second axial length (the axial length) L2 is equal to or larger than 3.0 mm. The second axial length (the axial length) L2 is equal to or larger than 3.5 mm. The second axial length (the axial length) L2 is equal to or smaller than 4.0 mm. However, each of the first axial length L1 and the second axial length L2 is not limited to the above lengths.

The first axial length L1 of the at least one downshifting facilitation projection 44 is larger than an axial distance L3 defined between the first axial end 28A of the at least one first tooth 28 and the second axial end 30A of the at least one second tooth 30 in the axial direction D2 on the first axial side S1. In this embodiment, the first axial length L1 of each of the downshifting facilitation projections 44 is larger than the axial distance L3 defined between the first axial end 28A of the at least one first tooth 28 and the second axial end 30A of the at least one second tooth 30 in the axial direction D2 on the first axial side S1.

As seen in FIG. 13, the axial length L2 of the at least one upshifting facilitation projection 48 is larger than the axial distance L3 defined between the first axial end 28A of the at least one first tooth 28 and the second axial end 30A of the at least one second tooth 30 in the axial direction D2 on the first axial side S1. In this embodiment, the axial length L2 of each of the upshifting facilitation projections 48 is larger than the axial distance L3 defined between the first axial end 28A of the at least one first tooth 28 and the second axial end 30A of the at least one second tooth 30 in the axial direction D2 on the first axial side S1.

Furthermore, as seen in FIG. 12, a difference L4 defined between the first axial length L1 and the second axial length L2 is larger than the axial distance L3. However, the difference L4 can be equal to or smaller than the axial distance L3.

Figure 14:
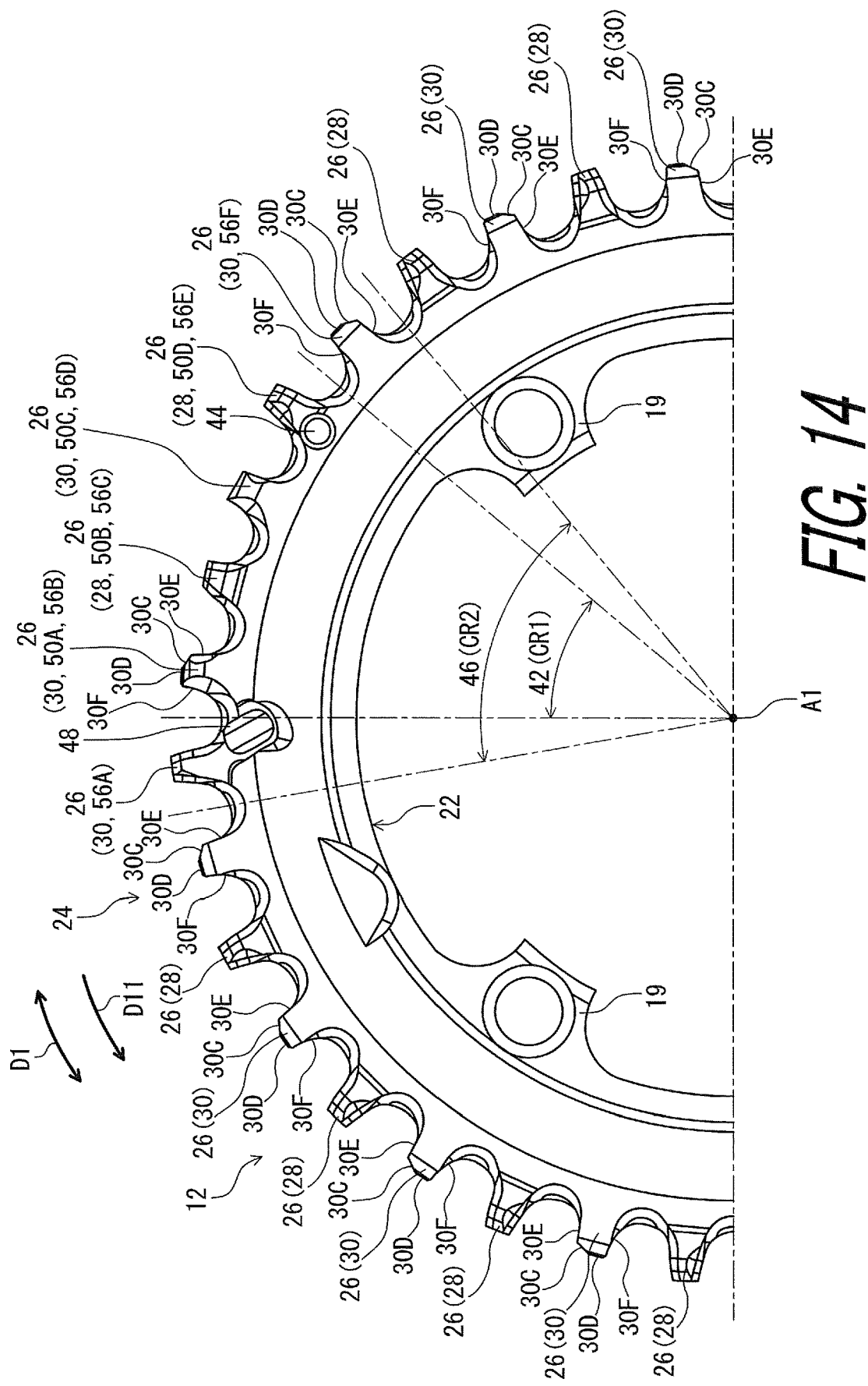
FIG. 14 is a partial side elevational view of the bicycle sprocket illustrated in FIG. 1.

As seen in FIG. 14, the plurality of chain-driving teeth 26 includes at least one downshifting facilitation tooth provided in the at least one downshifting facilitation area 42. In this embodiment, the plurality of chain-driving teeth 26 includes a plurality of downshifting facilitation teeth 50A, 50B, 50C, and 50D provided in each of the downshifting facilitation areas 42. The downshifting facilitation teeth 50A, 50B, 50C, and 50D are arranged in this order from a downstream side to an upstream side of the rotational driving direction D11. The downshifting facilitation tooth 50D is the first tooth 28 closest to the downshifting facilitation projection 44 among the first teeth 28.

Figure 15:
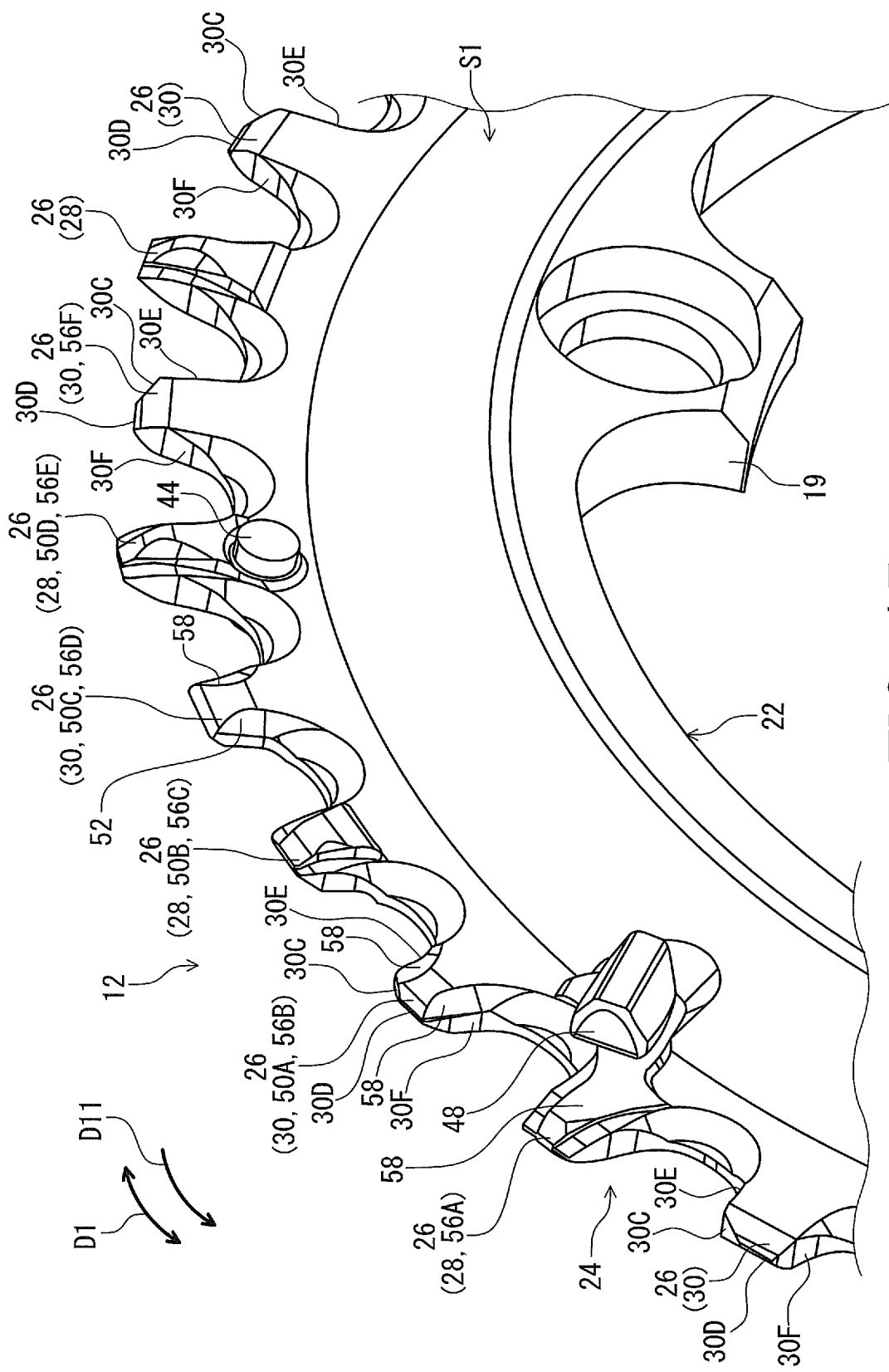
FIG. 15 is a partial perspective view of the bicycle sprocket illustrated in FIG. 1.

As seen in FIG. 15, at least one of the at least one downshifting facilitation tooth 50A, 50B, 50C, and/or 50D includes a first downshifting facilitation chamfer 52. The first downshifting facilitation chamfer 52 is provided on one of the first axial side S1 and the second axial side S2 to facilitate the downshifting operation from the bicycle sprocket 12 to the smaller sprocket 14.

In this embodiment, the downshifting facilitation tooth 50C includes the first downshifting facilitation chamfer 52. The first downshifting facilitation chamfer 52 is provided on the first axial side S1 to facilitate the downshifting operation from the bicycle sprocket 12 to the smaller sprocket 14. The first downshifting facilitation chamfer 52 is to guide the bicycle chain BC toward the smaller sprocket 14 to facilitate engagement of the bicycle chain BC with one of sprocket teeth of the smaller sprocket 14 during a downshifting operation.

Figure 16:
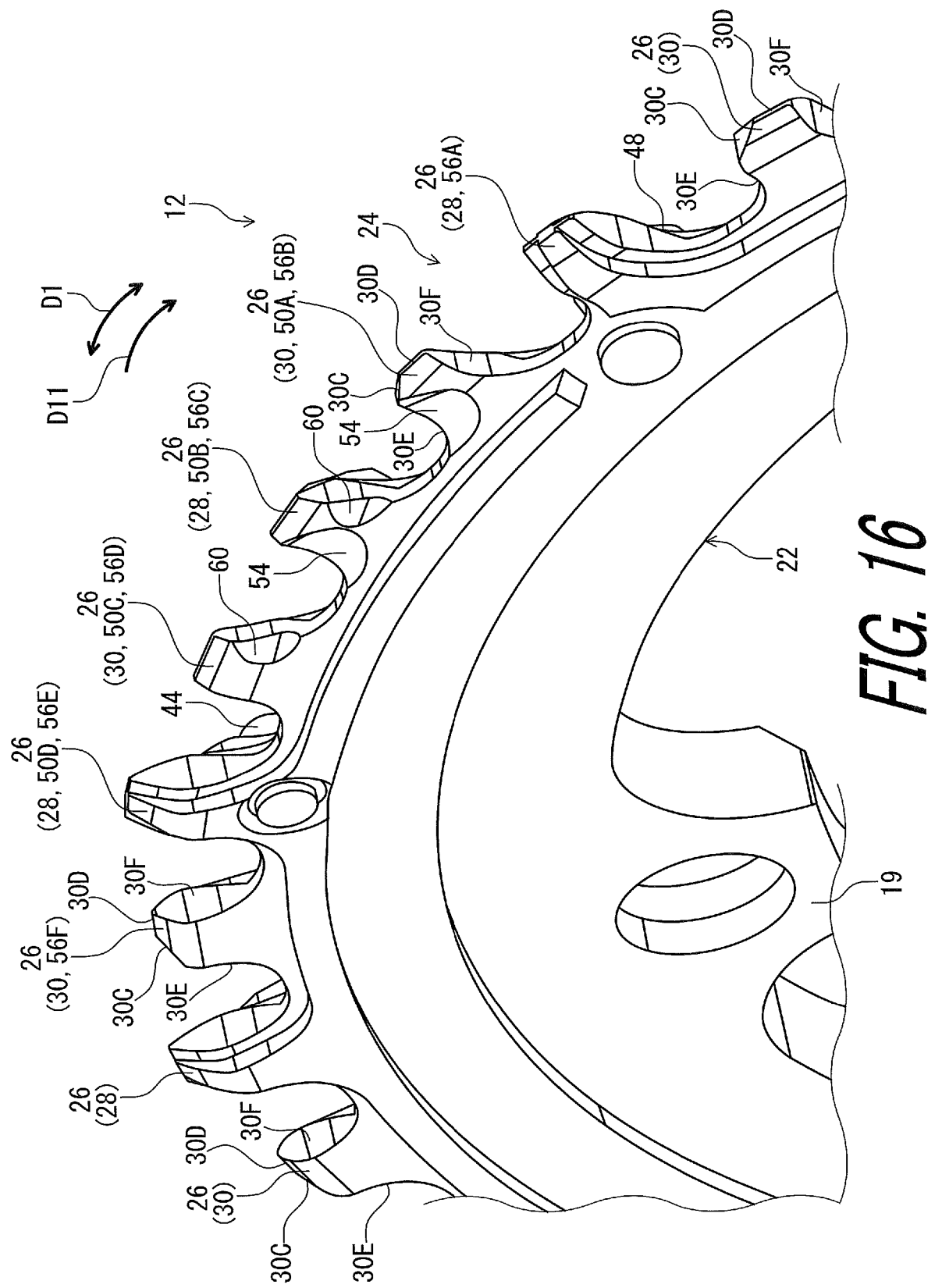
FIG. 16 is another partial perspective view of the bicycle sprocket illustrated in FIG. 1.

As seen in FIG. 16, at least one of the at least one downshifting facilitation tooth 50A, 50B, 50C, and/or 50D includes a second downshifting facilitation chamfer 54. The second downshifting facilitation chamfer 54 is provided on the other of the first axial side S1 and the second axial side S2 to facilitate the downshifting operation from the bicycle sprocket 12 to the smaller sprocket 14.

In this embodiment, each of the downshifting facilitation teeth 50A and 50B includes the second downshifting facilitation chamfer 54. The second downshifting facilitation chamfer 54 is provided on the second axial side S2 to facilitate the downshifting operation from the bicycle sprocket 12 to the smaller sprocket 14. The second downshifting facilitation chamfer 54 is to guide the bicycle chain BC toward the smaller sprocket 14 to facilitate engagement of the bicycle chain BC with one of sprocket teeth of the smaller sprocket 14 during a downshifting operation.

As seen in FIG. 14, the plurality of chain-driving teeth 26 includes at least one upshifting facilitation tooth provided in the at least one upshifting facilitation area 46. In this embodiment, the plurality of chain-driving teeth 26 includes a plurality of upshifting facilitation teeth 56A, 56B, 56C, 56D, 56E, and 56F provided in each of the upshifting facilitation areas 46. The upshifting facilitation teeth 56A, 56B, 56C, 56D, 56E, and 56F are arranged in this order from a downstream side to an upstream side of the rotational driving direction D11. The upshifting facilitation tooth 56A is the first tooth 28 closest to the upshifting facilitation projection 48 among the first teeth 28. The upshifting facilitation teeth 56B, 56C, 56D, and 56E are respectively the downshifting facilitation teeth 50A, 50B, 50C, and 50D. The total number of the upshifting facilitation tooth is not limited to this embodiment. For example, the tooth 56F can be a chain-driving tooth, and the tooth 56E can be a downshifting facilitation tooth only.

As seen in FIG. 15, at least one of the at least one upshifting facilitation tooth 56A, 56B, 56C, 56D, 56E, and/or 56F includes a first upshifting facilitation chamfer 58. The first upshifting facilitation chamfer 58 is provided on one of the first axial side S1 and the second axial side S2 to facilitate the upshifting operation from the smaller sprocket 14 to the bicycle sprocket 12.

In this embodiment, each of the upshifting facilitation teeth 56A, 56B, and 56D includes the first upshifting facilitation chamfer 58. The first upshifting facilitation chamfer 58 is provided on the first axial side S1 to facilitate the upshifting operation from the smaller sprocket 14 to the bicycle sprocket 12. The first upshifting facilitation chamfer 58 is to avoid excessive interference with the bicycle chain BC so as to facilitate engagement of the bicycle chain BC with one of the upshifting facilitation teeth 56A, 56B, and 56D during an upshifting operation.

As seen in FIG. 16, at least one of the at least one upshifting facilitation tooth 56A, 56B, 56C, 56D, 56E, and/or 56F includes a second upshifting facilitation chamfer 60. The second upshifting facilitation chamfer 60 is provided on the other of the first axial side S1 and the second axial side S2 to facilitate the upshifting operation from the smaller sprocket 14 to the bicycle sprocket 12.

In this embodiment, each of the upshifting facilitation teeth 56C and 56D includes the second upshifting facilitation chamfer 60. The second upshifting facilitation chamfer 60 is provided on the second axial side S2 to facilitate the upshifting operation from the smaller sprocket 14 to the bicycle sprocket 12. The second upshifting facilitation chamfer 60 is to avoid excessive interference with the bicycle chain BC so as to facilitate engagement of the bicycle chain BC with one of the upshifting facilitation teeth 56C and 56D during the upshifting operation.

The upshifting facilitation teeth 56E and 56F are to further catch the bicycle chain BC after the bicycle chain BC comes into engagement with the upshifting facilitation teeth 56A to 56D during the upshifting operation. In other words, the upshifting facilitation teeth 56E and 56F are to complete the upshifting operation.

Figure 18:
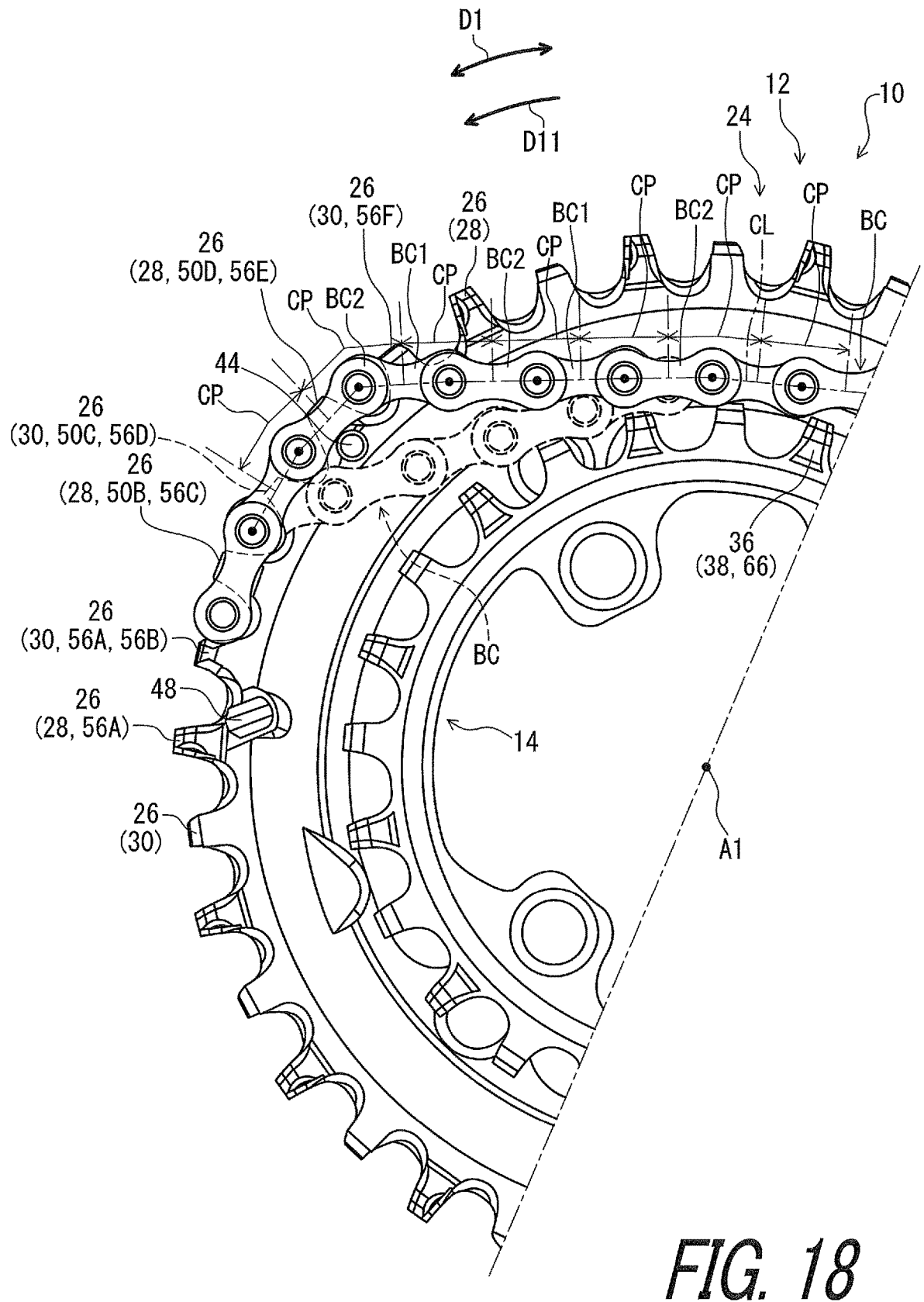
FIG. 18 is a partial side elevational view of the bicycle sprocket assembly illustrated in FIG. 1 with the bicycle chain.

As seen in FIG. 18, the plurality of chain-driving teeth 26 includes a downshifting derailing tooth 50C to first derail the bicycle chain BC from the bicycle sprocket 12 during the downshifting operation. In this embodiment, the plurality of chain-driving teeth 26 includes downshifting derailing teeth 50C to first derail the bicycle chain BC from the bicycle sprocket 12 during the downshifting operation. As seen in FIG. 5, the downshifting derailing teeth 50C are respectively disposed in the downshifting facilitation areas 42. The at least one second tooth 30 includes the downshifting derailing tooth 50C. In this embodiment, the plurality of second teeth 30 includes the downshifting derailing teeth 50C. However, the at least one first tooth 28 can include the downshifting derailing tooth 50C. A tooth top of the downshifting derailing tooth 50C may be offset in the axial direction D2 with respect to an axial center of a maximum axial width of the downshifting derailing tooth 50C toward an opposite side of the smaller sprocket 14. This effectively facilitates derailing of the bicycle chain BC from the downshifting derailing tooth 50C during the downshifting operation. Thus, it is possible to more certainly complete the downshifting operation.

As seen in FIG. 18, the plurality of chain-driving teeth 26 includes an upshifting receiving tooth 56C to first receive the bicycle chain BC during the upshifting operation. In this embodiment, the plurality of first teeth 28 includes the upshifting receiving teeth 56C. As seen in FIG. 5, the upshifting receiving teeth 56C are disposed in the upshifting facilitation areas 46. The at least one first tooth 28 includes the upshifting receiving tooth 56C to first receive the bicycle chain BC during the upshifting operation. In this embodiment, the plurality of first teeth 28 includes the upshifting receiving teeth 56C to first receive the bicycle chain BC during the upshifting operation. However, the at least one second tooth 30 can include the upshifting receiving tooth 56C. A tooth top of the upshifting receiving tooth 56C may be offset in the axial direction D2 with respect to an axial center of a maximum axial width of the upshifting receiving tooth 56C toward the smaller sprocket 14. This effectively facilitates derailing of the bicycle chain BC from the upshifting receiving tooth 56C during the upshifting operation. Thus, it is possible to more certainly complete the upshifting operation.

As seen in FIG. 18, the smaller sprocket 14 includes a downshifting receiving tooth 66 to first receive the bicycle chain BC during the downshifting operation. The plurality of additional chain-driving teeth 36 includes the downshifting receiving teeth 66 to first receive the bicycle chain BC during the downshifting operation. As seen in FIG. 8, the at least one first additional tooth 38 includes the downshifting receiving tooth 66. The plurality of first additional teeth 38 includes the downshifting receiving teeth 66.

As seen in FIG. 18, the downshifting facilitation projection 44 is disposed at a position such that the downshifting receiving tooth 66 is spaced apart from the downshifting derailing tooth 50C by an uneven number of chain pitch CP of the bicycle chain BC on a chain line CL of the bicycle chain BC during the downshifting operation. The uneven number of chain pitch CP is equal to or smaller than nine. The uneven number of chain pitch CP is equal to or smaller than seven. The uneven number of chain pitch CP is equal to or smaller than five. In this embodiment, the uneven number of chain pitch CP is seven. Specifically, the uneven number of chain pitch CP is approximately five. However, the uneven number of chain pitch CP is not limited to this embodiment. The chain line CL is defined by connecting pivot centers of the bicycle chain BC.

As seen in FIGS. 14 to 16, the at least one second tooth 30 includes a driving facilitation chamfer 30C. In this embodiment, at least one of the second teeth 30 that are disposed outside the at least one upshifting facilitation area 46 and the at least one downshifting facilitation area 42 includes the driving facilitation chamfer 30C. Specifically, each of the second teeth 30 that are disposed outside the at least one upshifting facilitation area 46 and the at least one downshifting facilitation area 42 includes the driving facilitation chamfer 30C. However, at least one of the second teeth 30 that are inside at least one of the at least one upshifting facilitation area 46 and the at least one downshifting facilitation area 42 can include the driving facilitation chamfer 30C. In this embodiment, two of the second teeth 30 that are inside at least one of the at least one upshifting facilitation area 46 and the at least one downshifting facilitation area 42 can include the driving facilitation chamfer 30C. As seen in FIG. 8, the at least one second additional tooth 40 does not include the driving facilitation chamfer 30C.

The driving facilitation chamfer 30C is provided at a radially outermost tooth-tip 30D of the second tooth 30. The second tooth 30 includes a rotational upstream edge 30E and a rotational downstream edge 30F. The rotational upstream edge 30E is disposed to face an upstream side in the rotational driving direction D11. The rotational downstream edge 30F is disposed to face a downstream side in the rotational driving direction D11. The rotational upstream edge 30E is disposed on an upstream side of the rotational downstream edge 30F in the rotational driving direction D11. The driving facilitation chamfer 30C is disposed between the rotational upstream edge 30E and the radially outermost tooth-tip 30D of the second tooth 30. The driving facilitation chamfer 30C includes an inclined surface extending from the radially outermost tooth-tip 30D toward the rotational upstream edge 30E. In this embodiment, the driving facilitation chamfer 30C is disposed only at the rotational upstream edge 30E but is not disposed at the rotational downstream edge 30F. However, the driving facilitation chamfer 30C can be disposed between the rotational downstream edge 30F and the radially outermost tooth-tip 30D in addition to the driving facilitation chamfer 30C of the embodiment. The driving facilitation chamfer 30C can be omitted from the second tooth 30 if needed and/or desired.

The bicycle chain BC is inclined toward the smaller sprocket 14 by the front derailleur (not shown) during the downshifting operation. Therefore, in the downshifting operation, the bicycle chain BC is easy to interfere with the second tooth 30 and unintentionally derailed from the bicycle sprocket 12. However, the driving facilitation chamfer 30C can reduce interference between the bicycle chain BC and the radially outermost tooth-tip 30D of the second tooth 30 (e.g., a radially outer corner of the second tooth 30)

during the downshifting operation. Therefore, the second tooth 30 with the driving facilitation chamfer 30C can be easy to be received in the bicycle chain BC during the downshifting operation. This can reduce the unintentionally derailing of the bicycle chain BC from the bicycle sprocket 12 during the downshifting operation except for the downshifting facilitation area.

The downshifting operation of the bicycle sprocket assembly 10 will be described below referring to FIGS. 17 and 18.

Figure 17:
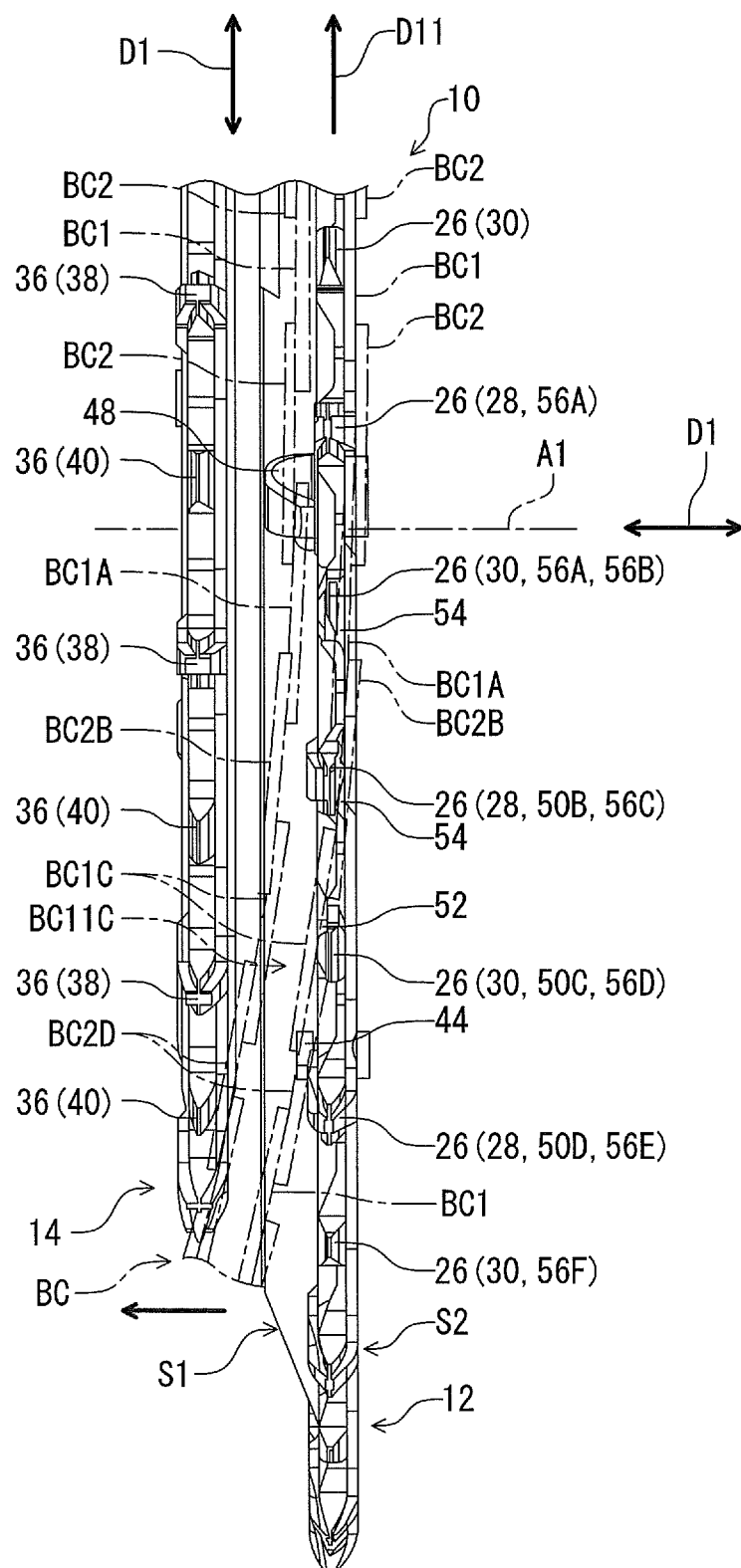
FIG. 17 is a plan view of the bicycle sprocket assembly illustrated in FIG. 1 with a bicycle chain.

As seen in FIG. 17, the bicycle chain BC is shifted from the bicycle sprocket 12 toward the smaller sprocket 14 by the front derailleur (not shown) during the downshifting operation. The second downshifting facilitation chamfer 54 of the downshifting facilitation tooth 50A helps the inner link plates BC1A to be inclined toward the smaller sprocket 14 relative to the axial direction D2. The second downshifting facilitation chamfer 54 of the downshifting facilitation tooth 50B helps the outer link plates BC2B to be inclined toward the smaller sprocket 14 relative to the axial direction D2.

Furthermore, the first downshifting facilitation chamfer 52 of the downshifting facilitation tooth 50C introduces the inner link plate BC1C to a space closer to the smaller sprocket 14 than the downshifting facilitation tooth 50C in the axial direction D2. Thus, the downshifting facilitation tooth 50C is disposed outside the inner link space BC11C during the downshifting operation. The bicycle chain BC is not engaged with the downshifting facilitation teeth 50C and 50D and other chain-driving teeth 26 disposed on the downstream side of the downshifting facilitation tooth 50D. Namely, the downshifting facilitation teeth 50C is a tooth to first release the bicycle chain BC from the bicycle sprocket 12 among the chain-driving teeth 26 during the downshifting operation.

As seen in FIG. 17, an inclined angle of the bicycle chain BC is limited within a small range relative to the bicycle sprocket 12 when viewed in a radial direction of the bicycle sprocket 12.

As seen in FIG. 18, in order to smoothen the downshifting operation from the bicycle sprocket 12 to the smaller sprocket 14, it is preferable to set a chain-downshifting distance defined between the bicycle sprocket and the smaller sprocket as appropriate.

Figure 19:
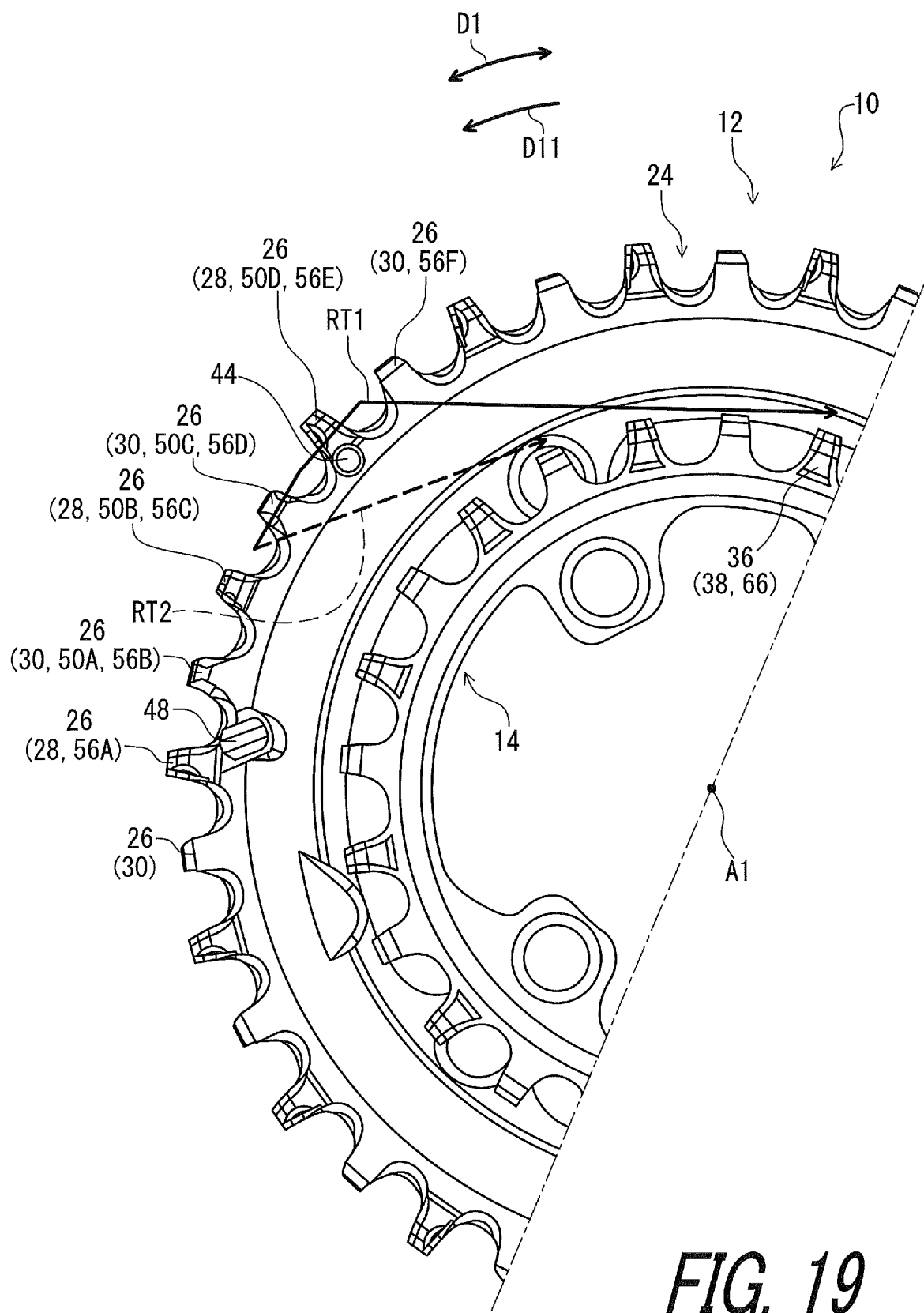
FIG. 19 is a partial side elevational view of the bicycle sprocket assembly illustrated in FIG. 1.

As seen in FIG. 18, in the bicycle sprocket assembly 10, one of the outer link plates BC2D is engaged with the downshifting facilitation projection 44 in a state where the downshifting facilitation tooth 50C is not engaged with the bicycle chain BC. This adjusts (lengthens in this embodiment) a chain-downshifting distance RT1 (FIG. 19) of the bicycle chain BC defined from the bicycle sprocket 12 to the smaller sprocket 14 so that the bicycle chain BC engages with a tooth of the smaller sprocket 14 without undesirably riding on a crest of the tooth of the smaller sprocket 14 in comparison with a chain-downshifting distance RT2 (FIG. 19) in a case where the bicycle sprocket 12 does not include the downshifting facilitation projection 44. Accordingly, it is possible to smoothen the downshifting operation from the bicycle sprocket 12 to the smaller sprocket 14.

The bicycle sprocket assembly 10 and the bicycle sprocket 12 include the following features.

(1) With the bicycle sprocket 12, the at least one downshifting facilitation projection 44 is disposed in the at least one downshifting facilitation area 42 to engage with the bicycle chain BC when the bicycle chain BC shifts from the bicycle sprocket 12 toward the smaller sprocket 14. Accordingly, the at least one downshifting facilitation projection 44 appropriately adjusts the chain-downshifting distance RT1 of the bicycle chain BC defined from the bicycle sprocket 12 to the smaller sprocket 14 during the downshifting operation. Thus, it is possible to smoothen the downshifting operation.

(2) The first chain engaging width W1 is larger than the inner link space BC11 defined between the opposed pair of inner link plates BC1 of the bicycle chain BC and is smaller than an outer link space BC21 defined between an opposed pair of outer link plates BC2 of the bicycle chain BC. The second chain engaging width W2 is smaller than the inner link space BC11. Accordingly, it is possible to prevent the bicycle chain from readily disengaging from the bicycle sprocket 12 except for the upshifting and downshifting operations.

(3) The at least one upshifting facilitation projection 48 is disposed in the at least one upshifting facilitation area 46 to engage with the bicycle chain BC when the bicycle chain BC shifts from the smaller sprocket 14 toward the bicycle sprocket 12. The at least one upshifting facilitation projection 48 lifts the bicycle chain BC from the smaller sprocket 14 to the bicycle sprocket 12 during the upshifting operation. This smoothens the upshifting operation.

(4) The at least one downshifting facilitation area 42 at least partly overlaps with the at least one upshifting facilitation area 46 in a circumferential direction D1 defined about the rotational center axis A1. Accordingly, it is possible to make a total area of the at least one downshifting facilitation area 42 and the at least one upshifting facilitation area 46 smaller in the circumferential direction so that both of the downshifting facilitation area 42 and the upshifting facilitation area 46 can be disposed at an appropriate location.

(5) Since the plurality of chain-driving teeth 26 includes three teeth disposed in the first area AR1, it is possible to make shifting of the bicycle chain BC smoother.

(6) The first axial length L1 is different from the second axial length L2. Accordingly, it is possible to separately set the first axial length L1 and the second axial length L2 to smoothly shift the bicycle chain BC between the bicycle sprocket 12 and the smaller sprocket 14.

(7) The first axial length L1 is smaller than the second axial length L2. Accordingly, it is possible to achieve both of a certainly smooth downshifting operation and a certainly smooth upshifting operation.

(8) The first axial length L1 is equal to or smaller than 1.9 mm. The second axial length L2 is equal to or larger than 2.0 mm. Accordingly, it is possible to achieve both of a certainly smooth downshifting operation and a certainly smooth upshifting operation.

(9) The second axial length (the axial length) L2 is equal to or larger than 2.0 mm. Accordingly, it is possible to certainly bring the at least one upshifting facilitation projection 48 into engagement with the bicycle chain BC when the bicycle chain BC shifts from the smaller sprocket 14 toward the bicycle sprocket 12.

(10) The second axial length (the axial length) L2 is equal to or larger than 2.5 mm. Accordingly, it is possible to more certainly bring the at least one upshifting facilitation projection 48 into engagement with the bicycle chain BC when the bicycle chain BC shifts from the smaller sprocket 14 toward the bicycle sprocket 12.

(11) The second axial length (the axial length) L2 is equal to or larger than 3.0 mm. Accordingly, it is possible to more certainly bring the at least one upshifting facilitation projection 48 into engagement with the bicycle chain BC when the bicycle chain BC shifts from the smaller sprocket 14 toward the bicycle sprocket 12.

(12) The second axial length (the axial length) L2 is equal to or larger than 3.5 mm. Accordingly, it is possible to more certainly bring the at least one upshifting facilitation projection 48 into engagement with the bicycle chain BC when the bicycle chain BC shifts from the smaller sprocket 14 toward the bicycle sprocket 12.

(13) The second axial length (the axial length) L2 is equal to or smaller than 4.0 mm. Accordingly, it is possible to more certainly bring the at least one upshifting facilitation projection 48 into engagement with the bicycle chain BC when the bicycle chain BC shifts from the smaller sprocket 14 toward the bicycle sprocket 12.

(14) The plurality of chain-driving teeth 26 includes at least one downshifting facilitation tooth 50 provided in the at least one downshifting facilitation area 42. Accordingly, it is possible to make shifting of the bicycle chain BC smoother.

(15) At least one of the at least one downshifting facilitation tooth 50 includes the first downshifting facilitation chamfer 52 provided on one of the first axial side S1 and the second axial side S2 to facilitate the downshifting operation from the bicycle sprocket 12 to the smaller sprocket 14. Accordingly, the first downshifting facilitation chamfer 52 reduces unnecessary interference occurring between the at least one downshifting facilitation tooth 50 and the bicycle chain BC when the bicycle chain BC shifts from the bicycle sprocket 12 toward the smaller sprocket 14.

(16) At least one of the at least one downshifting facilitation tooth 50 includes the second downshifting facilitation chamfer 54 provided on the other of the first axial side S1 and the second axial side S2 to facilitate the downshifting operation from the bicycle sprocket 12 to the smaller sprocket 14. Accordingly, the second downshifting facilitation chamfer 54 reduces unnecessary interference occurring between the at least one downshifting facilitation tooth 50 and the bicycle chain BC when the bicycle chain BC shifts from the bicycle sprocket 12 toward the smaller sprocket 14.

(17) The at least one downshifting facilitation area 42 is provided at or close to a dead center DC1 of the bicycle sprocket 12. Accordingly, it is possible to reduce a pedaling force applied from the bicycle chain BC to the at least one downshifting facilitation area 42. This allows the bicycle chain BC to smoothly disengage from the bicycle sprocket 12.

(18) The at least one downshifting facilitation area 42 is provided on an upstream side relative to the dead center DC1 in a rotational driving direction D11 of the bicycle sprocket 12. Accordingly, it is possible to reduce a pedaling force applied from the bicycle chain BC to the at least one downshifting facilitation area 42. This allows the bicycle chain BC to smoothly disengage from the bicycle sprocket 12.

(19) With bicycle sprocket assembly 10, the bicycle sprocket assembly 10 comprises the bicycle sprocket 12, the chain-downshifting distance RT1 of the bicycle chain BC defined from the bicycle sprocket 12 to the smaller sprocket 14 during the downshifting operation is appropriately set by the at least one downshifting facilitation projection 44. Thus, it is possible to smoothen the downshifting operation.

(20) The at least one upshifting facilitation projection 48 is provided on the first axial side S1 and having the axial length L2 defined in the axial direction D2. The axial length L2 of the at least one upshifting facilitation projection 48 is larger than the axial distance L3 defined between the first axial end 28A and the second axial end 30A in the axial direction D2 on the first axial side S1. Thus, the at least one upshifting facilitation projection 48 lifts the bicycle chain BC from the smaller sprocket 14 to the bicycle sprocket 12 during the upshifting operation. This smoothens the upshifting operation. Furthermore, both of the at least one first tooth and the at least one second tooth support the bicycle chain so as to prevent the bicycle chain BC from being unintentionally removed from the bicycle sprocket 12. Accordingly, it is possible to smoothen the upshifting operation with preventing the bicycle chain BC from being unintentionally removed from the bicycle sprocket 12.

(21) The at least one downshifting facilitation projection 44 has the first axial length L1 defined in the axial direction D2 parallel to the rotational center axis A1. The at least one upshifting facilitation projection 48 has the second axial length L2 defined in the axial direction D2. The first axial length L1 is different from the second axial length L2. Accordingly, it is possible to separately set the first axial length L1 and the second axial length L2 to smoothly shift the bicycle chain BC between the bicycle sprocket 12 and the smaller sprocket 14.

(22) The first axial length L1 is smaller than the second axial length L2.

Accordingly, it is possible to achieve both of a certainly smooth downshifting operation and a certainly smooth upshifting operation.

(23) The at least one downshifting facilitation area 42 defines the first circumferential region CR1 about the rotational center axis A1. The at least one upshifting facilitation area 46 defines the second circumferential region CR2 about the rotational center axis A1. The first circumferential region CR1 and the second circumferential region CR2 are provided to at least partly overlap with each other in the circumferential direction D1 defined about the rotational center axis A1. Accordingly, it is possible to make a total area of the at least one downshifting facilitation area 42 and the at least one upshifting facilitation area 46 smaller in the circumferential direction so that both of the downshifting facilitation area 42 and the upshifting facilitation area 46 can be disposed at an appropriate location since the first circumferential region CR1 and the second circumferential region CR2 being provided to at least partly overlap with each other in a circumferential direction D1 defined about the rotational center axis A1. Furthermore, both of the at least one first tooth 28 and the at least one second tooth 30 can prevent the bicycle chain BC from being unintentionally removed from the bicycle sprocket 12. Accordingly, it is possible to make the total area smaller with preventing the bicycle chain BC from being unintentionally removed from the bicycle sprocket 12.

(24) One of the first circumferential region CR1 and the second circumferential region CR2 is entirely provided within the other of the first circumferential region CR1 and the second circumferential region CR2. Accordingly, it is possible to make a total area of the at least one downshifting facilitation area 42 and the at least one upshifting facilitation area 46 much smaller in the circumferential direction so that both of the downshifting facilitation area 42 and the upshifting facilitation area 46 can be disposed at an appropriate location.

(25) The first circumferential region CR1 is entirely provided within the second circumferential region CR2. Accordingly, it is possible to make a total area of the at least one downshifting facilitation area 42 and the at least one upshifting facilitation area 46 much smaller in the circumferential direction so that both of the downshifting facilitation area 42 and the upshifting facilitation area 46 can be disposed at an appropriate location.

(26) The first circumferential region CR1 is provided at or close to the dead center DC1 or DC2 of the bicycle sprocket 12. Accordingly, it is possible to reduce a pedaling force applied from the bicycle chain BC to the at least one downshifting facilitation area 42. This allows the bicycle chain BC to smoothly disengage from the bicycle sprocket 12.

(27) The downshifting facilitation projection 44 is disposed at a position such that the downshifting receiving tooth 66 is spaced apart from the downshifting derailing tooth 50C by an uneven number of chain pitch CP of the bicycle chain BC on the chain line CL of the bicycle chain BC during the downshifting operation. Accordingly, it is possible to smoothly shift the bicycle chain BC from the bicycle sprocket 12 to the smaller sprocket 14. Furthermore, it is possible to derail the bicycle chain BC from the second tooth 30 and to receive the bicycle chain BC with the first tooth 28. This can make the derailing of the bicycle chain BC smooth and the shifting of the bicycle chain BC stable.

(28) Since the uneven number of chain pitch CP is equal to or smaller than nine, it is possible more smoothly shift the bicycle chain BC from the bicycle sprocket 12 to the smaller sprocket 14.

(29) Since the uneven number of chain pitch CP is equal to or smaller than seven, it is possible to more smoothly shift the bicycle chain BC from the bicycle sprocket 12 to the smaller sprocket 14.

(30) Since the uneven number of chain pitch CP is equal to or smaller than five, it is possible to more smoothly shift the bicycle chain BC from the bicycle sprocket 12 to the smaller sprocket 14.

(31) The first chain engaging width W1 is larger than the inner link space defined between the opposed pair of inner link plates BC1 of the bicycle chain BC and is smaller than the outer link space defined between the opposed pair of outer link plates BC2 of the bicycle chain BC. The second chain engaging width W2 is smaller than the inner link space. The third chain engaging width W3 is larger than the inner link space defined between the opposed pair of inner link plates BC1 of the bicycle chain BC and is smaller than the outer link space defined between the opposed pair of outer link plates BC2 of the bicycle chain BC. The fourth chain engaging width W4 is smaller than the inner link space. Accordingly, it is possible to improve chain-holding performance of the smaller sprocket 14.

(32) Since the at least one second tooth 30 includes the downshifting derailing tooth 50C, it is possible to smoothly derail the bicycle chain BC from the bicycle sprocket 12.

(33) The at least one first tooth 28 includes the upshifting receiving tooth 56C to first receive the bicycle chain BC during the upshifting operation. The at least one first additional tooth 38 includes the downshifting receiving tooth 66. Accordingly, it is possible to smoothly derail the bicycle chain BC from the smaller sprocket 14 and to stably complete the upshifting operation since the at least one first tooth 28 first receives the bicycle chain BC.

(34) The total number of the plurality of chain-driving teeth 26 is 36, and the total number of the plurality of additional chain-driving teeth 36 is 24. Accordingly, it is possible to provide one of combinations which are suitable for the certain and quick downshifting operation facilitated by the downshifting facilitation projection 44.

(35) The total number of the plurality of chain-driving teeth 26 is 40, and the total number of the plurality of additional chain-driving teeth 36 is 28. Accordingly, it is possible to provide one of combinations which are suitable for the certain and quick downshifting operation facilitated by the downshifting facilitation projection 44.

(36) The total number of the plurality of chain-driving teeth 26 is 52, and the total number of the plurality of additional chain-driving teeth 36 is 32. Accordingly, it is possible to provide one of combinations which are suitable for the certain and quick downshifting operation facilitated by the downshifting facilitation projection 44.

Second Embodiment

A bicycle sprocket assembly 210 comprising a bicycle sprocket 212 in accordance with a second embodiment will be described below referring to FIGS. 20 to 35. The bicycle sprocket assembly 210 has substantially the same structures as those of the bicycle sprocket assembly 10 except for the bicycle sprocket 12 and the smaller sprocket 14. Thus, elements having substantially the same function as those in the first embodiment will be numbered the same here, and will not be described and/or illustrated again in detail here for the sake of brevity.

Figure 20:
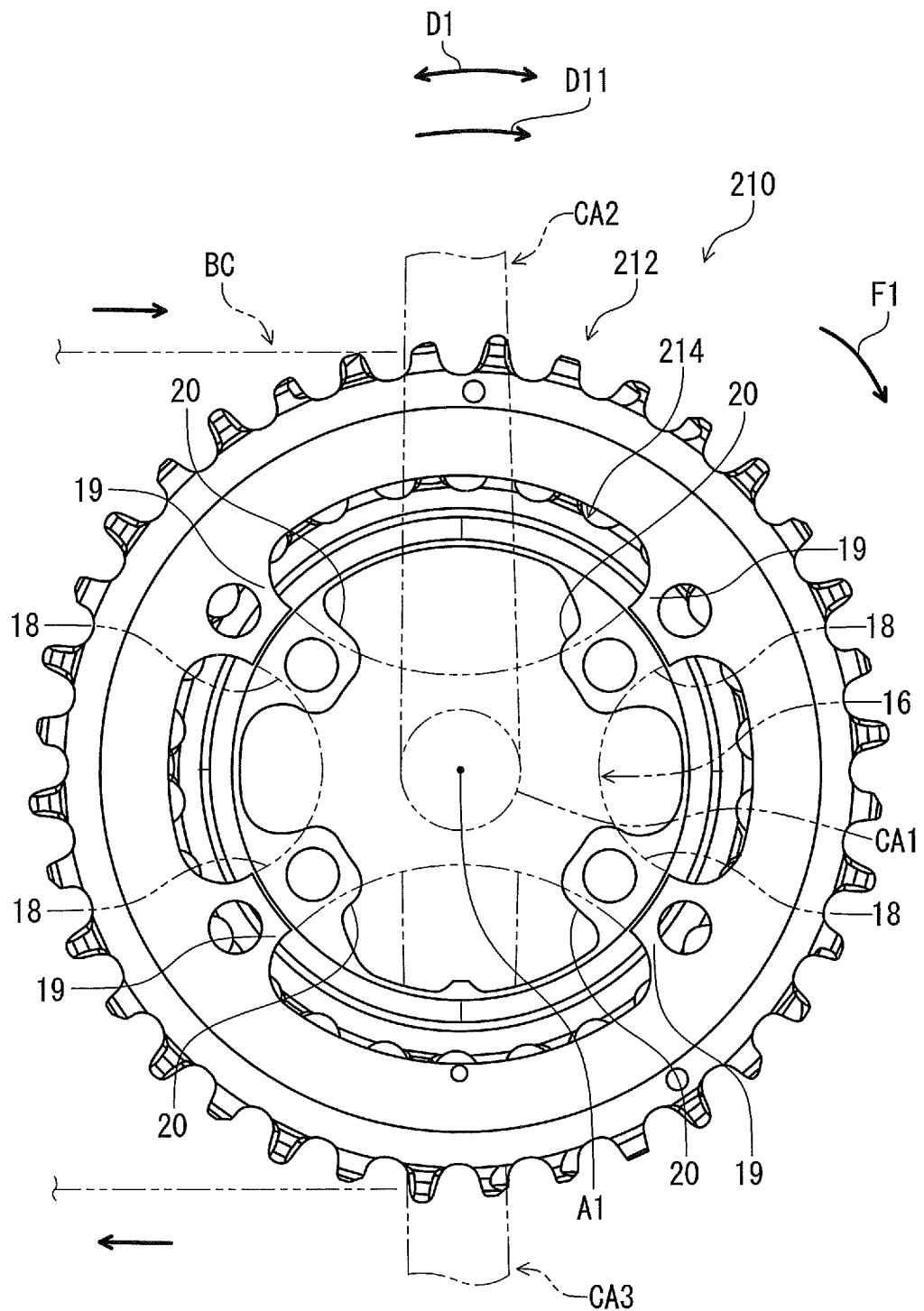
FIG. 20 is a side elevational view of a bicycle sprocket assembly in accordance with a second embodiment.
Figure 21:
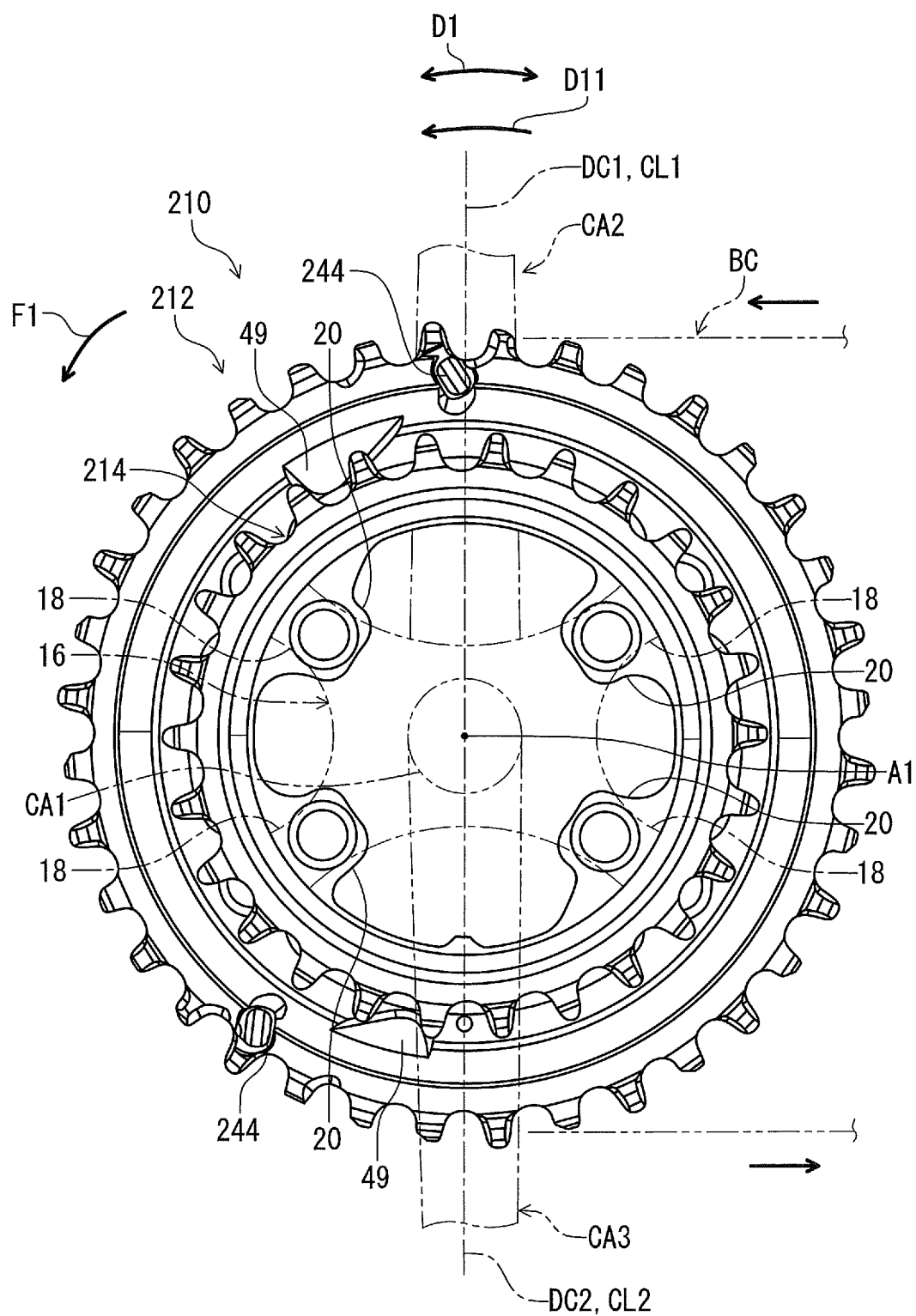
FIG. 21 is another side elevational view of the bicycle sprocket assembly illustrated in FIG. 20.

As seen in FIGS. 20 and 21, the bicycle sprocket assembly 210 comprises the bicycle sprocket 212 and a smaller sprocket 214. The bicycle sprocket 212 has the rotational center axis A1. The bicycle sprocket 212 is rotatable about the rotational center axis A1 in the rotational driving direction D11 during pedaling. The bicycle sprocket assembly 210 is rotatable about the rotational center axis A1.

Figure 22:
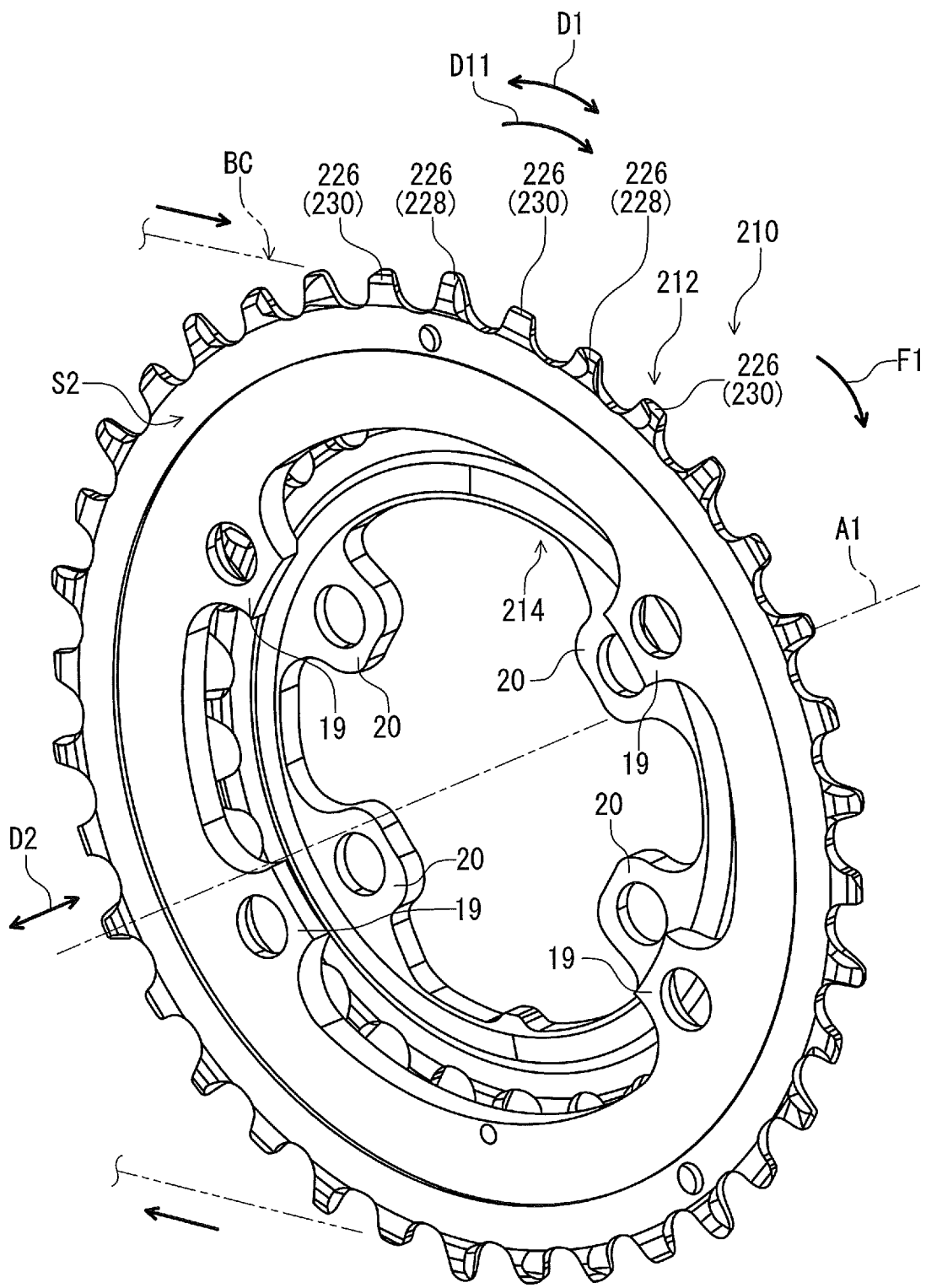
FIG. 22 is a perspective view of the bicycle sprocket assembly illustrated in FIG. 20 with a sprocket mounting member omitted.
Figure 23:
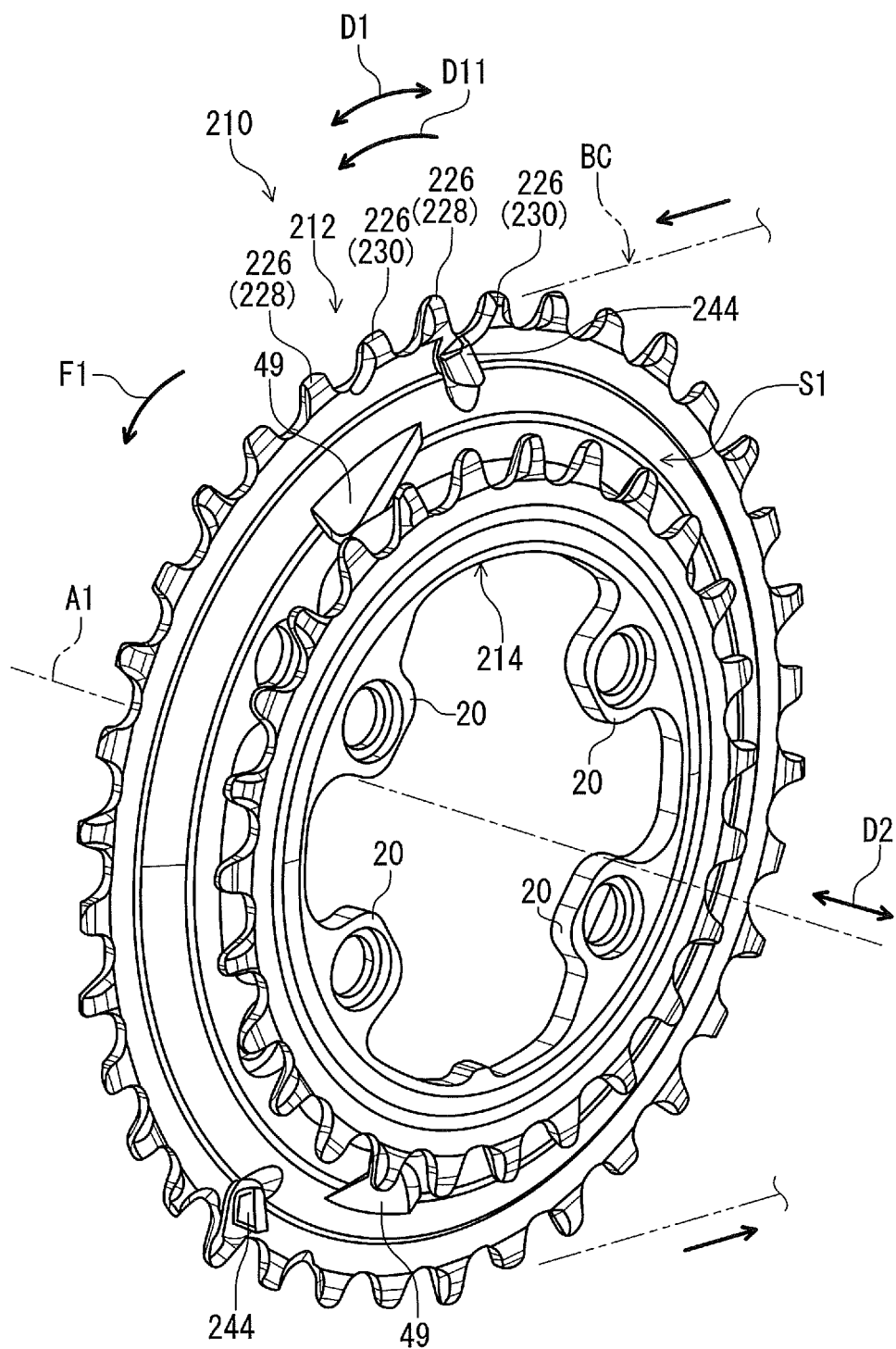
FIG. 23 is another perspective view of the bicycle sprocket assembly illustrated in FIG. 20 with the sprocket mounting member omitted.

As seen in FIGS. 22 and 23, the smaller sprocket 214 is adjacent to the bicycle sprocket 212 without another sprocket between the smaller sprocket 214 and the bicycle sprocket 212. The smaller sprocket 214 is adjacent to the bicycle sprocket 212 in the axial direction D2 parallel to the rotational center axis A1 without another sprocket between the smaller sprocket 214 and the bicycle sprocket 212.

Figure 24:
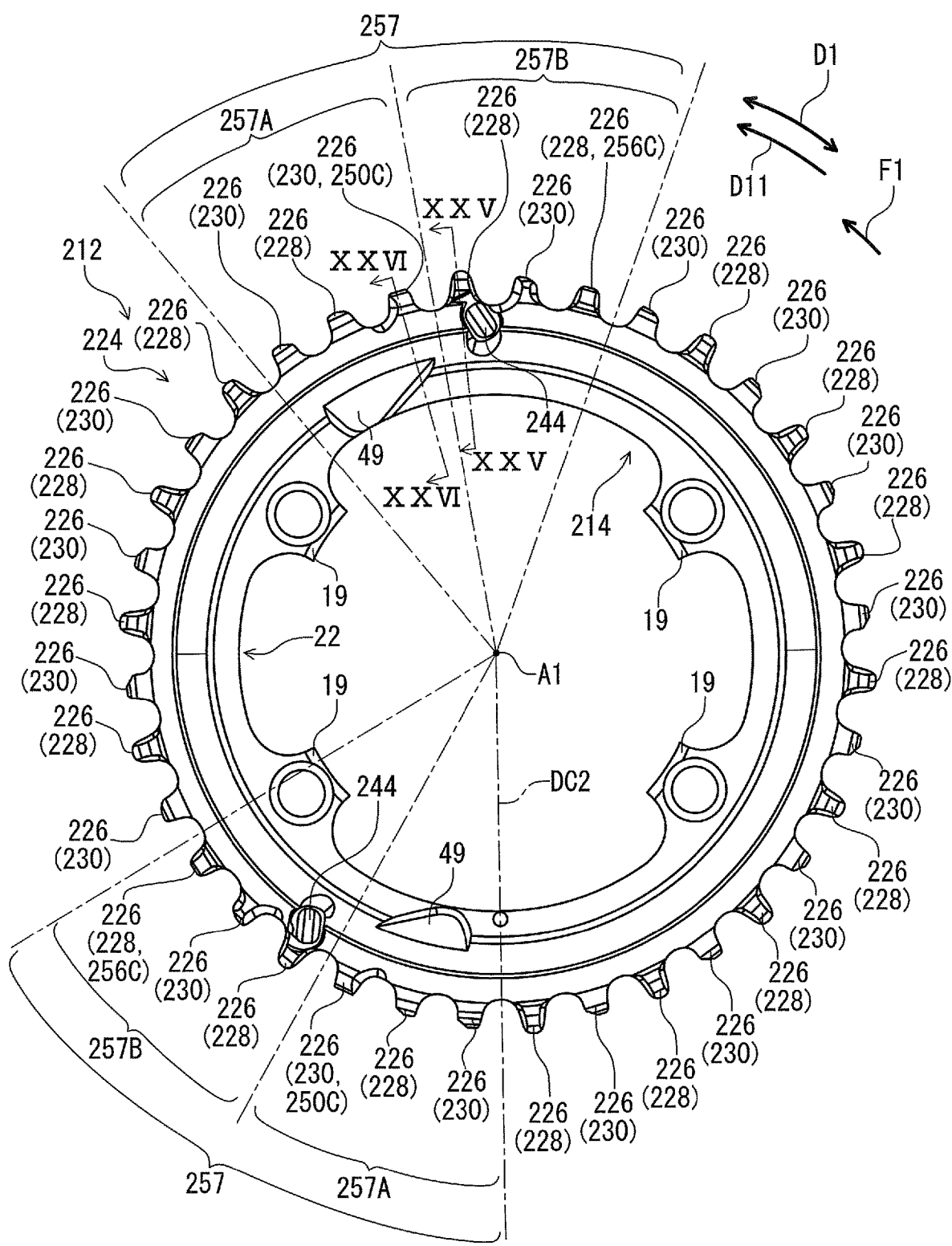
FIG. 24 is a side elevational view of a bicycle sprocket of the bicycle sprocket assembly illustrated in FIG. 20.

As seen in FIG. 24, the bicycle sprocket 212 comprises the sprocket body 22 and a chain engagement structure 224. The chain engagement structure 224 is arranged on the radially outer periphery of the sprocket body 22. The chain engagement structure 224 has substantially the same structure as that of the chain engagement structure 24 of the first embodiment. In this embodiment, the chain engagement structure 224 includes a plurality of chain-driving teeth 226 to engage with the bicycle chain BC to transmit the rotational driving force F1 to the bicycle chain BC.

The plurality of chain-driving teeth 226 includes at least one first tooth 228 and at least one second tooth 230. In this embodiment, the plurality of chain-driving teeth 226 includes a plurality of first teeth 228 and a plurality of second teeth 230. Preferably, the first teeth 228 and the second teeth 230 are alternately arranged in the circumferential direction D1 of the bicycle sprocket 212.

Figure 25:
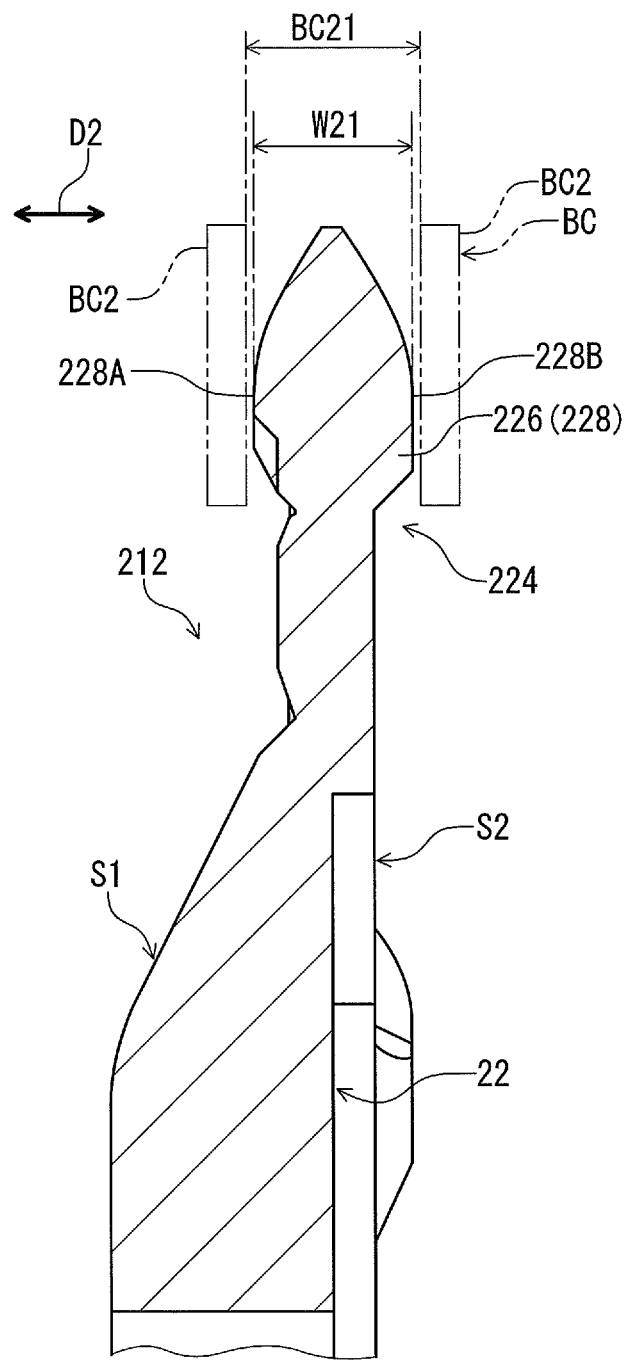
FIG. 25 is a cross-sectional view of the bicycle sprocket taken along line XXV-XXV of FIG. 24.
Figure 26:
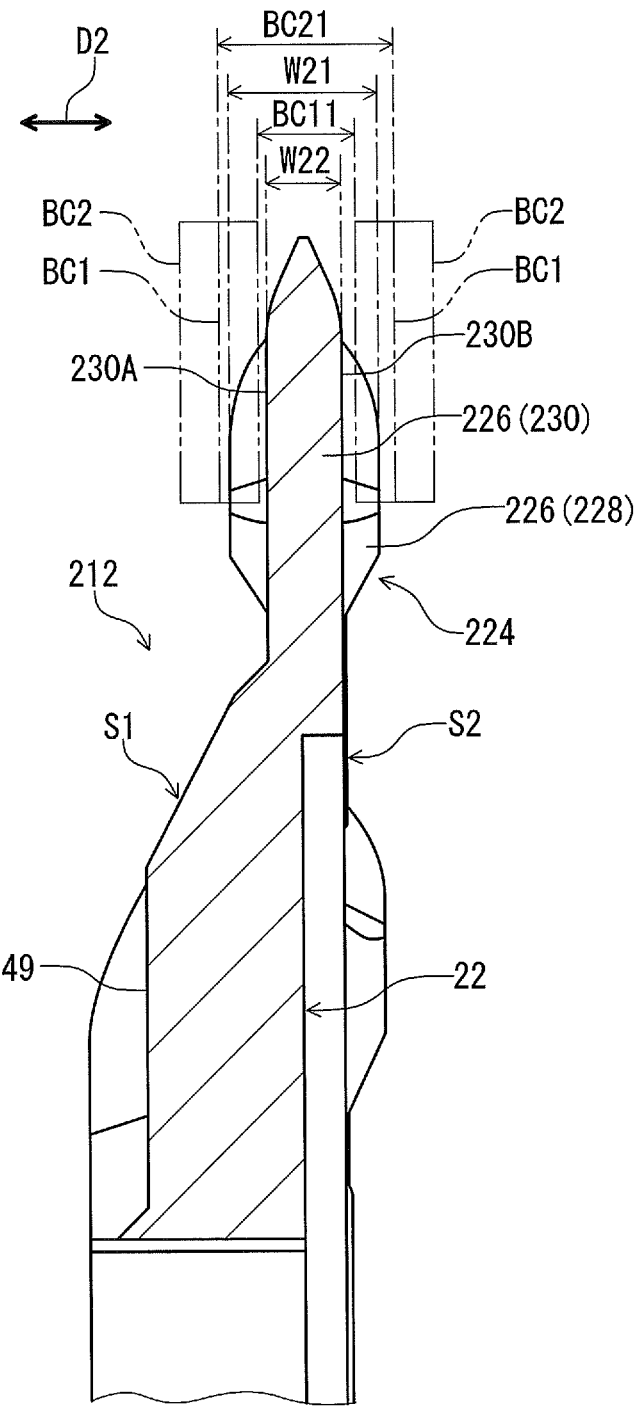
FIG. 26 is a cross-sectional view of the bicycle sprocket taken along line XXVI-XXVI of FIG. 24.

As seen in FIG. 25, the at least one first tooth 228 has a first chain engaging width W21. The first chain engaging width W21 is defined in the axial direction D2. Each of the first teeth 228 has the first chain engaging width W21. As seen in FIG. 26, the at least one second tooth 230 has a second chain engaging width W22. The second chain engaging width W22 is defined in the axial direction D2. Each of the second teeth 230 has the second chain engaging width W22. As seen in FIGS. 25 and 26, the first chain engaging width W21 is larger than the inner link space BC11 defined between the opposed pair of inner link plates BC1 of the bicycle chain BC and is smaller than the outer link space BC21 defined between the opposed pair of outer link plates BC2 of the bicycle chain BC. The second chain engaging width W22 is smaller than the inner link space BC11. However, the first chain engaging width W21 can be smaller than the inner link space BC11. While the first chain engaging width W21 is different from the second chain engaging width W22 in this embodiment, the first chain engaging width W21 can be equal to the second chain engaging width W22.

As seen in FIG. 25, the at least one first tooth 228 includes a first axial end 228A and a first opposite axial end 228B opposite to the first axial end 228A in the axial direction D2. The first axial end 228A and the first opposite axial end 228B are contactable with the outer link plate BC2 of the bicycle chain BC. The first chain engaging width W21 is defined between the first axial end 228A and the first opposite axial end 228B in the axial direction D2. In this embodiment, each of the first teeth 228 includes the first axial end 228A and the first opposite axial end 228B opposite to the first axial end 228A in the axial direction D2. In each of the first teeth 228, the first chain engaging width W21 is defined between the first axial end 228A and the first opposite axial end 228B in the axial direction D2.

As seen in FIG. 26, the at least one second tooth 230 includes a second axial end 230A and a second opposite axial end 230B opposite to the second axial end 230A in the axial direction D2. The second axial end 230A and the second opposite axial end 230B are contactable with the inner link plate BC1 of the bicycle chain BC. The second chain engaging width W22 is defined between the second axial end 230A and the second opposite axial end 230B in the axial direction D2. In this embodiment, each of the second teeth 230 includes the second axial end 230A and the second opposite axial end 230B opposite to the second axial end 230A in the axial direction D2. In each of the second teeth 230, the second chain engaging width W22 is defined between the second axial end 230A and the second opposite axial end 230B in the axial direction D2.

Figure 27:
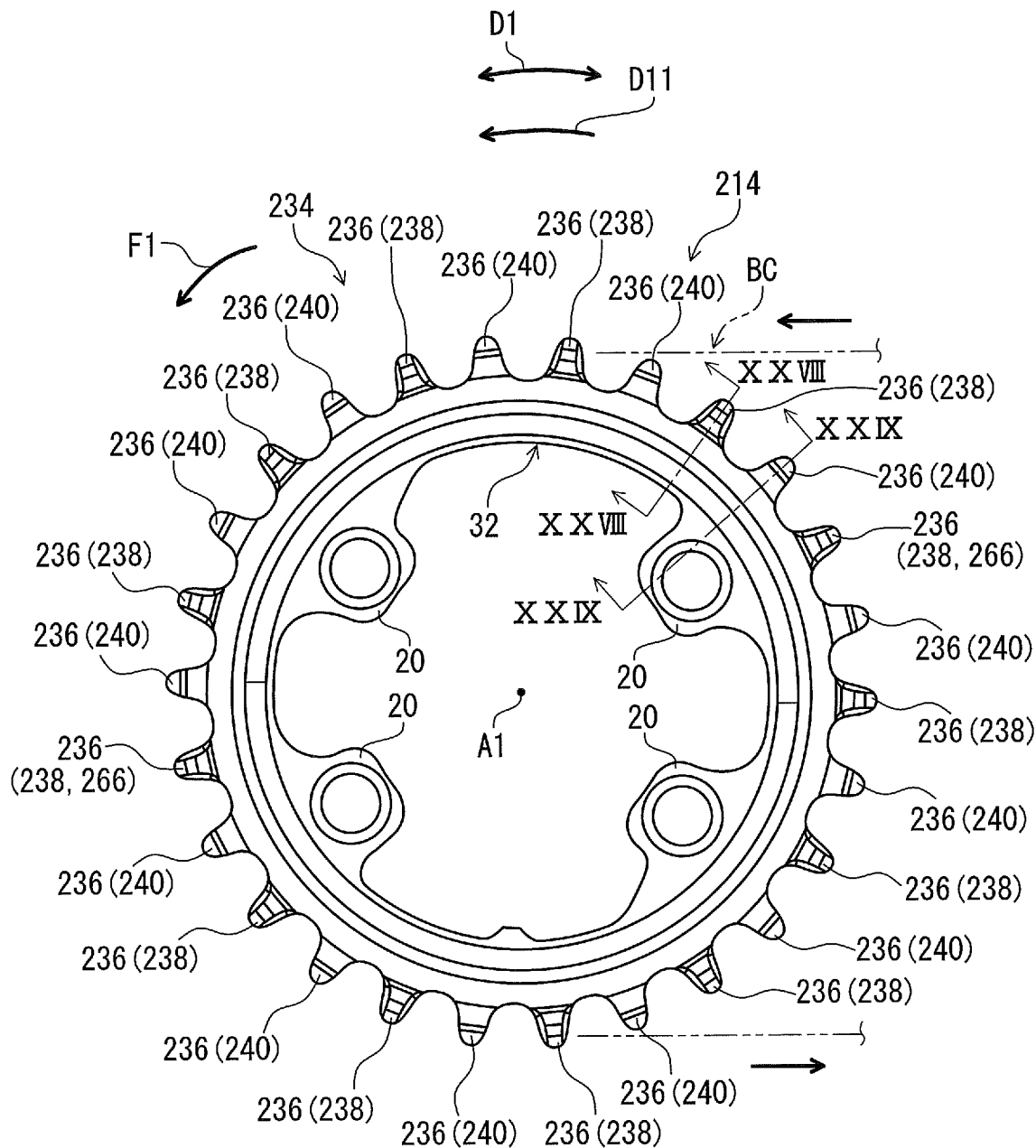
FIG. 27 is a side elevational view of a smaller sprocket of the bicycle sprocket assembly illustrated in FIG. 20.

As seen in FIG. 27, the smaller sprocket 214 includes the additional sprocket body 32 and an additional chain engagement structure 234. The additional chain engagement structure 234 is arranged on the radially outer periphery of the additional sprocket body 32. The additional chain engagement structure 234 has substantially the same structure as that of the additional chain engagement structure 34 of the first embodiment. The additional chain engagement structure 234 includes a plurality of additional chain-driving teeth 236 to engage with the bicycle chain BC to transmit the rotational driving force F1 to the bicycle chain BC. The additional chain-driving teeth 236 are arranged at a constant pitch in the circumferential direction D1.

The plurality of additional chain-driving teeth 236 includes at least one first additional tooth 238 and at least one second additional tooth 240. In this embodiment, the plurality of additional chain-driving teeth 236 includes a plurality of first additional teeth 238 and a plurality of second additional teeth 240. Preferably, the first additional teeth 238 and the second additional teeth 240 are alternately arranged in the circumferential direction D1 defined about the rotational center axis A1. A total number of the additional chain-driving teeth 236 of the smaller sprocket 214 is less than a total number of the chain-driving teeth 226 of the bicycle sprocket 212. In this embodiment, the total number of the plurality of chain-driving teeth 226 is 36, and the total number of the plurality of additional chain-driving teeth 236 is 26. However, the combination of the total number of the chain-driving teeth 226 and the total number of the additional chain-driving teeth 236 is not limited to this embodiment. For example, the total number of the plurality of chain-driving teeth 226 can be 38, and the total number of the plurality of additional chain-driving teeth 236 can be 28. The total number of the plurality of chain-driving teeth 226 can be 40, and the total number of the plurality of additional chain-driving teeth 236 can be 30. The total number of the plurality of chain-driving teeth 226 can be 48, and the total number of the plurality of additional chain-driving teeth 236 can be 36.

Figure 28:
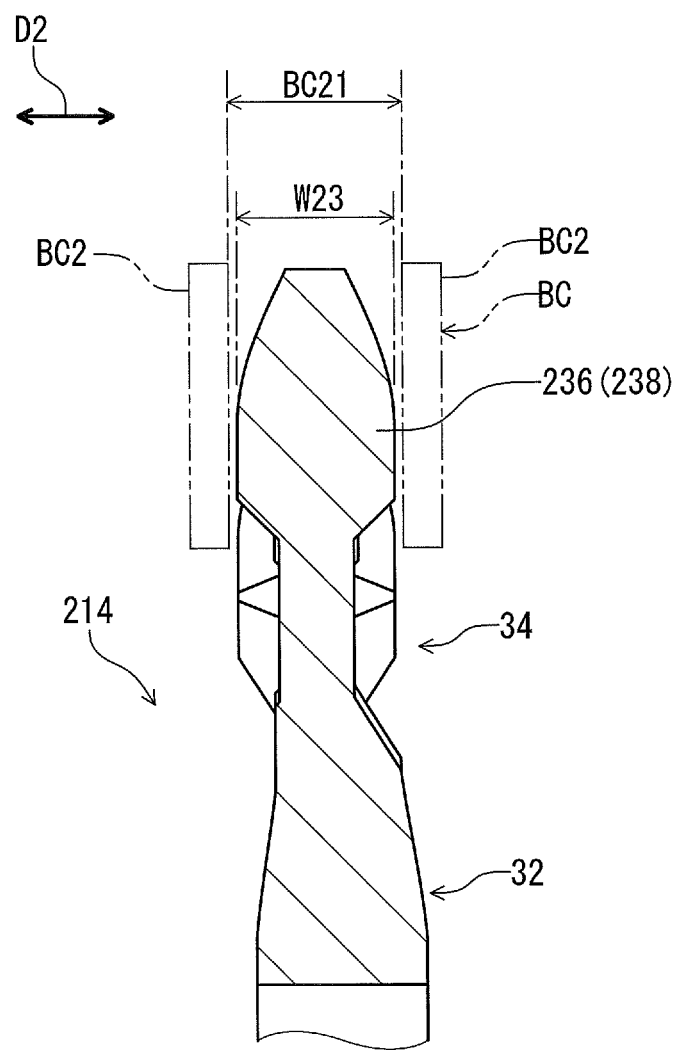
FIG. 28 is a cross-sectional view of the bicycle sprocket taken along line XXVIII-XXVIII of FIG. 27.
Figure 29:
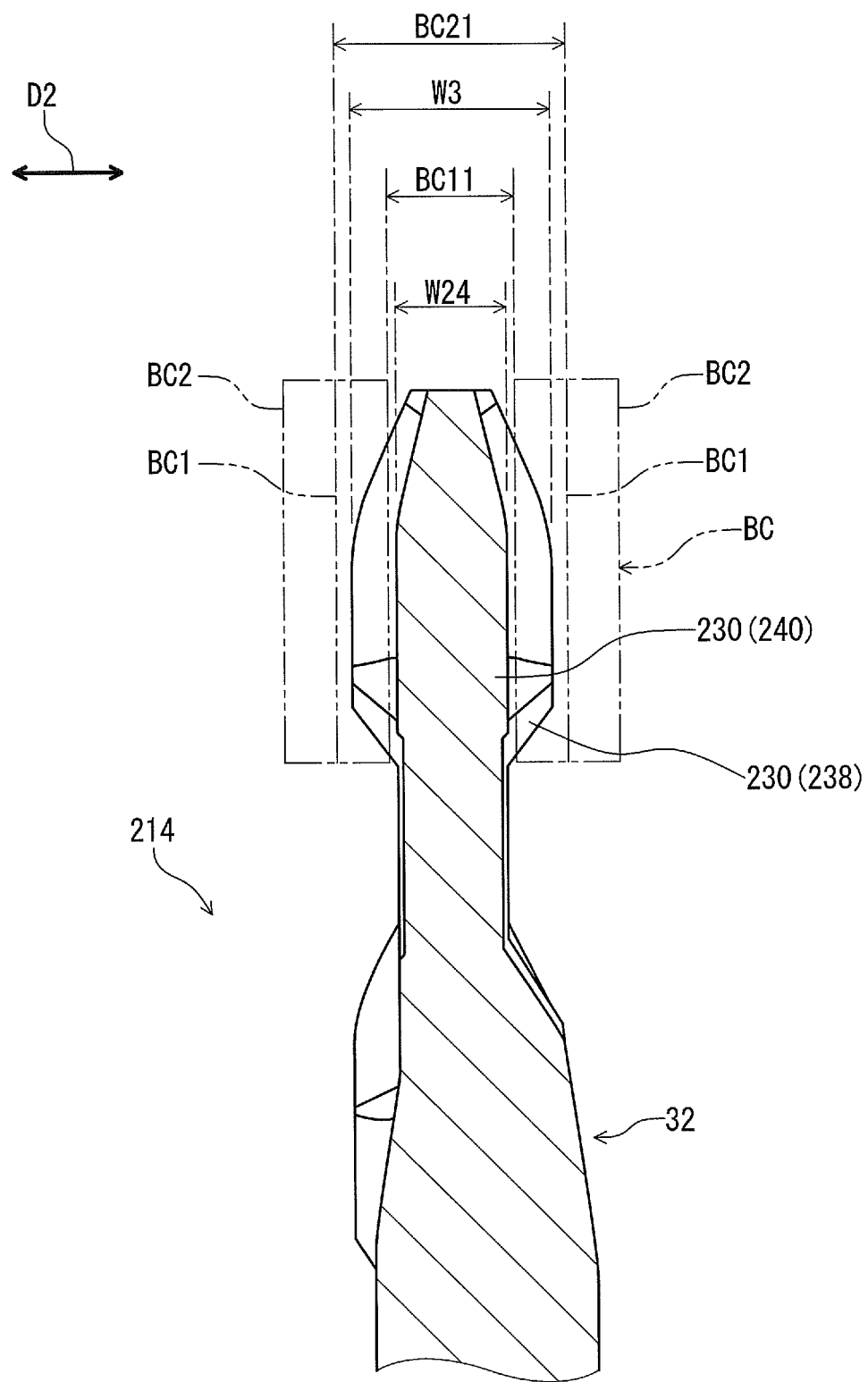
FIG. 29 is a cross-sectional view of the bicycle sprocket taken along line XXIX-XXIX of FIG. 27.

As seen in FIG. 28, the at least one first additional tooth 238 has a third chain engaging width W23. The third chain engaging width W23 is defined in the axial direction D2. Each of the first additional teeth 238 has the third chain engaging width W23. As seen in FIG. 29, the at least one second additional tooth 240 has a fourth chain engaging width W24. The fourth chain engaging width W24 is defined in the axial direction D2. Each of the second additional teeth 240 has the fourth chain engaging width W24. As seen in FIGS. 28 and 29, the third chain engaging width W23 is larger than the inner link space BC11 defined between the opposed pair of inner link plates BC1 of the bicycle chain BC and is smaller than the outer link space BC21 defined between the opposed pair of outer link plates BC2 of the bicycle chain BC. The fourth chain engaging width W24 is smaller than the inner link space BC11. However, the fourth chain engaging width W24 can be equal to the inner link space BC11.

Figure 30:
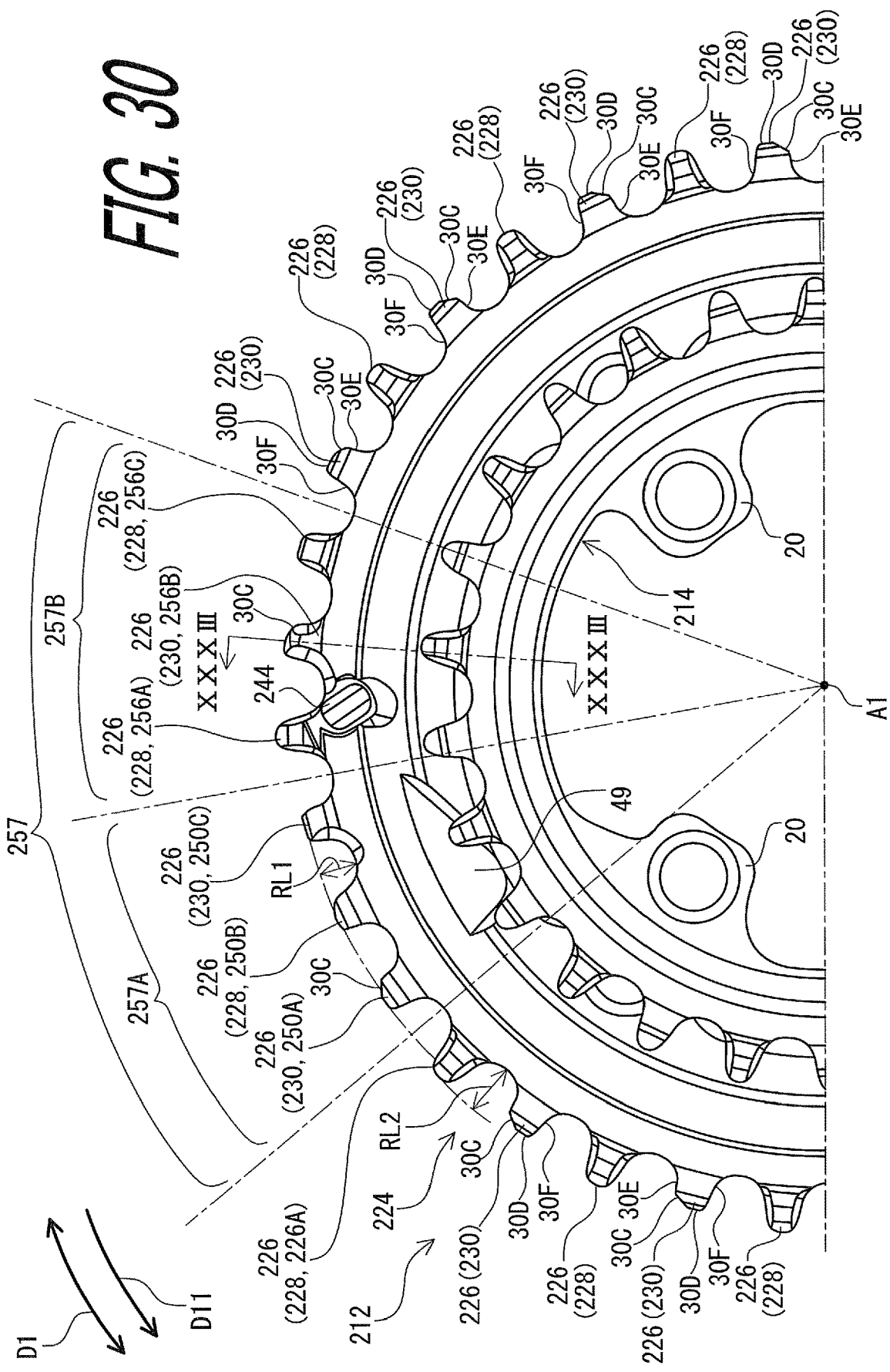
FIG. 30 is a partial side elevational view of the bicycle sprocket assembly illustrated in FIG. 20.

As seen in FIG. 30, the plurality of chain-driving teeth 226 includes at least one upshifting facilitation tooth 256A, 256B, and/or 256C and at least one downshifting facilitation tooth 250A, 250B, and/or 250C. The at least one downshifting facilitation tooth 250A, 250B, and/or 250C is adjacent to the at least one upshifting facilitation tooth 256A, 256B, and/or 256C on a downstream side of the at least one upshifting facilitation tooth 256A, 256B, and/or 256C in a rotational driving direction of the bicycle sprocket 212. The at least one downshifting facilitation tooth 250A, 250B, and/or 250C is adjacent to the at least one upshifting facilitation tooth 256A, 256B, and/or 256C without another tooth between the at least one upshifting facilitation tooth 256A, 256B, and/or 256C and the at least one downshifting facilitation tooth 250A, 250B, and/or 250C. The at least one downshifting facilitation tooth 250A, 250B, and/or 250C is disposed on the downstream side of the at least one upshifting facilitation tooth 256A, 256B, and/or 256C. The at least one downshifting facilitation tooth 250A, 250B, and/or 250C is adjacent to the at least one upshifting facilitation tooth 256A, 256B, and/or 256C on a downstream side of the at least one upshifting facilitation tooth 256A, 256B, and/or 256C without another tooth between the at least one upshifting facilitation tooth 256A, 256B, and/or 256C and the at least one downshifting facilitation tooth 250A, 250B, and/or 250C.

In this embodiment, the plurality of chain-driving teeth 226 includes a plurality of upshifting facilitation teeth 256A, 256B, and 256C and a plurality of downshifting facilitation teeth 250A, 250B, and 250C. The downshifting facilitation tooth 250C is adjacent to the upshifting facilitation tooth 256A on the downstream side of the upshifting facilitation tooth 256A. The downshifting facilitation tooth 250C is adjacent to the upshifting facilitation tooth 256A without another tooth between the upshifting facilitation tooth 256A and the downshifting facilitation tooth 250C. The downshifting facilitation tooth 250C is disposed on the downstream side of the upshifting facilitation tooth 256A closest to the downshifting facilitation tooth 250C in the circumferential direction D1 among the plurality of upshifting facilitation teeth 256A, 256B, and 256C. The downshifting facilitation tooth 250C is adjacent to the upshifting facilitation tooth 256A on the downstream side of the upshifting facilitation tooth 256A without another tooth between the upshifting facilitation tooth 256A and the downshifting facilitation tooth 250C.

In this embodiment, the upshifting facilitation teeth 256A, 256B, and 256C are continuously arranged in the circumferential direction D1, and the downshifting facilitation teeth 250A, 250B, and 250C are continuously arranged in the circumferential direction D1. One of the upshifting facilitation teeth 256A, 256B, and 256C is adjacent to one of the downshifting facilitation teeth 250A, 250B, and 250C without another tooth between the one of the upshifting facilitation teeth 256A, 256B, and 256C and the one of the downshifting facilitation teeth 250A, 250B, and 250C in the circumferential direction D1. The one of the downshifting facilitation teeth 250A, 250B, and 250C is adjacent to the one of the upshifting facilitation teeth 256A, 256B, and 256C on a downstream side of the one of the upshifting facilitation teeth 256A, 256B, and 256C without another tooth between the one of the upshifting facilitation teeth 256A, 256B, and 256C and the one of the downshifting facilitation teeth 250A, 250B, and 250C in the circumferential direction D1.

As seen in FIGS. 24 and 30, the chain engagement structure 224 includes a shifting facilitation area 257 to facilitate a shifting operation between the bicycle sprocket 212 and the smaller sprocket 214. The chain engagement structure 224 includes the shifting facilitation area 257 in which the at least one downshifting facilitation tooth 250A, 250B, and/or 250C and the at least one upshifting facilitation tooth 256A, 256B, and/or 256C are disposed. In this embodiment, the chain engagement structure 224 includes a plurality of shifting facilitation areas 257 in which the plurality of downshifting facilitation teeth 250A to 250C and the plurality of upshifting facilitation teeth 256A to 256C are disposed. In the present application, the term "area" means a sector defined in an angular range defined from a specific tooth to another specific tooth about the rotational center axis A1.

The shifting facilitation area 257 includes a downshifting facilitation area 257A to facilitate the downshifting operation from the bicycle sprocket 212 to the smaller sprocket 214. The at least one downshifting facilitation tooth 250A, 250B, and/or 250C is disposed in the downshifting facilitation area 257A. In this embodiment, the plurality of downshifting facilitation teeth 250A to 250C are disposed in the downshifting facilitation area 257A.

The shifting facilitation area 257 includes an upshifting facilitation area 257B to facilitate the upshifting operation from the smaller sprocket 214 to the bicycle sprocket 212. The at least one upshifting facilitation tooth 256A, 256B, and/or 256C is disposed in the upshifting facilitation area 257B. In this embodiment, the upshifting facilitation teeth 256A to 256C are disposed in the upshifting facilitation area 257B. The upshifting facilitation area 257B is adjacent to the downshifting facilitation area 257A in the circumferential direction D1. The downshifting facilitation area 257A is disposed on the downstream side of the upshifting facilitation area 257B in the circumferential direction D1.

As seen in FIGS. 24 and 30, the bicycle sprocket 212 comprises a shifting facilitation projection 244 to facilitate an upshifting operation of the bicycle chain BC and to facilitate a downshifting operation of the bicycle chain BC. Namely, the shifting facilitation projection 244 has the same functions as the functions of the downshifting and upshifting facilitation projections 44 and 48 described in the first embodiment. In other words, the shifting facilitation projection 244 is an upshifting facilitation projection that is integrally formed with the down shifting facilitation projection. In this embodiment, the chain engagement structure 224 includes a plurality of shifting facilitation projections 244 respectively disposed in the shifting facilitation areas 257 to engage with the bicycle chain BC when the bicycle chain BC shifts from the bicycle sprocket 212 toward the smaller sprocket 214. The shifting facilitation projections 244 are secured to the sprocket body 22 via a fastening structure such as a rivet. The shifting facilitation projection 244 is disposed in the shifting facilitation area 257. The shifting facilitation projection 244 is disposed in the shifting facilitation area 257 to engage with the outer link plate BC2 of the bicycle chain BC during each of the upshifting operation and the downshifting operation.

The shifting facilitation projection 244 is disposed closer to one of the first teeth 228 than to the second teeth 230. In this embodiment, the upshifting facilitation tooth 256A is the first tooth 228 closest to the shifting facilitation projection 244 among the first teeth 228. Further, in this embodiment, the first tooth 228 that is closest to the shifting facilitation projection 244 is adjacent to the downshifting facilitation tooth 250C. However, the shifting facilitation projection 244 can be disposed closer to one of the second teeth 230 than to the first teeth 228. While the shifting facilitation projections 244 are separate members from the chain-driving teeth 26 in this embodiment, at least one of the shifting facilitation projections 244 can be integrally provided with the chain-driving teeth 226 and/or the sprocket body 22 as a one-piece unitary member.

As seen in FIG. 30, the at least one downshifting facilitation tooth 250A, 250B, and/or 250C includes a downshifting derailing tooth to first derail the bicycle chain BC from the bicycle sprocket 212 during the downshifting operation. In this embodiment, the plurality of downshifting facilitation teeth 250A, 250B, and 250C includes a downshifting derailing tooth 250C to first derail the bicycle chain BC from the bicycle sprocket 212 during the downshifting operation. As seen in FIG. 24, the downshifting derailing tooth 250C is disposed in the shifting facilitation area 257. The at least one second tooth 230 includes the downshifting derailing tooth 250C. In this embodiment, the plurality of second teeth 230 includes the downshifting derailing tooth 250C. In this embodiment, the downshifting derailing tooth 250C is adjacent to the first tooth 228 (the upshifting facilitation tooth 256A) that is closest to the shifting facilitation projection 244 on the downstream side of the first tooth 228.

Figure 31:
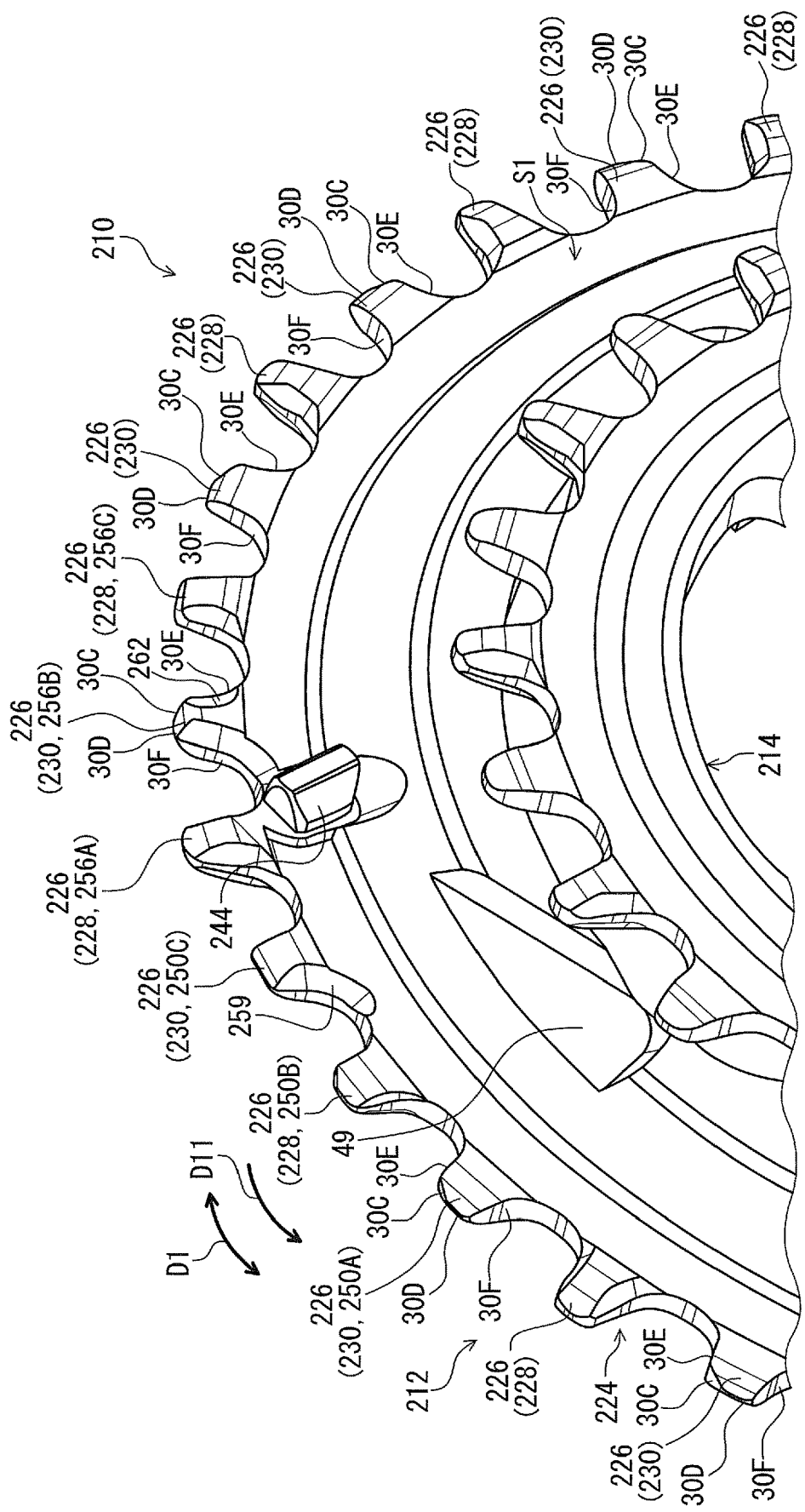
FIG. 31 is a partial perspective view of the bicycle sprocket assembly illustrated in FIG. 20.
Figure 32:
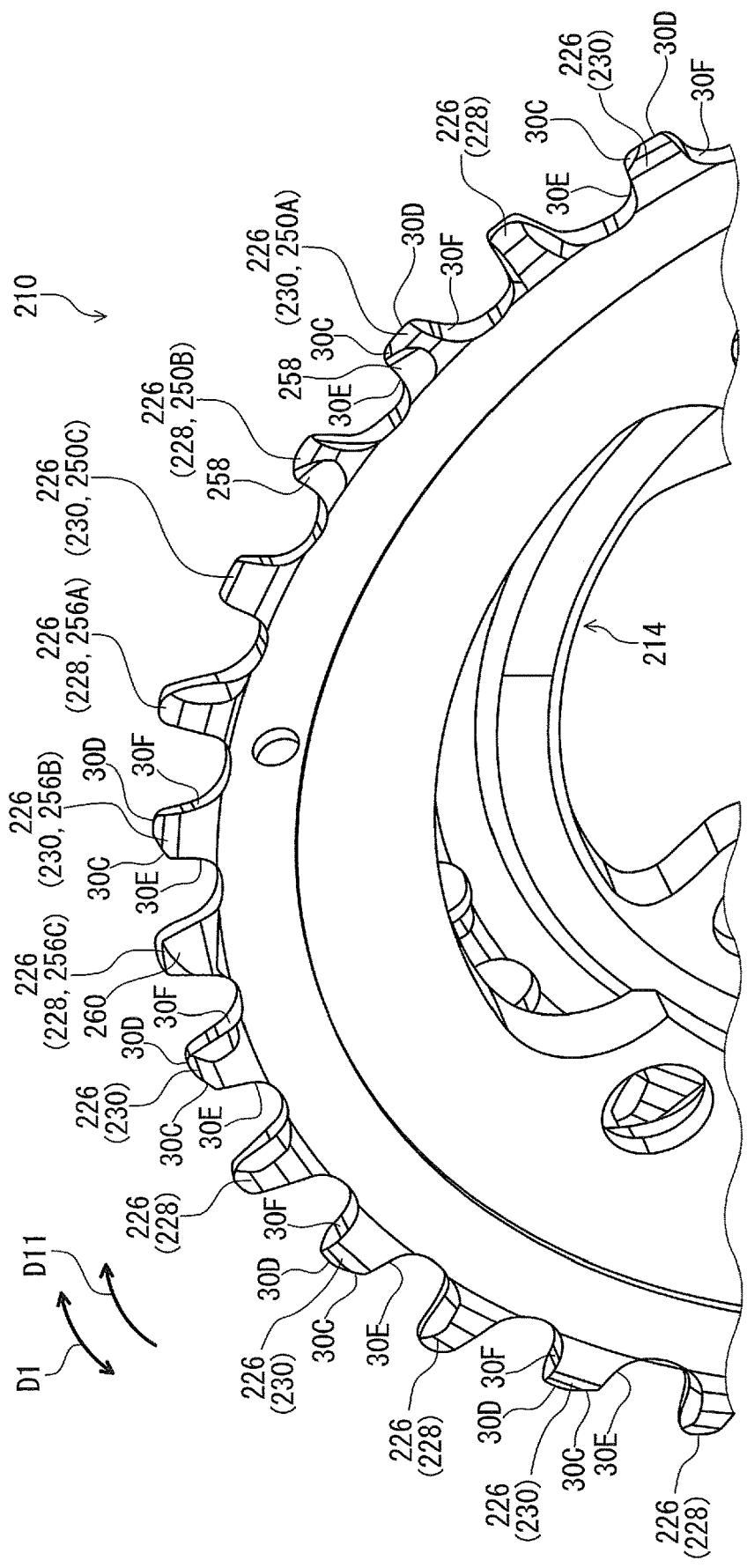
FIG. 32 is another partial perspective view of the bicycle sprocket assembly illustrated in FIG. 20.

As seen in FIGS. 30 to 32, the at least one downshifting facilitation tooth 250A, 250B, and/or 250C includes at least one chamfered tooth disposed on the downstream side of the downshifting derailing tooth 250C in the rotational driving direction D11 of the bicycle sprocket 212. In this embodiment, the plurality of downshifting facilitation teeth 250A, 250B, and 250C includes a plurality of chamfered teeth 250A and 250E disposed on the downstream side of the downshifting derailing tooth 250C in the rotational driving direction D11 of the bicycle sprocket 212. The plurality of chamfered teeth 250A and 250B is disposed to be adjacent to each other in the circumferential direction of the rotational center axis A1.

As seen in FIG. 32, the at least one chamfered tooth 250A and/or 250B includes a downshifting facilitation chamfer 258 disposed on an opposite side of the shifting facilitation projection 244 in the axial direction D2 parallel to the rotational center axis A1. The at least one chamfered tooth 250A and/or 250B is adjacent to the downshifting derailing tooth 250C on the downstream side of the downshifting derailing tooth 250C in the rotational driving direction D11 without another tooth between the at least one chamfered tooth 250A and/or 250B and the downshifting derailing tooth 250C. In this embodiment, each of the plurality of chamfered teeth 250A and 250B includes a downshifting facilitation chamfer 258 disposed on the opposite side of the shifting facilitation projection 244 in the axial direction D2 parallel to the rotational center axis A1. The chamfered tooth 250B is adjacent to the downshifting derailing tooth 250C on the downstream side of the downshifting derailing tooth 250C in the rotational driving direction D11 without another tooth between the at least one chamfered tooth 250B and the downshifting derailing tooth 250C. The downshifting facilitation chamfer 258 is disposed on each of the chamfered teeth 250A and 250B to shift the bicycle chain BC toward the smaller sprocket 214 during the downshifting operation. The downshifting facilitation chamfer 258 is so arranged that an axial width of each of the chamfered teeth 250A and 250B gradually decreases from the downstream side to the upstream side in the rotational driving direction D11. This allows the bicycle chain BC to be easily inclined relative to each of the chamfered teeth 250A and 250B when the bicycle chain BC is shifted by the front derailleur (not shown) toward an axial inner side (toward the smaller sprocket 214) during the downshifting operation. This can facilitate derailing of the bicycle chain BC from the downshifting derailing tooth 250C.

As seen in FIG. 31, the downshifting derailing tooth 250C includes an additional downshifting facilitation chamfer 259. The additional downshifting facilitation chamfer 259 is disposed on the same side as the shifting facilitation projection 244 in the axial direction D2. The additional downshifting facilitation chamfer 259 is disposed on the downshifting derailing tooth 250C to reduce interference between the downshifting derailing tooth 250C and the outer link plate BC2 of the bicycle chain BC during the downshifting operation. The additional downshifting facilitation chamfer 259 is so arranged that an axial width of the downshifting derailing tooth 250C gradually increases from the downstream side to the upstream side in the rotational driving direction D11.

As seen in FIG. 30, the at least one downshifting facilitation tooth 250A, 250B, and/or 250C has a radial length RL1 shorter than a radial length RL2 of at least one of the plurality of chain-driving teeth 226 other than the at least one downshifting facilitation tooth 250A, 250B, and/or 250C. In this embodiment, the plurality of downshifting facilitation teeth 250A, 250B, and 250C has a radial length RL1 shorter than a radial length RL2 of the chain-driving tooth 226A of the plurality of chain-driving teeth 226. The chain-driving tooth 226A is disposed outside the shifting facilitation areas 257.

As seen in FIGS. 30 to 32, the at least one upshifting facilitation tooth 256A, 256B, and/or 256C includes an upshifting receiving tooth to first receive the bicycle chain BC during the upshifting operation. In this embodiment, the plurality of upshifting facilitation teeth 256A, 256B, and 256C include an upshifting receiving tooth 256C to first receive the bicycle chain BC during the upshifting operation. The at least one first tooth 228 includes the upshifting receiving tooth 256C to first receive the bicycle chain BC during the upshifting operation. In this embodiment, the plurality of first tooth 228 includes the upshifting receiving tooth 256C to first receive the bicycle chain BC during the upshifting operation.

As seen in FIG. 32, the upshifting receiving tooth 256C includes an upshifting facilitation chamfer 260 disposed on the opposite side of the shifting facilitation projection 244 in the axial direction D2. The upshifting facilitation chamfer 260 is disposed on the upshifting receiving tooth 256C to certainly introduce the upshifting receiving tooth 256C into the outer link space BC21 (FIG. 25) of the bicycle chain BC. The upshifting facilitation chamfer 260 is so arranged that an axial width of each of the upshifting receiving tooth 256C gradually decreases from the upstream side to the downstream side in the rotational driving direction D11.

The at least one upshifting facilitation tooth 256A, 256B, and/or 256C includes at least one upshifting chamfered tooth disposed on the downstream side of the upshifting receiving tooth 256C in the rotational driving direction D11 of the bicycle sprocket 212. In this embodiment, the plurality of upshifting facilitation teeth 256A, 256B, and 256C includes an upshifting chamfered tooth 256B disposed on the downstream side of the upshifting receiving tooth 256C in the rotational driving direction D11 of the bicycle sprocket 212. A tooth top of the upshifting receiving tooth 256C maybe offset in the axial direction D2 with respect to an axial center of a maximum axial width of the upshifting receiving tooth 256C toward the smaller sprocket 214. This allows the bicycle chain BC to easily approach the upshifting receiving tooth 256C during the upshifting operation. Thus, it is possible to more certainly complete the upshifting operation.

As seen in FIG. 31, the upshifting chamfered tooth 256B includes an additional upshifting facilitation chamfer 262 disposed on an opposite side of the shifting facilitation projection 244 in the axial direction D2. The additional upshifting facilitation chamfer 262 is disposed on the upshifting chamfered tooth 256A to reduce interference between the upshifting chamfered tooth 256A and the outer link plate BC2 of the bicycle chain BC during the upshifting operation.

As seen in FIG. 30, the shifting facilitation projection 244 is disposed between the downshifting derailing tooth 250C and the upshifting receiving tooth 256C in the circumferential direction D1 with respect to the rotational center axis A1. In this embodiment, the downshifting derailing tooth 250C is closer to the shifting facilitation projection 244 than the upshifting receiving tooth 256C in the circumferential direction D1. However, the positional relationship among the shifting facilitation projection 244, the downshifting derailing tooth 250C, and the upshifting receiving tooth 256C is not limited to this embodiment. A tooth top of the downshifting derailing tooth 250C may be offset in the axial direction D2 with respect to an axial center of a maximum axial width of the downshifting derailing tooth 250C toward an opposite side of the smaller sprocket 214. This effectively facilitates derailing of the bicycle chain BC from the downshifting derailing tooth 250C during the downshifting operation. Thus, it is possible to more certainly complete the downshifting operation.

As seen in FIGS. 30 to 32, the at least one second tooth 230 includes a driving facilitation chamfer 30C, the radially outermost tooth-tip 30D, the rotational upstream edge 30E and the rotational downstream edge 30F as well as the second tooth 30 of the first embodiment. The driving facilitation chamfer 30C can reduce interference between the bicycle chain BC and the radially outermost tooth-tip 30D of the second tooth 230 (e.g., a radially outer corner of the second tooth 230) during the downshifting operation. This can reduce the unintentionally derailing of the bicycle chain BC from the bicycle sprocket 212 during the downshifting operation except for the downshifting facilitation area.

Figure 33:
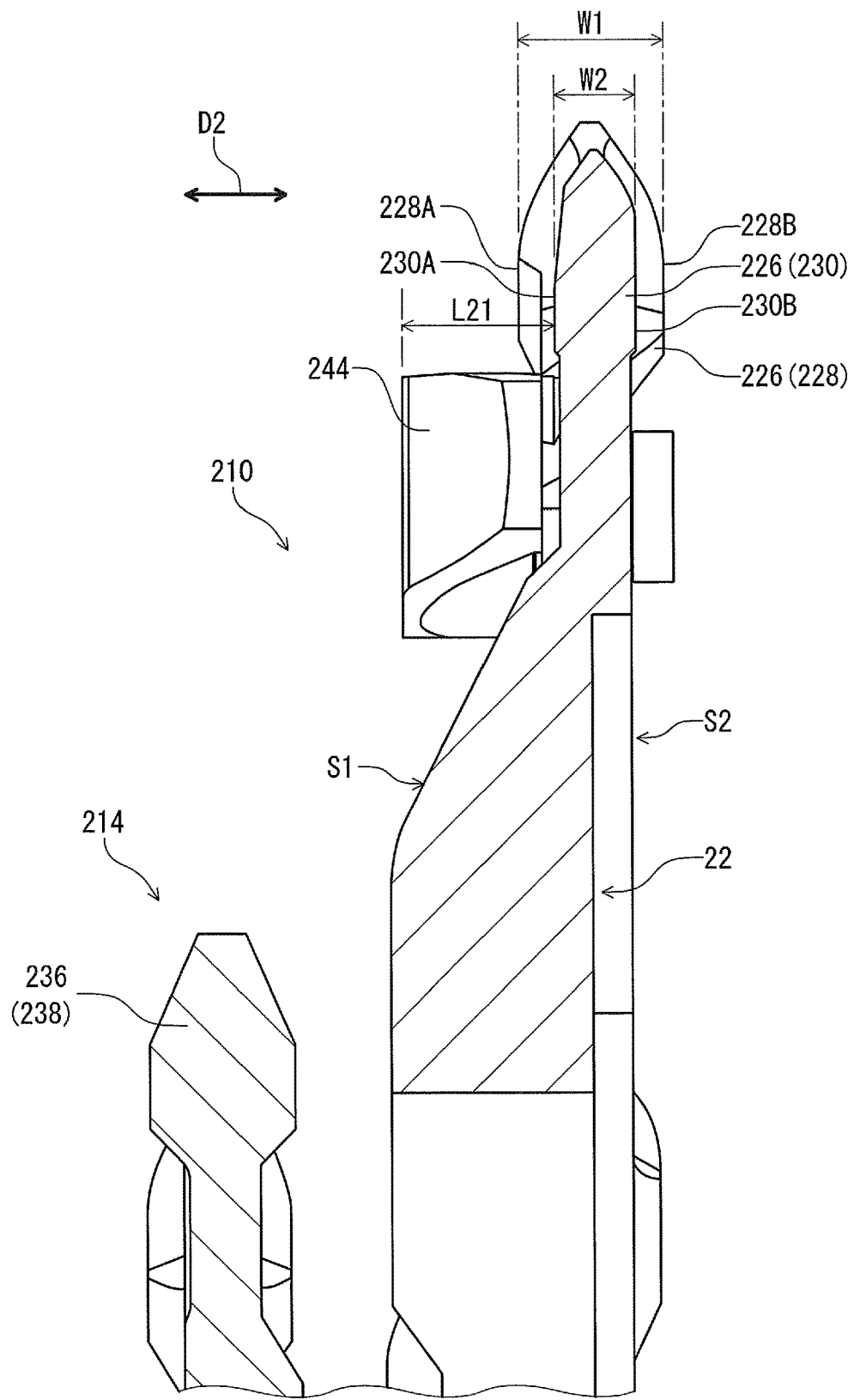
FIG. 33 is a cross-sectional view of the bicycle sprocket taken along line XXXIII-XXXIII of FIG. 30.

As seen in FIG. 33, the shifting facilitation projection 244 has an axial length L21 defined from the axial side surface 230A of the at least one second tooth 230 in the axial direction D2 parallel to the rotational center axis A1. The axial length L21 of the shifting facilitation projection 244 is equal to or greater than 1.0 mm. The axial length L21 is more preferably is equal to or greater than 1.5 mm. However, the axial length L21 of the shifting facilitation projection 244 is not limited to this embodiment.

Figure 34:
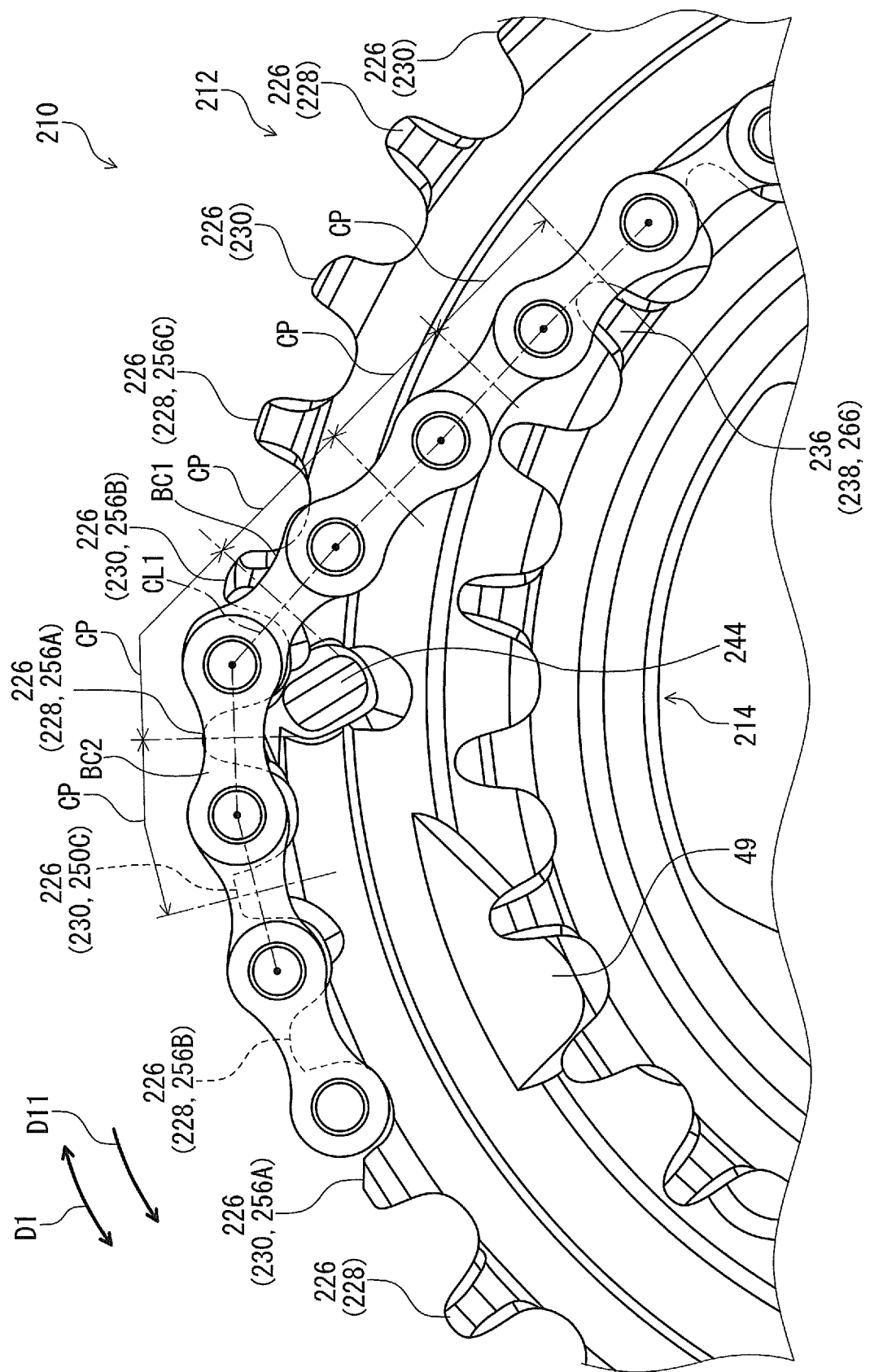
FIG. 34 is a partial side elevational view of the bicycle sprocket assembly illustrated in FIG. 20 with the bicycle chain (downshifting operation).

As seen in FIG. 34, the smaller sprocket 214 includes a downshifting receiving tooth 266 to first receive the bicycle chain BC during the downshifting operation. The at least one first additional tooth 238 includes the downshifting receiving tooth 266. In this embodiment, the plurality of first additional tooth 238 includes the downshifting receiving tooth 266.

In this embodiment, as seen in FIG. 34, the shifting facilitation projection 244 is disposed at a position such that the downshifting receiving tooth 266 is spaced apart from the downshifting derailing tooth 250C by an uneven number of chain pitch CP of the bicycle chain BC on a chain line CL of the bicycle chain BC during the downshifting operation. The uneven number of chain pitch CP is equal to or smaller than nine. The uneven number of chain pitch CP is equal to or smaller than seven. The uneven number of chain pitch CP is equal to or smaller than five. While the uneven number of chain pitch CP is five in this embodiment, the uneven number of chain pitch CP is not limited to this embodiment.

Figure 35:
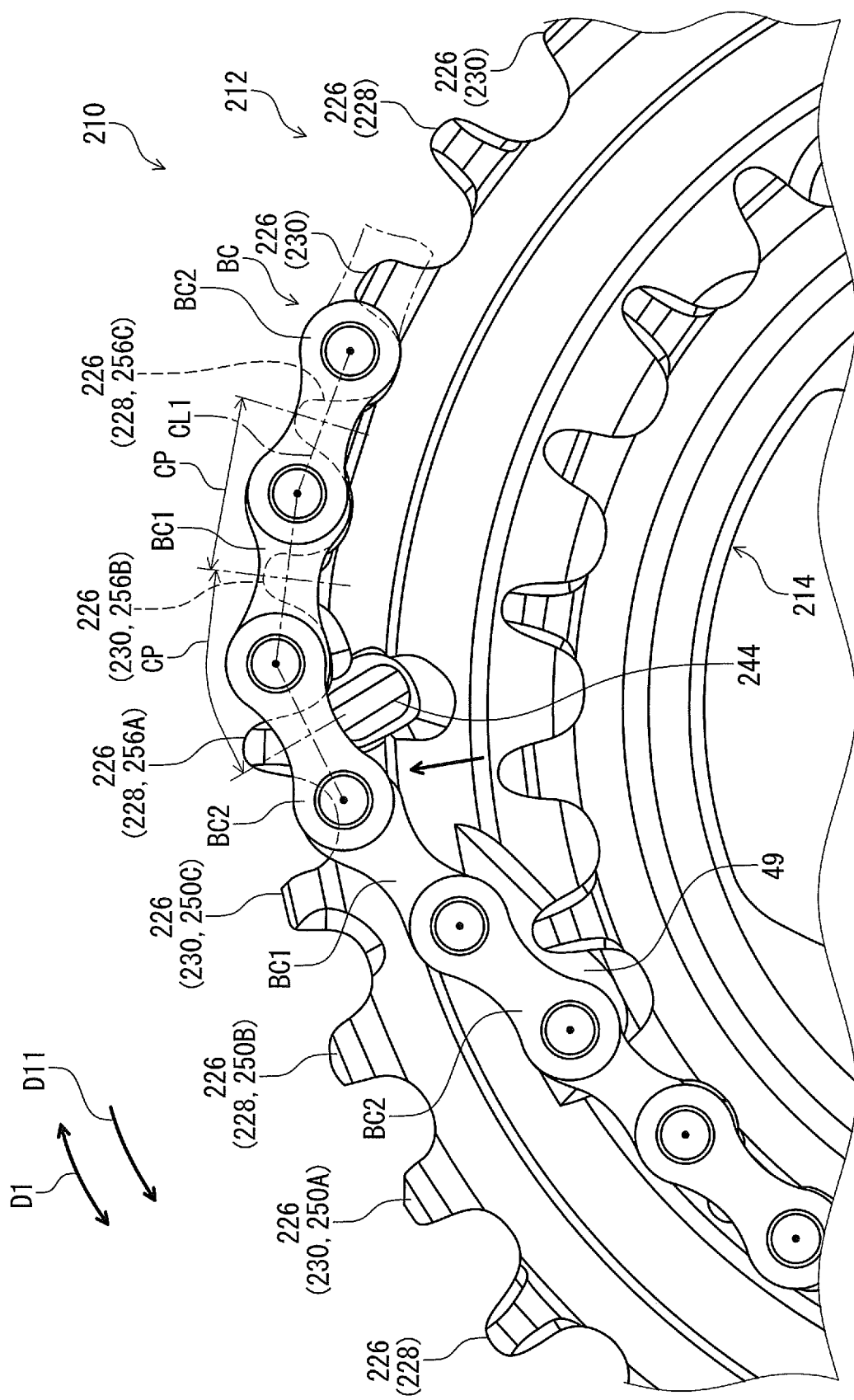
FIG. 35 is a partial side elevational view of the bicycle sprocket assembly illustrated in FIG. 20 with the bicycle chain (upshifting operation).

As seen in FIG. 35, the upshifting receiving tooth 256C is spaced apart from the shifting facilitation projection 244 by an even number of chain pitch CP of the bicycle chain BC. While the even number of chain pitch CP is two in this embodiment, the even number of chain pitch can be other even number.

The shifting facilitation projection 244 has the same functions as the functions of the downshifting and upshifting facilitation projections 44 and 48 described in the first embodiment. Thus, it will not be described in detail here for the sake of brevity.

Furthermore, the bicycle sprocket assembly 210 and the bicycle sprocket 212 include the following features.

(1) The bicycle sprocket 212 comprises the shifting facilitation projection 244 to facilitate the upshifting operation of the bicycle chain BC and to facilitate the downshifting operation of the bicycle chain BC. Accordingly, it is possible to smooth the upshifting operation and the downshifting operation using the shifting facilitation projection 244 provided as a common projection. This can simplify the structure of the bicycle sprocket 212 with facilitating the upshifting operation and the downshifting operation compared with a bicycle sprocket 12 including separate projections to respectively facilitate the upshifting operation and the downshifting operation.

(2) The plurality of chain-driving teeth 226 includes at least one upshifting facilitation tooth 256A, 256B, and/or 256C, and at least one downshifting facilitation tooth 250A, 250B, and/or 250C which is disposed on a downstream side of the at least one upshifting facilitation tooth 256A, 256B, and/or 256C. Accordingly, it is possible to effectively facilitate the upshifting operation and the downshifting operation using the shifting facilitation projection 244, the at least one upshifting facilitation tooth 256A, 256B, and/or 256C, and the at least one downshifting facilitation tooth 250A, 250B, and/or 250C.

(3) The at least one downshifting facilitation tooth 250A, 250B, and/or 250C is adjacent to the at least one upshifting facilitation tooth 256A, 256B, and/or 256C on a downstream side of the at least one upshifting facilitation tooth 256A, 256B, and/or 256C without another tooth between the at least one upshifting facilitation tooth 256A, 256B, and/or 256C and the at least one downshifting facilitation tooth 250A, 250B, and/or 250C. Accordingly, it is possible to reduce a size of an area in which the at least one upshifting facilitation tooth 256A, 256B, and/or 256C and the at least one downshifting facilitation tooth 250A, 250B, and/or 250C are disposed. Furthermore, it is possible to more certainly bring the bicycle chain BC into engagement with the shifting facilitation projection 244 during each of the upshifting operation and the downshifting operation in a case where the shifting facilitation projection 244 serves as upshifting and downshifting facilitation projections.

(4) The at least one downshifting facilitation tooth 250A, 250B, and/or 250C includes the downshifting derailing tooth 250C to first derail the bicycle chain BC from the bicycle sprocket 212 during the downshifting operation. Accordingly, it is possible to smoothly derail the bicycle chain BC from the bicycle sprocket 212 during the downshifting operation. This effectively facilitates the downshifting operation.

(5) The at least one downshifting facilitation tooth 250A, 250B, and/or 250C includes at least one chamfered tooth 250A and/or 250B disposed on the downstream side of the downshifting derailing tooth 250C in the rotational driving direction D11 of the bicycle sprocket 212. The at least one chamfered tooth 250A and/or 250B includes the downshifting facilitation chamfer 258 disposed on the opposite side of the shifting facilitation projection 244 in the axial direction D2 parallel to the rotational center axis A1. Accordingly, it is possible to more smoothly derail the bicycle chain BC from the bicycle sprocket 212 during the downshifting operation. This more effectively facilitates the downshifting operation.

(6) The at least one chamfered tooth 250A and/or 250B is adjacent to the downshifting derailing tooth 250C on the downstream side of the downshifting derailing tooth 250C in the rotational driving direction D11 without another tooth between the at least one chamfered tooth and the downshifting derailing tooth 250C. Accordingly, it is possible to more smoothly derail the bicycle chain BC from the bicycle sprocket 212 during the downshifting operation in a smaller area. This shortens a time period of the downshifting operation.

(7) The at least one upshifting facilitation tooth 256A, 256B, and/or 256C includes the upshifting receiving tooth 256C to first receive the bicycle chain BC during the upshifting operation. Accordingly, it is possible to more smoothly receive the bicycle chain BC during the upshifting operation.

(8) The upshifting receiving tooth 256C is spaced apart from the shifting facilitation projection 244 by the even number of chain pitch CP of the bicycle chain BC. Accordingly, it is possible to more smoothly receive the bicycle chain BC lifted by the shifting facilitation projection 244 during the upshifting operation. Furthermore, it is possible to certainly bring the opposed pair of outer link plates BC2 of the bicycle chain BC into engagement with a specific tooth (the at least one first tooth 228).

(9) The at least one downshifting facilitation tooth 250A, 250B, and/or 250C includes the downshifting derailing tooth 250C to first derail the bicycle chain BC from the bicycle sprocket 212 during the downshifting operation. The at least one upshifting facilitation tooth 256A, 256B, and/or 256C includes the upshifting receiving tooth 256C to first receive the bicycle chain BC during the upshifting operation. The shifting facilitation projection 244 is disposed between the downshifting derailing tooth 250C and the upshifting receiving tooth 256C in the circumferential direction D1 with respect to the rotational center axis A1. Accordingly, it is possible to effectively facilitate the upshifting operation and the downshifting operation using the shifting facilitation projection 244, the downshifting derailing tooth 250C, and the upshifting receiving tooth 256C.

(10) The chain engagement structure 224 includes the shifting facilitation area 257 in which the downshifting facilitation tooth 250 and the upshifting facilitation tooth 256A or 256B are disposed. The shifting facilitation projection 244 is disposed in the shifting facilitation area 257 to engage with the outer link plate BC2 of the bicycle chain BC during each of the upshifting operation and the downshifting operation. Accordingly, it is possible to effectively facilitate the upshifting operation and the downshifting operation using the shifting facilitation projection 244.

(11) The at least one downshifting facilitation tooth 250A, 250B, and/or 250C has a radial length shorter than a radial length of at least one of the plurality of chain-driving teeth other than the at least one downshifting facilitation tooth. Accordingly, it is possible to more effectively facilitate the downshifting operation. Furthermore, it is possible to easily derail the bicycle chain BC during the downshifting operation.

(12) The first chain engaging width W21 is larger than the inner link space BC11 defined between the opposed pair of inner link plates BC1 of the bicycle chain BC and is smaller than the outer link space BC21 defined between the opposed pair of outer link plates BC2 of the bicycle chain BC. The second chain engaging width W22 is smaller than the inner link space BC11. Accordingly, it is possible to improve chain-holding performance to hold the bicycle chain BC.

(13) The shifting facilitation projection 244 has the axial length L21 defined from the axial side surface 230A of the at least one second tooth 230 in the axial direction D2 parallel to the rotational center axis A1. The axial length L21 of the shifting facilitation projection 244 is equal to or greater than 1.0 mm. Accordingly, it is possible to certainly bring the shifting facilitation projection 244 into engagement with the bicycle chain BC during the upshifting operation and the downshifting operation.

(14) The at least one downshifting facilitation tooth 250A, 250B, and/or 250C includes the downshifting derailing tooth 250C to first derail the bicycle chain BC from the bicycle sprocket 212 during the downshifting operation. The at least one second tooth 230 includes the downshifting derailing tooth 250C. Accordingly, it is possible to smoothly derail the bicycle chain BC from the bicycle sprocket 212. This effectively facilitates the downshifting operation.

(15) The bicycle sprocket assembly 210 comprises the bicycle sprocket 212 and the smaller sprocket 214 adjacent to the bicycle sprocket 212 without another sprocket between the smaller sprocket 214 and the bicycle sprocket 212. Accordingly, it is possible to set a chain-downshifting distance defined between the bicycle sprocket 212 and the smaller sprocket 214 as appropriate so that the bicycle chain BC smoothly shifts from the bicycle sprocket 212 to the smaller sprocket 214 during the downshifting operation and/or smoothly shifts from the smaller sprocket 214 to the bicycle sprocket 212 during the upshifting operation.

(16) The shifting facilitation projection 244 is disposed at the position such that the downshifting receiving tooth 266 is spaced apart from the downshifting derailing tooth 250C by the uneven number of chain pitch of the bicycle chain BC on the chain line CL of the bicycle chain BC during the downshifting operation. Accordingly, it is possible to smoothly shift the bicycle chain BC from the bicycle sprocket 212 to the smaller sprocket 214. Furthermore, the above arrangement of the shifting facilitation projection 244 can bring the opposed pair of outer link plates BC2 of the bicycle chain BC into engagement with a specific tooth (the first additional tooth 238 in this embodiment) during the downshifting operation. Especially, it is possible to bring the opposed pair of outer link plates BC2 of the bicycle chain BC into engagement with the first additional tooth 238 having the third chain engaging width W23 and to bring the opposed pair of inner link plates BC1 of the bicycle chain BC into engagement with the second additional tooth 240 having the fourth chain engaging width W24.

(17) Since the uneven number of chain pitch CP is equal to or smaller than nine, it is possible to quickly complete the downshifting operation.

(18) Since the uneven number of chain pitch CP is equal to or smaller than seven, it is possible to more quickly complete the downshifting operation.

(19) Since the uneven number of chain pitch is equal to or smaller than five, it is possible to more quickly complete the downshifting operation.

(20) The second chain engaging width W22 is smaller than the inner link space BC11. The fourth chain engaging width W24 is smaller than the inner link space BC11. Accordingly, it is possible to improve chain-holding performance of each of the bicycle sprocket 212 and the smaller sprocket 214. This improves chain-holding performance of the bicycle sprocket assembly 210.

(21) Since the at least one second tooth 230 includes the downshifting derailing tooth 250C, it is possible to more smoothly derail the bicycle chain BC from the bicycle sprocket 212. This effectively facilitates the downshifting operation.

(22) The at least one first tooth 228 includes the upshifting receiving tooth 256C to first receive the bicycle chain BC during the upshifting operation. The at least one first additional tooth 238 includes the downshifting receiving tooth 266. Accordingly, it is possible to smoothly receive the bicycle chain BC during the upshifting operation and the downshifting operation. This effectively facilitates the upshifting operation and the downshifting operation.

(23) The total number of the plurality of chain-driving teeth 226 is 36, and the total number of the plurality of additional chain-driving teeth 236 is 26. Accordingly, it is possible to provide one of combinations which are suitable for the certain and quick downshifting operation facilitated by the downshifting facilitation projection. The above combination is more effective in a case where the shifting facilitation projection 244 facilitates both of the upshifting operation and the downshifting operation.

(24) The total number of the plurality of chain-driving teeth 226 is 38, and the total number of the plurality of additional chain-driving teeth 236 is 28. Accordingly, it is possible to provide one of combinations which are suitable for the certain and quick downshifting operation facilitated by the downshifting facilitation projection. The above combination is more effective in a case where the shifting facilitation projection 244 facilitates both of the upshifting operation and the downshifting operation.

(25) The total number of the plurality of chain-driving teeth 226 is 40, and the total number of the plurality of additional chain-driving teeth 236 is 30. Accordingly, it is possible to provide one of combinations which are suitable for the certain and quick downshifting operation facilitated by the downshifting facilitation projection. The above combination is more effective in a case where the shifting facilitation projection 244 facilitates both of the upshifting operation and the downshifting operation.

(26) The total number of the plurality of chain-driving teeth 226 is 48, and the total number of the plurality of additional chain-driving teeth 236 is 36. Accordingly, it is possible to provide one of combinations which are suitable for the certain and quick downshifting operation facilitated by the downshifting facilitation projection. The above combination is more effective in a case where the shifting facilitation projection 244 facilitates both of the upshifting operation and the downshifting operation.

(27) The bicycle sprocket 212 comprises the shifting facilitation projection 244 disposed in the shifting facilitation area 257. Accordingly, it is possible to smooth at least one of the upshifting operation and the downshifting operation using the shifting facilitation projection 244. This facilitates at least one of the upshifting operation and the downshifting operation.

(28) The at least one downshifting facilitation tooth 250A, 250B, and/or 250C is adjacent to the at least one upshifting facilitation tooth 256A, 256B, and/or 256C on the downstream side of the at least one upshifting facilitation tooth 256A, 256B, and/or 256C. Accordingly, it is possible to effectively facilitate at least one of the upshifting operation and the downshifting operation using the shifting facilitation projection 244, the at least one upshifting facilitation tooth 256A, 256B, and/or 256C, and the at least one downshifting facilitation tooth 250A, 250B, and/or 250C.

Figure 36:
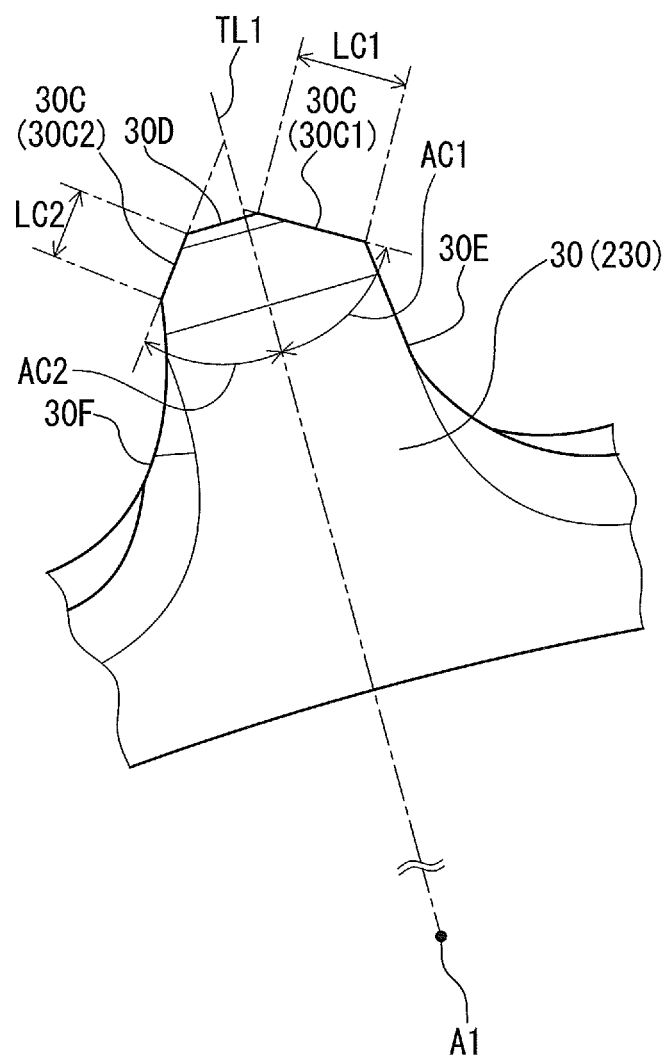
FIG. 36 is a partial enlarged side elevational view of a bicycle sprocket assembly in accordance with a modification of the first and second embodiments.

In the first and second embodiments, the driving facilitation chamfer 30C is disposed only at the rotational upstream edge 30E. However, the driving facilitation chamfer 30C can be disposed at both the rotational upstream edge 30E and the rotational downstream edge 30F. In such an embodiment, as seen in FIG. 36, the second tooth 30 (230) includes the driving facilitation chamfers 30C1 and 30C2. The driving facilitation chamfer 30C1 is disposed at the rotational upstream edge 30E. The driving facilitation chamfer 30C2 is disposed at the rotational downstream edge 30F. The driving facilitation chamfer 30C1 has a first chamfer length LC1. The driving facilitation chamfer 30C2 has a second chamfer length LC2. The first chamfer length LC1 is longer than the second chamfer length LC2. The driving facilitation chamfer 30C1 has a first chamfer angle AC1 defined with respect to a tooth center line TL1 of the second tooth 30 (230). The tooth center line TL1 extends from the rotational center axis A1 and is disposed at a circumferential center between the rotational upstream edge 30E and the rotational downstream edge 30F. The driving facilitation chamfer 30C2 has a second chamfer angle AC2 defined with respect to a tooth center line TL1 of the second tooth 30 (230). Each of the first and second chamfer angles AC1 and AC2 is smaller than 180 degrees. The first chamfer angle AC1 is larger than the second chamfer angle AC2.

Third Embodiment

A bicycle sprocket assembly 310 comprising a bicycle sprocket 312 in accordance with a third embodiment will be described below referring to FIGS. 37 to 40. The bicycle sprocket assembly 310 has substantially the same structures as those of the bicycle sprocket assembly 10 except for the downshifting facilitation projection 44. Thus, elements having substantially the same function as those in the first embodiment will be numbered the same here, and will not be described and/or illustrated again in detail here for the sake of brevity.

Figure 37:
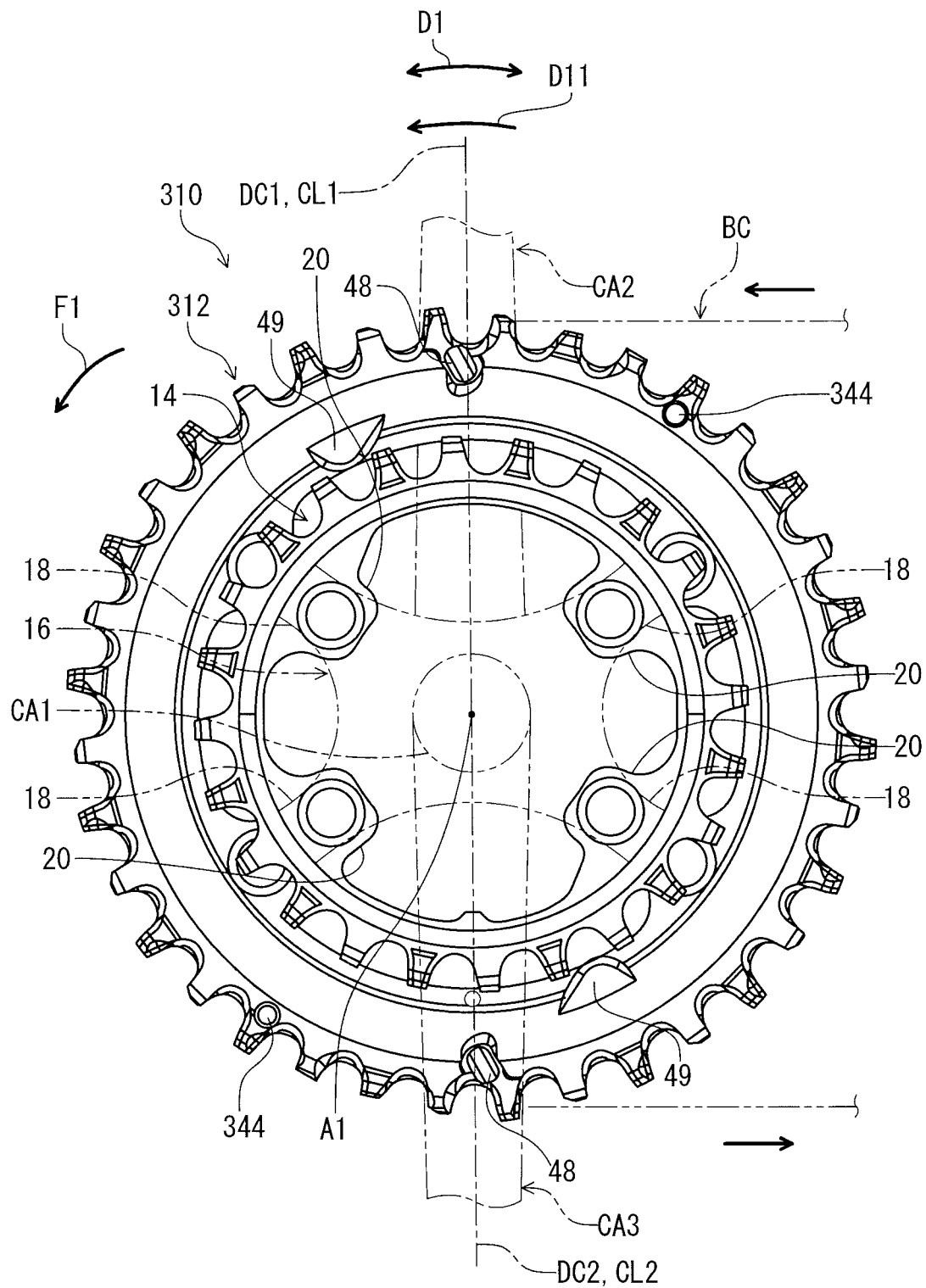
FIG. 37 is a side elevational view of a bicycle sprocket assembly in accordance with a third embodiment.
Figure 38:
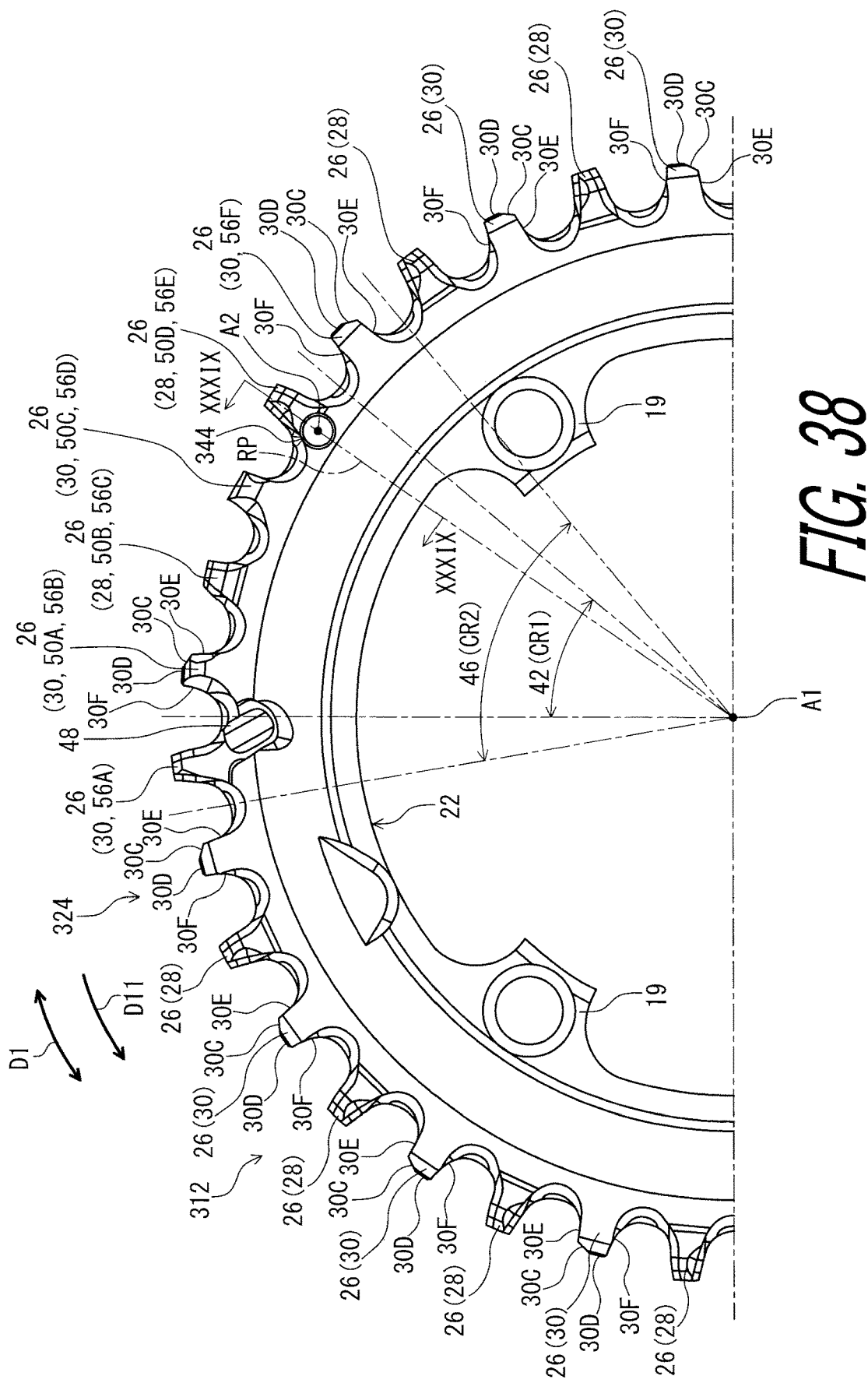
FIG. 38 is a partial side elevational view of a bicycle sprocket of the bicycle sprocket assembly illustrated in FIG. 37.

As seen in FIGS. 37 and 38, the bicycle sprocket 312 comprises the sprocket body 22 and a chain engagement structure 324. The chain engagement structure 324 includes the plurality of chain-driving teeth 26, the at least one downshifting facilitation area 42, and at least one downshifting facilitation projection 344. The at least one downshifting facilitation projection 344 is disposed in the at least one downshifting facilitation area 42 to engage with the bicycle chain BC when the bicycle chain BC shifts from the bicycle sprocket 312 toward the smaller sprocket 14. In this embodiment, as seen in FIG. 37, the chain engagement structure 324 includes a plurality of downshifting facilitation projections 344 similarly to the downshifting facilitation projections 44 of the first embodiment. However, a total number of the downshifting facilitation projections 344 is not limited to this embodiment.

Figure 39:
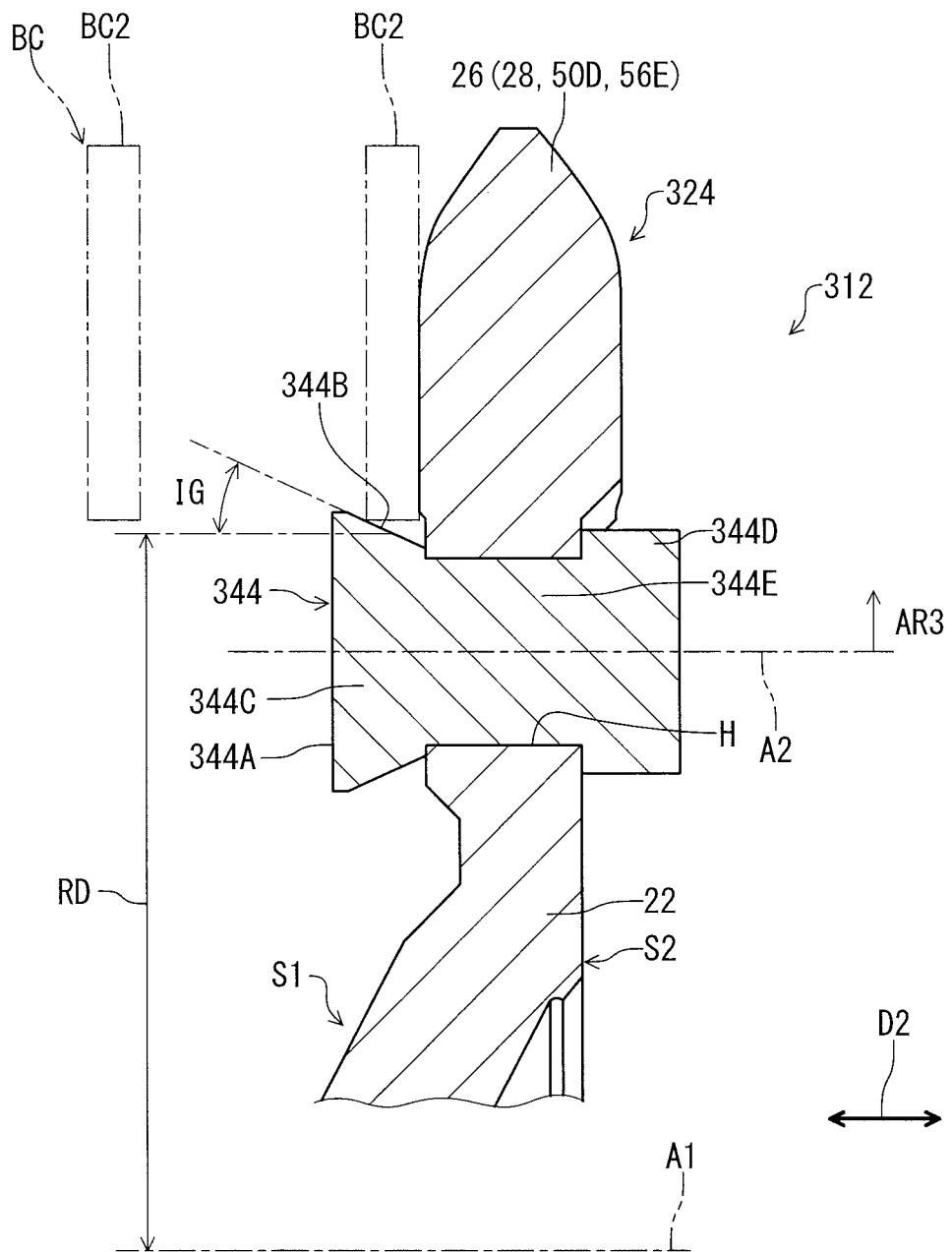
FIG. 39 is a cross-sectional view of the bicycle sprocket taken along line XXXIX-XXXIX of FIG. 38.
Figure 40:
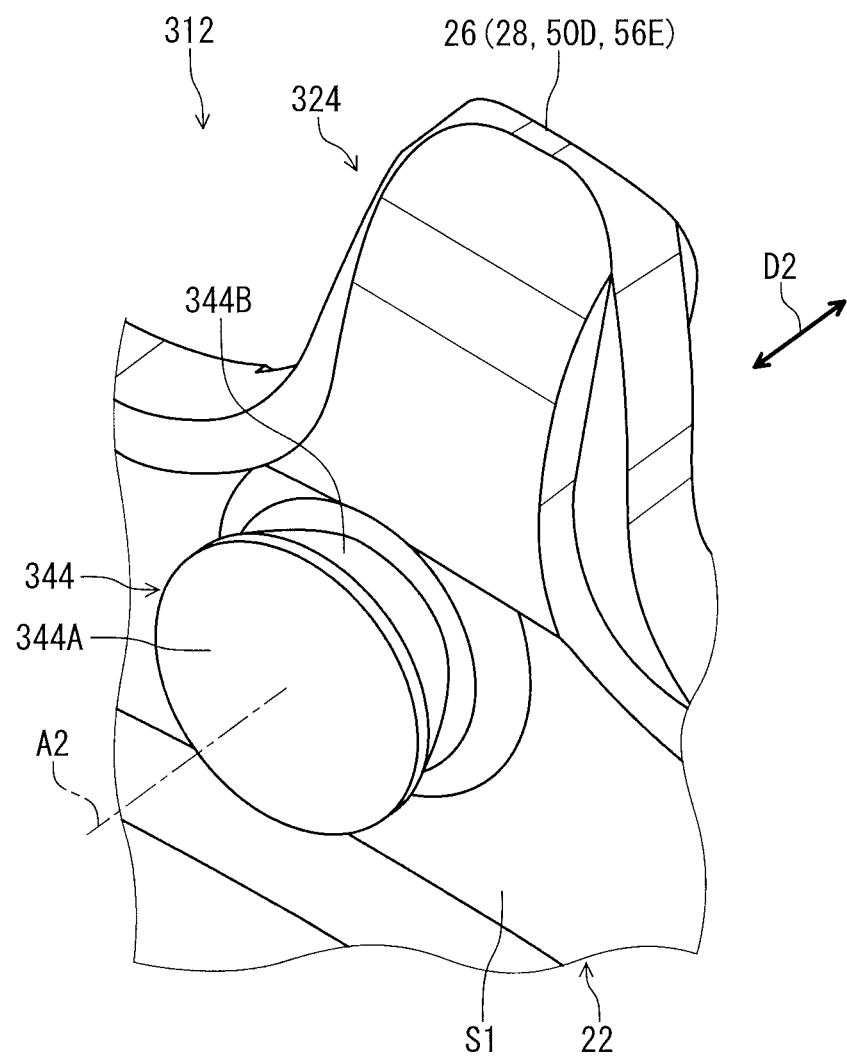
FIG. 40 is a partial perspective view of the bicycle sprocket illustrated in FIG. 38.

As seen in FIGS. 39 and 40, the downshifting facilitation projection 344 has substantially the same structure as that of the downshifting facilitation projection 44 of the first embodiment. In this embodiment, the downshifting facilitation projection 344 has a shape different from the shape of the downshifting facilitation projection 44 of the first embodiment. Specifically, the at least one downshifting facilitation projection 344 includes a projection end 344A and an inclined outer surface 344B. The projection end 344A is spaced apart from the sprocket body 22 in the axial direction D2. The inclined outer surface 344B is provided between the projection end 344A and the sprocket body 22 in the axial direction D2 parallel to the rotational center axis A1. The inclined outer surface 344B is contactable with the outer link plate BC2 of the bicycle chain BC in the downshifting operation in which the bicycle chain BC shifts from the bicycle sprocket 312 to the smaller sprocket 14. The at least one downshifting facilitation projection 344 includes a center axis A2 and extends along the center axis A2. The center axis A2 is parallel to the axial direction D2 and the rotational center axis A1.

As seen in FIG. 39, a radial distance RD is defined from the rotational center axis A1 and the inclined outer surface 344B in a radially outer area AR3 defined radially outwardly of the center axis A2 of the at least one downshifting facilitation projection 344 with respect to the rotational center axis A1. The inclined outer surface 344B is inclined relative to the rotational center axis A1 to decrease the radial distance from the projection end 344A to the sprocket body 22. An inclined angle IG defined between the inclined outer surface 344B and the rotational center axis A1 is equal to or smaller than 45 degrees. However, the inclined angle IG is not limited to this embodiment. As seen in FIG. 38, a reference plane RP is defined to extend radially outwardly from the rotational center axis A1 through the center axis A2 of the downshifting facilitation projection 344. The radial distance RD is defined on the reference plane RP. The inclined angle IG is defined on the reference plane RP.

In this embodiment, as seen in FIG. 39, the downshifting facilitation projection 344 includes a contact part 344C, a securing part 344D, and an intermediate part 344E. The contact part 344C is provided on the first axial side S1 to contact the outer link plate BC2. The contact part 344C is provided at one end of the intermediate part 344E. The contact part 344C includes the projection end 344A and the inclined outer surface 344B. The projection end 344A has the largest outer diameter in the contact part 344C. The securing part 344D is provided on the second axial side S2. The securing part 344D is provided at the other end of the intermediate part 344E. The intermediate part 344E extends through a hole H of the sprocket body 22. The contact part 344C has a maximum outer diameter larger than a maximum outer diameter of the intermediate part 344E. The securing part 344D has a maximum outer diameter larger than the maximum outer diameter of the intermediate part 344E. The contact part 344C, the securing part 344D, and the intermediate part 344E constitutes a rivet.

As seen in FIG. 40, the inclined outer surface 344B includes a curved surface. The at least one downshifting facilitation projection 344 at least partly has a truncated cone shape at least partly defined by the inclined outer surface 344B. In this embodiment, the downshifting facilitation projection 344 partly has a truncated cone shape partly defined by the inclined outer surface 344B. The contact part 344C has a truncated cone shape. The projection end 344A has a circular shape. The center axis A2 extends through a center of the circular shape of the projection end 344A. The inclined outer surface 344B has a truncated cone shape defined about the center axis A2. Namely, a cross-section of the contact part 344C taken along a plane perpendicular to the center axis A2 has a circular shape. However, the shape of the downshifting facilitation projection 344 is not limited to this embodiment. For example, the cross-section of the contact part 344C can be oval or polygonal.

With the bicycle sprocket 312, it is possible to obtain the same effects as those of the bicycle sprocket 12 of the first embodiment.

Furthermore, with the bicycle sprocket assembly according to the seventy-sixth aspect, the inclined outer surface of the at least one downshifting facilitation projection moves the bicycle chain toward the sprocket body in the axial direction when the bicycle chain is engaged with the at least one downshifting facilitation projection. Accordingly, it is possible to certainly adjust the chain-downshifting distance.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The term "downshifting facilitation area", as used herein, means a predetermined area formed in a chain engagement structure of a bicycle sprocket. The downshifting facilitation area is intentionally designed to shift a bicycle chain from the bicycle sprocket toward a smaller sprocket adjacent to the bicycle sprocket without another sprocket between the smaller sprocket and the bicycle sprocket. The downshifting facilitation area may comprise a downshifting facilitation projection and/or a downshifting facilitation tooth on which a downshifting facilitation chamfer is faulted. The term "upshifting facilitation area", as used herein, means a predetermined area formed in a chain engagement structure of a bicycle sprocket. The upshifting facilitation area is intentionally designed to shift a bicycle chain from a smaller sprocket adjacent to the bicycle sprocket without another sprocket between the smaller sprocket and the bicycle sprocket toward the bicycle sprocket. The upshifting facilitation area may comprise an upshifting facilitation projection and/or an upshifting facilitation tooth on which an upshifting facilitation chamfer is formed.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket having a rotational center axis, the bicycle sprocket comprising:
   a sprocket body;
   a chain engagement structure arranged on a radially outer periphery of the sprocket body, the chain engagement structure including a plurality of chain-driving teeth to engage with a bicycle chain to transmit a rotational driving force to the bicycle chain; and
   a shifting facilitation projection to facilitate an upshifting operation of the bicycle chain and to facilitate a downshifting operation of the bicycle chain, wherein
   the plurality of chain-driving teeth includes at least one upshifting facilitation tooth, and
   the shifting facilitation projection being closest to an upshifting facilitation tooth of the at least one upshifting facilitation tooth than any other of the plurality of chain-driving teeth.

2. The bicycle sprocket according to claim 1, wherein the plurality of chain-driving teeth includes
   at least one upshifting facilitation tooth, and
   at least one downshifting facilitation tooth which is disposed on a downstream side of the at least one upshifting facilitation tooth.

3. The bicycle sprocket according to claim 2, wherein the at least one downshifting facilitation tooth includes a downshifting derailing tooth to first derail the bicycle chain from the bicycle sprocket during the downshifting operation.

4. The bicycle sprocket according to claim 2, wherein the at least one upshifting facilitation tooth includes an upshifting receiving tooth to first receive the bicycle chain during the upshifting operation.

5. The bicycle sprocket according to claim 4, wherein the upshifting receiving tooth is spaced apart from the shifting facilitation projection by an even number of chain pitch of the bicycle chain.

6. The bicycle sprocket according to claim 2, wherein the at least one downshifting facilitation tooth includes a downshifting derailing tooth to first derail the bicycle chain from the bicycle sprocket during the downshifting operation,
   the at least one upshifting facilitation tooth includes an upshifting receiving tooth to first receive the bicycle chain during the upshifting operation, and
   the shifting facilitation projection is disposed between the downshifting derailing tooth and the upshifting receiving tooth in a circumferential direction with respect to the rotational center axis.

7. The bicycle sprocket according to claim 2, wherein
the chain engagement structure includes a shifting facilitation area in which the at least one downshifting facilitation tooth and the at least one upshifting facilitation tooth are disposed, and
the shifting facilitation projection is disposed in the shifting facilitation area to engage with an outer link plate of the bicycle chain during each of the upshifting operation and the downshifting operation.

8. The bicycle sprocket according to claim 2, wherein
the plurality of chain-driving teeth includes
at least one first tooth having a first chain engaging width, and
at least one second tooth having a second chain engaging width,
the first chain engaging width is larger than an inner link space defined between an opposed pair of inner link plates of the bicycle chain and is smaller than an outer link space defined between an opposed pair of outer link plates of the bicycle chain, and
the second chain engaging width is smaller than the inner link space.

9. The bicycle sprocket according to claim 8, wherein
the shifting facilitation projection has an axial length defined from an axial side surface of the at least one second tooth in an axial direction parallel to the rotational center axis, and
the axial length of the shifting facilitation projection is equal to or greater than 1.0 mm.

10. The bicycle sprocket according to claim 8, wherein
the at least one downshifting facilitation tooth includes a downshifting derailing tooth to first derail the bicycle chain from the bicycle sprocket during the downshifting operation, and
the at least one second tooth includes the downshifting derailing tooth.

11. A bicycle sprocket assembly comprising:
the bicycle sprocket according to claim 1; and
a smaller sprocket adjacent to the bicycle sprocket without another sprocket between the smaller sprocket and the bicycle sprocket.

12. The bicycle sprocket assembly according to claim 11, wherein
the smaller sprocket includes
an additional sprocket body, and
an additional chain engagement structure arranged on a radially outer periphery of the additional sprocket body,
the additional chain engagement structure includes a plurality of additional chain-driving teeth to engage with the bicycle chain to transmit the rotational driving force to the bicycle chain, and
a total number of the plurality of chain-driving teeth is 36, and
a total number of the plurality of additional chain-driving teeth is 26.

13. The bicycle sprocket assembly according to claim 11, wherein
the smaller sprocket includes
an additional sprocket body, and
an additional chain engagement structure arranged on a radially outer periphery of the additional sprocket body,
the additional chain engagement structure includes a plurality of additional chain-driving teeth to engage with the bicycle chain to transmit the rotational driving force to the bicycle chain, and
a total number of the plurality of chain-driving teeth is 38, and
a total number of the plurality of additional chain-driving teeth is 28.

14. The bicycle sprocket assembly according to claim 11, wherein
the smaller sprocket includes
an additional sprocket body, and
an additional chain engagement structure arranged on a radially outer periphery of the additional sprocket body,
the additional chain engagement structure includes a plurality of additional chain-driving teeth to engage with the bicycle chain to transmit the rotational driving force to the bicycle chain, and
a total number of the plurality of chain-driving teeth is 40, and
a total number of the plurality of additional chain-driving teeth is 30.

15. A bicycle sprocket having a rotational center axis, the bicycle sprocket comprising:
a sprocket body;
a chain engagement structure arranged on a radially outer periphery of the sprocket body, the chain engagement structure including a plurality of chain-driving teeth to engage with a bicycle chain to transmit a rotational driving force to the bicycle chain; and
a shifting facilitation projection to facilitate an upshifting operation of the bicycle chain and to facilitate a downshifting operation of the bicycle chain, wherein
the plurality of chain-driving teeth includes
at least one upshifting facilitation tooth, and
at least one downshifting facilitation tooth which is disposed on a downstream side of the at least one upshifting facilitation tooth, and
the at least one downshifting facilitation tooth is adjacent to the at least one upshifting facilitation tooth on a downstream side of the at least one upshifting facilitation tooth without another tooth between the at least one upshifting facilitation tooth and the at least one downshifting facilitation tooth.

16. A bicycle sprocket having a rotational center axis, the bicycle sprocket comprising:
a sprocket body;
a chain engagement structure arranged on a radially outer periphery of the sprocket body, the chain engagement structure including a plurality of chain-driving teeth to engage with a bicycle chain to transmit a rotational driving force to the bicycle chain; and
a shifting facilitation projection to facilitate an upshifting operation of the bicycle chain and to facilitate a downshifting operation of the bicycle chain, wherein
the plurality of chain-driving teeth includes
at least one upshifting facilitation tooth, and
at least one downshifting facilitation tooth which is disposed on a downstream side of the at least one upshifting facilitation tooth,
the at least one downshifting facilitation tooth includes a downshifting derailing tooth to first derail the bicycle chain from the bicycle sprocket during the downshifting operation,
the at least one downshifting facilitation tooth includes at least one chamfered tooth disposed on a downstream side of the downshifting derailing tooth in a rotational driving direction of the bicycle sprocket, and
the at least one chamfered tooth includes a downshifting facilitation chamfer disposed on an opposite side of the shifting facilitation projection in an axial direction parallel to the rotational center axis.

17. The bicycle sprocket according to claim 16, wherein the at least one chamfered tooth is adjacent to the downshifting derailing tooth on the downstream side of the downshifting derailing tooth in the rotational driving direction without another tooth between the at least one chamfered tooth and the downshifting derailing tooth.

18. A bicycle sprocket having a rotational center axis, the bicycle sprocket comprising:
   a sprocket body;
   a chain engagement structure arranged on a radially outer periphery of the sprocket body, the chain engagement structure including a plurality of chain-driving teeth to engage with a bicycle chain to transmit a rotational driving force to the bicycle chain; and
   a shifting facilitation projection to facilitate an upshifting operation of the bicycle chain and to facilitate a downshifting operation of the bicycle chain, wherein
   the plurality of chain-driving teeth includes
      at least one upshifting facilitation tooth, and
      at least one downshifting facilitation tooth which is disposed on a downstream side of the at least one upshifting facilitation tooth, and
   the at least one downshifting facilitation tooth has a radial length shorter than a radial length of at least one of the plurality of chain-driving teeth other than the at least one downshifting facilitation tooth.

19. A bicycle sprocket assembly comprising:
   a bicycle sprocket having a rotational center axis, the bicycle sprocket comprising:
      a sprocket body;
      a chain engagement structure arranged on a radially outer periphery of the sprocket body, the chain engagement structure including a plurality of chain-driving teeth to engage with a bicycle chain to transmit a rotational driving force to the bicycle chain; and
      a shifting facilitation projection to facilitate an upshifting operation of the bicycle chain and to facilitate a downshifting operation of the bicycle chain; and
   a smaller sprocket adjacent to the bicycle sprocket without another sprocket between the smaller sprocket and the bicycle sprocket, wherein
   the smaller sprocket includes a downshifting receiving tooth to first receive the bicycle chain during the downshifting operation,
   the plurality of chain-driving teeth includes
      at least one upshifting facilitation tooth, and
      at least one downshifting facilitation tooth which is disposed on a downstream side of the at least one upshifting facilitation tooth,
   the at least one downshifting facilitation tooth includes a downshifting derailing tooth to first derail the bicycle chain from the bicycle sprocket during the downshifting operation, and
   the shifting facilitation projection is disposed at a position such that the downshifting receiving tooth is spaced apart from the downshifting derailing tooth by an uneven number of chain pitch of the bicycle chain on a chain line of the bicycle chain during the downshifting operation.

20. The bicycle sprocket assembly according to claim 19, wherein
   the uneven number of chain pitch is equal to or smaller than nine.

21. The bicycle sprocket assembly according to claim 19, wherein
   the uneven number of chain pitch is equal to or smaller than seven.

22. The bicycle sprocket assembly according to claim 19, wherein
   the uneven number of chain pitch is equal to or smaller than five.

23. The bicycle sprocket assembly according to claim 19, wherein
   the plurality of chain-driving teeth includes
      at least one first tooth having a first chain engaging width, and
      at least one second tooth having a second chain engaging width,
   the first chain engaging width is larger than an inner link space defined between an opposed pair of inner link plates of the bicycle chain and is smaller than an outer link space defined between an opposed pair of outer link plates of the bicycle chain,
   the second chain engaging width is smaller than the inner link space,
   the smaller sprocket includes
      an additional sprocket body, and
      an additional chain engagement structure arranged on a radially outer periphery of the additional sprocket body,
   the additional chain engagement structure includes a plurality of additional chain-driving teeth to engage with the bicycle chain to transmit the rotational driving force to the bicycle chain,
   the plurality of additional chain-driving teeth includes
      at least one first additional tooth having a third chain engaging width, and
      at least one second additional tooth having a fourth chain engaging width,
   the third chain engaging width is larger than the inner link space defined between the opposed pair of inner link plates of the bicycle chain and is smaller than the outer link space defined between the opposed pair of outer link plates of the bicycle chain, and
   the fourth chain engaging width is smaller than the inner link space.

24. The bicycle sprocket assembly according to claim 23, wherein
   the at least one second tooth includes the downshifting derailing tooth.

25. The bicycle sprocket assembly according to claim 23, wherein
   the at least one first tooth includes an upshifting receiving tooth to first receive the bicycle chain during the upshifting operation, and
   the at least one first additional tooth includes the downshifting receiving tooth.

26. The bicycle sprocket assembly according to claim 19, wherein
   the smaller sprocket includes
      an additional sprocket body, and
      an additional chain engagement structure arranged on a radially outer periphery of the additional sprocket body,
   the additional chain engagement structure includes a plurality of additional chain-driving teeth to engage with the bicycle chain to transmit the rotational driving force to the bicycle chain, and
   a total number of the plurality of chain-driving teeth is 48, and a total number of the plurality of additional chain-driving teeth is 36.

27. A bicycle sprocket having a rotational center axis, the bicycle sprocket comprising:
- a sprocket body;
- a chain engagement structure arranged on a radially outer periphery of the sprocket body, the chain engagement structure including
  - a plurality of chain-driving teeth to engage with a bicycle chain to transmit a rotational driving force to the bicycle chain, the plurality of chain-driving teeth including at least one upshifting facilitation tooth and at least one downshifting facilitation tooth which is adjacent to the at least one upshifting facilitation tooth without another tooth between the at least one upshifting facilitation tooth and the at least one downshifting facilitation tooth, and
  - a shifting facilitation area in which the at least one upshifting facilitation tooth and the at least one downshifting facilitation tooth are disposed; and
- a shifting facilitation projection disposed in the shifting facilitation area.

28. The bicycle sprocket according to claim 27, wherein the at least one downshifting facilitation tooth is adjacent to the at least one upshifting facilitation tooth on a downstream side of the at least one upshifting facilitation tooth.

\* \* \* \* \*